US011968575B2

(12) United States Patent
Yang et al.

(10) Patent No.: US 11,968,575 B2
(45) Date of Patent: Apr. 23, 2024

(54) DATA TRANSMISSION METHOD, COMMUNICATION APPARATUS, AND COMMUNICATION SYSTEM

(71) Applicant: HUAWEI TECHNOLOGIES CO., LTD., Guangdong (CN)

(72) Inventors: Chenchen Yang, Ottawa (CA); Xudong Yang, Shanghai (CN); Yinghao Jin, Billancourt (FR); Wei Tan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 183 days.

(21) Appl. No.: 17/586,060

(22) Filed: Jan. 27, 2022

(65) Prior Publication Data
US 2022/0150781 A1 May 12, 2022

Related U.S. Application Data

(63) Continuation of application No. PCT/CN2020/104730, filed on Jul. 27, 2020.

(30) Foreign Application Priority Data

Jul. 31, 2019 (CN) .......................... 201910704291.5

(51) Int. Cl.
*H04W 36/02* (2009.01)
*H04W 36/00* (2009.01)
(Continued)

(52) U.S. Cl.
CPC ..... *H04W 36/023* (2013.01); *H04W 36/0016* (2013.01); *H04W 36/14* (2013.01); *H04W 36/32* (2013.01)

(58) Field of Classification Search
CPC ... H04W 84/105; H04W 92/02; H04W 84/16; H04W 36/0005; H04W 36/023; H04W 36/0016; H04W 36/14; H04W 36/32
See application file for complete search history.

(56) References Cited

U.S. PATENT DOCUMENTS

2001/0041594 A1* 11/2001 Arazi .................... H04M 1/733
455/555
2004/0009749 A1* 1/2004 Arazi .................... H04W 36/08
455/41.2
(Continued)

FOREIGN PATENT DOCUMENTS

CA 2844630 A1 * 2/2013 ............ H04W 76/19
CN 1866907 A 11/2006
(Continued)

OTHER PUBLICATIONS

3GPP TR 23.734 V16.2.0 (Jun. 2019), "3rd Generation Partnership Project; Technical Specification Group Services and System Aspects; Study on enhancement of 5G System (SGS) for vertical and Local Area Network (LAN) services (Release 16)," Jun. 2019, 117 pages.
(Continued)

*Primary Examiner* — Dung Hong
(74) *Attorney, Agent, or Firm* — Fish & Richardson P.C.

(57) ABSTRACT

The disclosure provides data transmission methods and apparatuses. One example method includes when the terminal device needs to perform the cross-network movement, the terminal device sends a message to a network element of a network accessed by the terminal device, to notify that the terminal device is to perform the cross-network movement from a source network to a target network. Therefore, during the movement of the terminal device, a network side pauses transmission of user plane data of the terminal device, and buffers data that is not sent before the terminal device
(Continued)

performs the cross-network movement. After accessing the target network, the network side sends the buffered data to the terminal device.

19 Claims, 16 Drawing Sheets

(51) Int. Cl.
*H04W 36/14* (2009.01)
*H04W 36/32* (2009.01)

(56) References Cited

U.S. PATENT DOCUMENTS

| | | | | |
|---|---|---|---|---|
| 2004/0048614 | A1* | 3/2004 | Ham | H04W 8/04 455/433 |
| 2004/0242230 | A1* | 12/2004 | Rue | H04W 92/02 455/426.2 |
| 2005/0176422 | A1* | 8/2005 | Choi | H04W 76/11 455/426.2 |
| 2006/0098598 | A1* | 5/2006 | Gallagher | H04W 36/14 370/331 |
| 2014/0024340 | A1 | 1/2014 | Raleigh | |
| 2018/0288622 | A1* | 10/2018 | Maria | H04L 63/0853 |

FOREIGN PATENT DOCUMENTS

| | | |
|---|---|---|
| CN | 101448294 A | 6/2009 |
| CN | 101772106 A | 7/2010 |
| CN | 103703725 A | 4/2014 |
| CN | 105760198 A | 7/2016 |
| CN | 108495267 A | 9/2018 |
| CN | 109219092 A | 1/2019 |
| WO | 2018049274 A1 | 3/2018 |
| WO | 2018170703 A1 | 9/2018 |

OTHER PUBLICATIONS

3GPP TS 23.502 V16.1.0 (Jun. 2019), "3rd Generation Partnership Project; Technical Specification Group Services and System Aspects; Procedures for the 5G System; Stage 2 (Release 16)," Jun. 2019, 500 pages.

Extended European Search Report issued in European Application No. 20847328.0 on Jul. 15, 2022, 13 pages.

Huawei et al., "Clarification of service continuity between PLMN and SNPN," 3GPP TSG-SA2 Meeting #134, S2-1907113 (revision of S2-1905654), Sapporo, Japan, Jun. 24-28, 2019, 2 pages.

Huawei et al., "Handover procedure between PLMN and SNPN," 3GPP TSG-SA2 Meeting #134, S2-1907114 (revision of S2-1905655), Sapporo, Japan, Jun. 24-28, 2019, 2 pages.

ZTE, "Clarification on the N2 handover and 5GS to EPS handover for SNPN," 3GPP TSG-SA WG2 Meeting #134, S2-1907740, Sapporo, Japan, Jun. 24-28, 2019, 8 pages.

Huawei, HiSilicon, "Handover procedure between PLMN and SNPN," 3GPP TSG-SA WG2 Meeting #132, S2-1903729, Xi'An, China, Apr. 8-12, 2019, 5 pages.

3GPP TS 38.413 V15.4.0 (Jul. 2019), "3rd Generation Partnership Project; Technical Specification Group Radio Access Network; NG-RAN; NG Application Protocol (NGAP)(Release 15)," Jul. 2019, 328 pages.

3GPP TS 23.502 V15.1.0 (Mar. 2018), "3rd Generation Partnership Project; Technical Specification Group Services and System Aspects; Procedures for the 5G System; Stage 2(Release 15)," Mar. 2018, 285 pages.

Office Action issued in Chinese Application No. 201910704291.5 dated May 21, 2021, 22 pages (with English translation).

PCT International Search Report and Written Opinion issued in International Application No. PCT/CN2020/104730 dated Sep. 16, 2020, 16 pages (with English translation).

* cited by examiner

DATA TRANSMISSION METHOD, COMMUNICATION APPARATUS, AND COMMUNICATION SYSTEM

CROSS-REFERENCE TO RELATED APPLICATIONS

This application is a continuation of International Application No. PCT/CN2020/104730, filed on Jul. 27, 2020, which claims priority to Chinese Patent Application No. 201910704291.5, filed on Jul. 31, 2019. The disclosures of the aforementioned applications are hereby incorporated by reference in their entireties.

TECHNICAL FIELD

This application relates to wireless communication technologies, and in particular, to a data transmission method, an apparatus, and a communication system.

BACKGROUND

A non-public network (non-public networks, NPN) is discussed in the fifth generation (the fifth generation, 5G) communication standard of the third generation partnership project (the third generation partnership project, 3GPP). The NPN is also referred to as a private network, which is different from a conventional cellular network. The NPN allows access of some user equipments (user equipment, UE) with specific permission. Networking manners of the NPN are classified into standalone networking and non-standalone networking. In the standalone networking, each of the NPN and a public land mobile network (public land mobile network, PLMN) has an independent radio access network (radio access network, RAN) and an independent core network. The standalone NPN is considered as a non-3GPP network. The core network of the NPN and the core network of the PLMN are connected by using a non-3GPP interworking function (non-3gpp interworking function, N3IWF) network element, and the N3IWF network element can implement user-plane and control-plane interworking.

Due to mobility of UE, in many scenarios, for example, cross-network cell reselection or cell handover, the UE may move from one network to another network. For example, the UE moves from a private network to a public network, or moves from a public network to a private network. However, in a current standalone NPN architecture, whether UE moves from one network to another network and when the UE moves are determined and triggered by the UE. Before the UE moves, if the UE establishes a protocol data unit (protocol data unit, PDU) session in a source network or a target network, and is transmitting user plane data of the PDU session, during cross-network movement of the UE, the source network or the target network continues to transmit the user plane data of the PDU session to the UE through an air interface, resulting in a relatively high packet loss rate.

SUMMARY

This application provides a data transmission method and an apparatus, to reduce a packet loss rate and a data backhaul amount.

According to a first aspect, this application provides a data transmission method. The method includes: A terminal device accesses a first network; and when the terminal device needs to move from the first network to a second network, the terminal device sends a first message to a core network control plane network element of the first network or sends a first RRC message to an access network device of the first network, where the first message or the first RRC message is used to indicate that the terminal device is to move from the first network to the second network, where the first network is a public network and the second network is a non-public network, or the first network is a non-public network and the second network is a public network.

In this technical solution of this application, after accessing the first network, when needing to perform cross-network movement from the first network to the second network, the UE directly notifies the core network control plane network element of the first network or indirectly notifies the core network control plane network element of the first network by using the access network device of the first network that the UE is to trigger the cross-network movement. In this way, the core network control plane network element of the first network notifies a core network user plane network element of the first network that the UE is to perform the cross-network movement, so that the core network user plane network element of the first network pauses transmission of user plane data of a PDU session of the first network of the UE, to prevent air interface packet loss during the movement of the UE and data backhaul of the network after the movement of the UE that are caused because the core network user plane network element of the first network continues to send the user plane data of the PDU session of the first network of the UE during the cross-network movement of the UE, thereby reducing an air interface packet loss rate during the cross-network movement of the UE and a data backhaul amount of the network after the movement of the UE.

With reference to the first aspect, in some implementations of the first aspect, the first message or the first RRC message further carries one or more of the following information: first time information, a cause, immediate pause indication information, or proximity indication information, where the first time information is used to indicate that the terminal device is to trigger the cross-network movement after first time; the cause is used to indicate the cross-network movement; the immediate pause indication information is used to indicate whether to immediately pause transmission of user plane data of the first network of the terminal device; and the proximity indication information is used to indicate that the terminal device is entering or leaving a neighboring area of one or more cells of a non-public network, or the proximity indication information is used to indicate that the terminal device is entering or leaving one or more cells of a non-public network.

In addition, the proximity indication information may carry one or more of the following information: information indicating that the terminal device is entering the neighboring area of the one or more cells of the non-public network, information indicating that the terminal device is leaving the neighboring area of the one or more cells of the non-public network, information indicating that the terminal device is entering the one or more cells of the non-public network, information indicating that the terminal device is leaving the one or more cells of the non-public network, or identifier information of the one or more cells. For example, character strings entering and leaving are respectively used to indicate entering and leaving, an absolute radio frequency channel number (Absolute Radio Frequency Channel Number, ARFCN) of the cell is used to identify the cell, or a cell ID is used to identify the cell.

Before performing the cross-network movement, the UE not only needs to notify the core network control plane network element of the first network that the UE is to trigger the cross-network movement, but also needs to notify the core network control plane network element of the first network of information related to the cross-network movement, for example, a period of time after which the UE triggers the cross-network movement (namely, the first time information), a movement cause, whether the transmission of the user plane data of the first network of the UE needs to be stopped immediately, and information about a network and a cell that the UE is leaving or entering. In this way, the core network user plane network element and the access network device of the first network can determine, based on the first time information and the like, when to stop the transmission of the user plane data of the first network of the UE, to reduce the air interface packet loss rate during the cross-network movement of the UE.

In addition, in downlink transmission, the user plane data of the first network of the UE is forwarded by the core network user plane network element of the first network to the UE by using the access network device of the first network. Therefore, the core network user plane network element of the first network stops the transmission of the user plane data of the first network of the UE in time based on the first time information, to avoid a relatively large data backhaul amount caused because a large amount of data is still not forwarded by the access network device of the first network to the UE when the first time arrives, and the access network device of the first network needs to backhaul the data to the UE after the UE accesses the second network. In other words, before the UE performs the cross-network movement, the core network user plane network element of the first network stops the transmission of user plane data of the first network of the UE, so that the data backhaul amount of the network after the UE performs the cross-network movement can be reduced.

With reference to the first aspect, in some implementations of the first aspect, after the terminal device sends the first message to the core network control plane network element of the first network or sends the first RRC message to the access network device of the first network, the method further includes: The terminal device receives a second RRC message from the access network device of the first network, where the second RRC message carries second time information, and the second time information is used to indicate that the core network user plane network element of the first network is to pause the transmission of the user plane data of the first network of the terminal device after second time; or the terminal device receives the second time information from an AMF of the first network by using a NAS message; and the terminal device still retains a context of the first network after the first time or the second time.

After learning that the terminal device triggers the cross-network movement after the first time, a network side notifies the terminal device that the core network user plane network element of the first network is to pause the transmission of the user plane data of the first network of the terminal device after the second time. The terminal device still retains the context of the first network after the first time or the second time, to prevent the UE from prematurely releasing the context of the first network of the UE.

With reference to the first aspect, in some implementations of the first aspect, after the terminal device moves to the second network and accesses the second network, the method further includes: The terminal device sends a NAS message to the core network control plane network element of the first network, where the NAS message is used to indicate that the terminal device has moved to the second network, so that the core network control plane network element of the first network notifies the access network device of the first network to send buffered user plane data of the first network of the terminal device; the terminal device receives a third RRC message from the access network device of the first network, where the third RRC message carries one or more of the following information: a session identifier of a PDU session of the first network of the terminal device, a device identifier of the terminal device, a cause for resuming the transmission, or information indicating whether to immediately resume the transmission; and the terminal device resumes the context of the first network based on the third RRC message.

After accessing the second network, the terminal device sends the NAS message to the core network control plane network element of the first network, so that the network side learns of, in time, a state that the UE has accessed the second network, and resumes the context of the first network of the UE in time.

According to a second aspect, a data transmission method is provided. The method includes: A core network control plane network element of a first network receives a first message, where the first message is used to indicate that a terminal device is to move from the first network to a second network, where the first network is a public network and the second network is a non-public network, or the first network is a non-public network and the second network is a public network; and the core network control plane network element of the first network sends a second message to a core network user plane network element of the first network, where the second message is used to indicate the core network user plane network element of the first network to pause transmission of user plane data of the first network of the terminal device.

In this technical solution of this application, the core network control plane network element of the first network notifies the core network user plane network element of the first network that the UE is to perform cross-network movement, so that the core network user plane network element of the first network pauses transmission of user plane data of a PDU session of the first network of the UE, to prevent air interface packet loss caused because the core network user plane network element of the first network continues to send the user plane data of the PDU session of the first network of the UE to the UE during the cross-network movement of the UE, thereby reducing an air interface packet loss rate during the cross-network movement of the UE.

A scenario in which the UE performs the cross-network movement from the first network to the second network is not limited in this application. For example, the UE may move in a cross-network cell reselection process, or the UE may move in a cross-network cell handover process.

Therefore, alternatively, in this application, that the UE moves from the first network to the second network may alternatively be described as that the UE performs reselection from the first network to the second network, the UE is handed over from the first network to the second network, the UE accesses the second network from the first network, or the like.

It should be understood that in this application, the UE or a RAN notifies the core network control plane network element that the transmission of the corresponding user plane data of the UE is to be paused, and then the core network control plane network element notifies the core network user plane network element to pause the transmission of the corresponding user plane data of the UE. Alternatively, the UE or the RAN may directly notify the core network user plane network element to pause the transmission of the corresponding user plane data of the UE. For example, the UE or the RAN adds pause indication information to a sent user plane data packet.

With reference to the second aspect, in some implementations of the second aspect, the first message or the second message further carries one or more of the following information: first time information, a cause, immediate pause indication information, or proximity indication information, where the first time information is used to indicate that the terminal device is to trigger the cross-network movement after first time; the cause is used to indicate the cross-network movement; the immediate pause indication information is used to indicate whether to immediately pause the transmission of the user plane data of the first network of the terminal device; and the proximity indication information is used to indicate that the terminal device is entering or leaving a neighboring area of one or more cells of a non-public network, or the proximity indication information is used to indicate that the terminal device is entering or leaving one or more cells of a non-public network.

In addition, the proximity indication information may carry one or more of the following information: information indicating that the terminal device is entering the neighboring area of the one or more cells of the non-public network, information indicating that the terminal device is leaving the neighboring area of the one or more cells of the non-public network, information indicating that the terminal device is entering the one or more cells of the non-public network, information indicating that the terminal device is leaving the one or more cells of the non-public network, or identifier information of the one or more cells. For example, character strings entering and leaving are respectively used to indicate entering and leaving, an absolute radio frequency channel number ARFCN of the cell is used to identify the cell, or a cell ID is used to identify the cell.

Before performing the cross-network movement, the UE not only needs to notify the core network control plane network element of the first network that the UE is to trigger the cross-network movement, but also needs to notify the core network control plane network element of the first network of information related to the cross-network movement, for example, a period of time after which the UE triggers the cross-network movement (namely, the first time information), a movement cause, whether the transmission of the user plane data of the first network of the UE needs to be stopped immediately, and information about a network and a cell that the UE is leaving or entering. In this way, the core network user plane network element and an access network device of the first network can determine, based on the first time information and the like, when to stop the transmission of the user plane data of the first network of the UE, to reduce the air interface packet loss rate during the cross-network movement of the UE.

In addition, in downlink transmission, the user plane data of the first network of the UE is forwarded by the core network user plane network element of the first network to the UE by using the access network device of the first network. Therefore, the core network user plane network element of the first network stops the transmission of the user plane data of the first network of the UE in time based on the first time information, to avoid a relatively large data backhaul amount caused because a large amount of data is still not forwarded by the access network device of the first network to the UE when the first time arrives, and the access network device of the first network needs to backhaul the data to the UE after the UE accesses the second network. In other words, before the UE performs the cross-network movement, the core network user plane network element of the first network stops the transmission of user plane data of the first network of the UE, so that the data backhaul amount of the network after the UE performs the cross-network movement can be reduced.

It should be understood that, in an example, during downlink data transmission, "backhaul" is a process in which when data is forwarded from the core network user plane network element of the first network to the access network device of the first network and is not forwarded to the UE, after the UE moves from the first network to the second network and accesses the second network, the access network device of the first network continues to send the unsent data to the UE by using a network element of the second network. In another example, during uplink data transmission, "backhaul" is a process in which when data is sent from the UE to the access network device of the first network and is not forwarded to the core network user plane network element of the first network, after the UE moves from the first network to the second network and accesses the second network, the access network device of the first network continues to send the unsent data to the core network user plane network element of the first network by using a network element of the second network. Details are not described again.

With reference to the second aspect, in some implementations of the second aspect, the method further includes: The core network control plane network element of the first network receives a third message from the core network user plane network element of the first network, where the third message carries second time information, and the second time information is used to indicate that the core network user plane network element of the first network is to pause the transmission of the user plane data of the first network of the terminal device after second time; and the core network control plane network element of the first network still retains a context of the first network of the terminal device after the first time or the second time based on the obtained first time information and second time information.

With reference to the second aspect, in some implementations of the second aspect, the core network control plane network element of the first network receives the first message from the access network device of the first network, and after the core network control plane network element of the first network receives the third message from the core network user plane network element of the first network, the method further includes: A core network device of the first network sends a fourth message to the access network device of the first network, where the fourth message carries the second time, and the fourth message is used to notify the access network device of the first network that the core network control plane network element of the first network is to pause the transmission of the user plane data of the first network of the terminal device after the second time.

After learning that the UE triggers the cross-network movement after the first time, the core network user plane network element of the first network may generate the second time, used to indicate that the core network user plane network element of the first network is to stop the transmission of the user plane data of the first network of the UE after the second time. The core network user plane network element of the first network notifies the core network control plane network element of the first network of the second time information, and then the core network control plane network element of the first network notifies the access network device of the first network of the second time information.

Optionally, the first time and the second time may have no strict sequence. For example, the second time may be earlier than the first time, that is, before the UE triggers the cross-network movement, the core network user plane network element of the first network stops the transmission of the user plane data of the first network of the UE. Alternatively, the second time may overlap the first time, to be specific, when the UE starts the cross-network movement, the core network user plane network element of the first network stops the transmission of the user plane data of the first network of the UE. Alternatively, the second time may be later than the first time, that is, in a period of time after the UE starts the cross-network movement, the core network user plane network element of the first network stops the transmission of the user plane data of the first network of the UE.

It may be understood that, compared with that a network side does not know that the UE triggers the cross-network movement and continues to send data, any of the foregoing manners can reduce the air interface packet loss rate, and can reduce the data backhaul amount. Preferably, the second time is earlier than the first time, or the second time is equal to the first time.

With reference to the second aspect, in some implementations of the second aspect, the first message received by the core network control plane network element of the first network is a non-access stratum NAS message from the terminal device, and after the core network control plane network element of the first network receives the third message from the core network user plane network element of the first network, the method further includes: The core network control plane network element of the first network sends a fourth message to the first access network device, where the fourth message carries the following information: the second time, the first time, the cause, the immediate pause indication information, and the proximity indication information.

With reference to the second aspect, in some implementations of the second aspect, after the core network control plane network element of the first network sends the fourth message to the access network device of the first network, the method further includes: The core network control plane network element of the first network receives a NAS message from the terminal device, where the NAS message is used to indicate that the terminal device has moved to the second network; and the core network control plane network element of the first network sends a fifth message to the access network device of the first network, where the fifth message is used to indicate the first access network device to send buffered user plane data of the first network of the terminal device.

With reference to the second aspect, in some implementations of the second aspect, the fifth message further carries one or more of the following information: a device identifier of the terminal device, a session identifier of the PDU session of the first network of the terminal device, a quality of service flow identifier QFI, and a data radio bearer identifier DRB ID.

Optionally, the fifth message carries the session identifier of the PDU session of the first network of the UE, the QFI, the DRB ID, or the like, so that the access network device of the first network can learn of the user plane data of the PDU session whose sending needs to be stopped, and can accurately control the stopping of the user plane data of the PDU session during the cross-network movement of the UE.

With reference to the second aspect, in some implementations of the second aspect, after the core network control plane network element of the first network receives the first message from the terminal device, the method further includes: If the terminal device does not access the second network after third time, the core network control plane network element of the first network queries location information of the terminal device; and the core network control plane network element of the first network manages the cross-network movement of the terminal device based on the location information of the terminal device.

With reference to the second aspect, in some implementations of the second aspect, that the core network control plane network element of the first network manages the cross-network movement of the terminal device based on the location information of the terminal device includes: If the terminal device is located in a source cell or another cell of the first network, the core network control plane network element of the first network queries whether the terminal device still needs to perform the cross-network movement, and performs at least one of the following operations based on a query result: If determining that the terminal device still needs to perform the cross-network movement, an AMF continues to wait for the terminal device to access the second network; or if determining that the terminal device cancels the cross-network movement and the terminal device is currently located in the source cell, the core network control plane network element of the first network notifies the core network user plane network element of the first network and the access network device of the first network to resume the transmission of the user plane data of the first network of the terminal device; or if determining that the terminal device cancels the cross-network movement and the terminal device is currently located in the another cell of the first network, the core network control plane network element of the first network reconfigures a PDU session resource for the terminal device.

Optionally, the access network device of the first network herein may alternatively be an access network device of the second network, or an access network device shared by the first network and the second network.

With reference to the second aspect, in some implementations of the second aspect, that the core network control plane network element of the first network manages the cross-network movement of the terminal device based on the location information of the terminal device includes: If determining that the terminal device has accessed the second network, the core network control plane network element of the first network continues to wait.

With reference to the second aspect, in some implementations of the second aspect, that the core network control plane network element of the first network manages the cross-network movement of the terminal device based on the location information of the terminal device includes: If the terminal device is not found, the core network control plane network element of the first network notifies the network element of the second network to initiate paging for the terminal device in the second network, and performs at least one of the following operations based on a paging result:

If it is paged that the terminal device has moved to the second network, the core network control plane network element of the first network continues to wait for the terminal device to access the second network; or if the terminal device is not paged in the second network, the core network control plane network element of the first network pages the terminal device in the first network. If the terminal device is still not paged in the first network, the core network control plane network element of the first network waits for a period of time, releases a context of the terminal device, and notifies the access network device of the first network and the core network user plane network element of the first network to release the context of the first network of the terminal device.

After the UE notifies the core network control plane network element of the first network that the UE is to trigger the cross-network movement, if the UE does not move to the second network or does not access the second network, the core network control plane network element of the first network queries a location of the UE, and performs corresponding processing based on different locations of the UE, to optimize the cross-network movement procedure of the UE.

With reference to the second aspect, in some implementations of the second aspect, that the core network control plane network element of the first network queries location information of the terminal device includes: The core network control plane network element of the first network sends a location reporting control message to an N3IWF, the access network device of the first network, or the access network device of the second network, where the location reporting control message is used to query the location information of the terminal device. The method further includes: The core network control plane network element of the first network receives a location report from the N3IWF, the access network device of the first network, or the access network device of the second network, where the location report carries the location information of the terminal device.

The core network control plane network element of the first network may query the location information of the UE in a plurality of ways, to improve flexibility of querying the location information of the UE.

With reference to the second aspect, in some implementations of the second aspect, that the core network control plane network element of the first network notifies the core network user plane network element of the first network and the access network device of the first network to resume the transmission of the user plane data of the first network of the terminal device includes: The core network control plane network element of the first network sends a resume message to the core network user plane network element of the first network and the access network device of the first network, where the resume message carries one or more of the following information: the session identifier of the PDU session of the first network of the terminal device, the device identifier of the terminal device, a cause for resuming the transmission, and information indicating whether to immediately resume the transmission.

According to a third aspect, a data transmission method is provided. The method includes: An access network device of a first network receives a first RRC message from a terminal device, where the first RRC message is used to indicate that the terminal device is to move from the first network to a second network; and the access network device of the first network sends a first message to a core network control plane network element of the first network, where the first message is used to indicate to the core network control plane network element of the first network that the terminal device is to move from the first network to the second network, where the first network is a public network and the second network is a non-public network, or the first network is a non-public network and the second network is a public network.

In this technical solution of this application, when the UE needs to perform cross-network movement from the first network to the second network, the UE notifies the access network device of the first network that the UE is to perform the cross-network movement. The access network device of the first network further notifies the core network control plane network element of the first network, and then the core network control plane network element of the first network notifies a core network user plane network element of the first network, so that the core network user plane network element of the first network pauses transmission of user plane data of a PDU session of the first network of the UE, to prevent air interface packet loss during the cross-network movement of the UE and data backhaul of the network after the movement of the UE that are caused because the core network user plane network element of the first network continues to send the user plane data of the PDU session of the first network of the UE during the cross-network movement of the UE, thereby reducing an air interface packet loss rate during the cross-network movement of the UE and a data backhaul amount of the network after the movement of the UE.

With reference to the third aspect, in some implementations of the third aspect, the first RRC message and the first message further carry one or more of the following information: first time information, a cause, immediate pause indication information, or proximity indication information, where the first time information is used to indicate that the terminal device is to trigger the cross-network movement after first time; the cause is used to indicate the cross-network movement; the immediate pause indication information is used to indicate whether to immediately pause the transmission of the user plane data of the first network of the terminal device.

In addition, the proximity indication information is used to indicate that the terminal device is entering or leaving a neighboring area of one or more cells of a non-public network, or the proximity indication information is used to indicate that the terminal device is entering or leaving one or more cells of a non-public network.

With reference to the third aspect, in some implementations of the third aspect, the method further includes: The access network device of the first network receives a fourth message from the core network control plane network element of the first network, where the fourth message carries second time information, and the second time information is used to indicate that the core network user plane network element of the first network is to pause the transmission of the user plane data of the first network of the terminal device after second time.

With reference to the third aspect, in some implementations of the third aspect, after the access network device of the first network receives the fourth message from the core network control plane network element of the first network, the method further includes: The access network device of the first network sends a second RRC message to the terminal, where the second RRC message carries the second time information, and the second time information is used to indicate that the core network user plane network element of the first network is to pause the transmission of the user plane data of the first network of the terminal device after the second time; and the access network device of the first network still retains a context of the first network of the terminal device after the first time or the second time.

With reference to the third aspect, in some implementations of the third aspect, after the access network device of the first network sends the second RRC message to the terminal device, the method further includes: The access network device of the first network receives a fifth message from the core network control plane network element of the first network, where the fifth message is used to indicate the access network device of the first network to send buffered user plane data of the first network of the terminal device.

With reference to the third aspect, in some implementations of the third aspect, the method further includes: The access network device of the first network does not send data to the terminal device after the first time based on the first time information; and after receiving a notification from the core network control plane network element of the first network for resuming the transmission of the user plane data of the first network of the terminal device, the access network device of the first network resumes the context of the first network of the terminal device, and sends a third RRC message to the terminal, where the third RRC message is used to notify the terminal device to resume the context of the first network, and the third RRC message carries one or more of the following information: a session identifier of the PDU session of the first network of the terminal device, a device identifier of the terminal device, a cause for resuming the transmission, and information indicating whether to immediately resume the transmission.

The access network device of the first network does not send the user plane data of the first network to the UE after the first time based on the first time information, so that the data backhaul amount after the UE accesses the second network can be reduced.

According to a fourth aspect, this application provides a data transmission method. The method includes: A core network user plane network element of a first network receives a second message from a core network control plane network element of the first network, where the second message is used to indicate the core network user plane network element of the first network to pause transmission of user plane data of the first network of a terminal device; and the core network user plane network element of the first network sends a third message to the core network control plane network element of the first network, where the third message is used to indicate that the core network user plane network element of the first network is to pause the transmission of the user plane data of the first network of the terminal device.

In this technical solution of this application, the core network user plane network element of the first network receives the second message from the core network control plane network element of the first network, to learn that the UE is to perform cross-network movement. The core network user plane network element of the first network may pause transmission of user plane data of a PDU session of the first network of the UE, to prevent air interface packet loss during the movement of the UE and data backhaul of the network after the movement of the UE that are caused because the core network user plane network element of the first network continues to send the user plane data of the PDU session of the first network of the UE during the cross-network movement of the UE, thereby reducing an air interface packet loss rate during the cross-network movement of the UE and a data backhaul amount of the network after the movement of the UE.

With reference to the fourth aspect, in some implementations of the fourth aspect, the third message further carries one or more of the following information: first time information, a cause, immediate pause indication information, or proximity indication information, where the first time information is used to indicate that the terminal device is to trigger the cross-network movement after first time; the cause is used to indicate the cross-network movement; the immediate pause indication information is used to indicate whether to immediately pause the transmission of the user plane data of the first network of the terminal device; and the proximity indication information is used to indicate that the terminal device is entering or leaving a neighboring area of one or more cells of a non-public network, or the proximity indication information is used to indicate that the terminal device is entering or leaving one or more cells of a non-public network; and the first network is a public network and the second network is a non-public network, or the first network is a non-public network and the second network is a public network.

In addition, the proximity indication information may carry one or more of the following information: information indicating that the terminal device is entering the neighboring area of the one or more cells of the non-public network, information indicating that the terminal device is leaving the neighboring area of the one or more cells of the non-public network, information indicating that the terminal device is entering the one or more cells of the non-public network, information indicating that the terminal device is leaving the one or more cells of the non-public network, or identifier information of the one or more cells. For example, character strings entering and leaving are respectively used to indicate entering and leaving, an absolute radio frequency channel number ARFCN of the cell is used to identify the cell, or a cell ID is used to identify the cell.

With reference to the fourth aspect, in some implementations of the fourth aspect, the third message carries second time information, and the second time information is used to indicate that the core network user plane network element of the first network is to pause the transmission of the user plane data of the first network of the terminal device after second time; and the core network user plane network element of the first network still retains a context of the first network of the terminal device after the first time or the second time based on the obtained first time information and second time information.

According to a fifth aspect, this application provides a data transmission method. The method includes: A terminal device accesses a second network through a first network; and when the terminal device needs to move from the first network to the second network, the terminal device sends a first message to a core network control plane network element of the second network, where the first message is used to indicate that the terminal device is to move from the first network to the second network, where the first network is a public network and the second network is a non-public network, or the first network is anon-public network and the second network is a public network.

In this technical solution of this application, after accessing the first network, when needing to perform cross-network movement from the first network to the second network, the UE notifies the core network control plane network element of the second network that the UE is to trigger the cross-network movement. In this way, the core network control plane network element of the second network notifies a core network user plane network element of the second network that the UE is to perform the cross-network movement, so that the core network user plane network element of the second network pauses transmission of user plane data of a PDU session of the second network of the UE, to prevent air interface packet loss caused because the core network user plane network element of the second network continues to send the user plane data of the second network of the UE during the cross-network movement of the UE, thereby reducing an air interface packet loss rate during the cross-network movement of the UE.

With reference to the fifth aspect, in some implementations of the fifth aspect, the first message carries one or more of the following information: first time information, a cause, immediate pause indication information, or proximity indication information, where the first time information is used to indicate that the terminal device is to trigger the cross-network movement after first time; the cause is used to indicate the cross-network movement; the immediate pause indication information is used to indicate whether to immediately pause the transmission of the user plane data of the second network of the terminal device; and the proximity indication information is used to indicate that the terminal device is entering or leaving a neighboring area of one or more cells of a non-public network, or the proximity indication information is used to indicate that the terminal device is entering or leaving one or more cells of a non-public network.

With reference to the fifth aspect, in some implementations of the fifth aspect, after the terminal device sends the first message to the core network control plane network element of the second network, the method further includes: The terminal device receives second time information from the core network control plane network element of the second network by using a NAS message, where the second time information is used to indicate that the core network user plane network element of the second network is to pause the transmission of the user plane data of the second network of the terminal device after second time; and the terminal device still retains a context of the second network after the first time or the second time.

After learning that the terminal device triggers the cross-network movement after the first time, a network side notifies the terminal device that the core network user plane network element of the second network is to pause the transmission of the user plane data of the second network of the terminal device after the second time. The terminal device still retains the context of the second network after the first time or the second time, to prevent the UE from prematurely releasing the context of the second network of the UE.

With reference to the fifth aspect, in some implementations of the fifth aspect, the method further includes: The terminal device sends the second time to an access network device of the first network by using an RRC message.

With reference to the fifth aspect, in some implementations of the fifth aspect, after the terminal device accesses the second network, the method further includes: The terminal device sends a NAS message to a core network control plane network element of the first network, where the NAS message is used to notify to send buffered user plane data of the second network of the terminal device.

After accessing the second network, the terminal device sends the NAS message to the core network control plane network element of the first network, so that a core network of the first network learns of a state that the UE has accessed the second network, and can backhaul the buffered context of the second network of the UE to the UE in time.

According to a sixth aspect, this application provides a data transmission method. The method includes: A core network control plane network element of a second network receives a sixth message from a terminal device, where the terminal device is located in a first network, and the sixth message is used to indicate that the terminal device is to move from the first network to the second network; and the first network is a public network and the second network is a non-public network, or the first network is a non-public network and the second network is a public network; and a core network control device of the second network sends a seventh message to a core network user plane network element of the second network, where the seventh message is used to indicate the core network user plane network element of the second network to pause transmission of user plane data of the second network of the terminal device.

In this technical solution of this application, when needing to perform cross-network movement from the first network to the second network, the UE may notify the core network control plane network element of the second network that the UE is to perform the cross-network movement. In this way, the core network control plane network element of the second network notifies the core network user plane network element of the second network that the UE is to perform the cross-network movement, so that the core network user plane network element of the second network pauses transmission of user plane data of a PDU session of the second network of the UE, to prevent air interface packet loss during the movement of the UE and data backhaul of the network after the movement of the UE that are caused because the core network user plane network element of the second network continues to send the user plane data of the second network of the UE during the cross-network movement of the UE, thereby reducing an air interface packet loss rate during the cross-network movement of the UE and a data backhaul amount of the network after the movement of the UE.

With reference to the method according to the first aspect, it should be noted that when the UE needs to move from the first network to the second network, the UE may notify a core network control plane network element of the first network and the core network control plane network element of the second network that the UE is to perform the cross-network movement. Further, the core network control plane network element of the first network determines, depending on whether the UE establishes a PDU session of the first network, whether transmission of user plane data of the PDU session of the first network of the UE needs to be stopped. Similarly, the core network control plane network element of the second network determines, depending on whether the UE establishes a PDU session of the second network, whether transmission of user plane data of the PDU session of the second network of the UE needs to be stopped.

It may be understood that if the UE establishes the PDU session of the first network and the PDU session of the second network by using the first network when the UE is in the first network, a core network user plane network element of the first network is to stop the transmission of the user plane data of the PDU session of the first network of the UE, and the core network user plane network element of the second network is to stop the transmission of the user plane data of the PDU session of the second network of the UE.

With reference to the sixth aspect, in some implementations of the sixth aspect, the sixth message further carries one or more of the following information: first time information, a cause, immediate pause indication information, or proximity indication information, where the first time information is used to indicate that the terminal device is to trigger the cross-network movement after first time; the cause is used to indicate the cross-network movement; the immediate pause indication information is used to indicate whether to immediately pause the transmission of the user plane data of the second network of the terminal device; and the proximity indication information is used to indicate that the terminal device is entering or leaving a neighboring area of one or more cells of a non-public network, or the proximity indication information is used to indicate that the terminal device is entering or leaving one or more cells of a non-public network.

With reference to the sixth aspect, in some implementations of the sixth aspect, after the core network control plane network element of the second network sends the seventh message to the core network user plane network element of the second network, the method further includes: The core network control plane network element of the second network receives an eighth message from the core network user plane network element of the second network, where the eighth message carries second time information, and the second time information is used to indicate that the core network user plane network element of the second network is to pause the transmission of the user plane data of the second network of the terminal device after second time; and the core network control plane network element of the second network still retains a context of the second network of the terminal device after the first time or the second time.

With reference to the sixth aspect, in some implementations of the sixth aspect, after the core network control plane network element of the second network receives the eighth message from the core network user plane network element of the second network, the method further includes: The core network control plane network element of the second network sends the second time information to the terminal device by using a NAS message, so that the terminal device notifies an access network device of the first network of the second time; or the core network control plane network element of the second network sends the second time information to a non-3rd generation partnership project interworking function N3IWF, so that the N3IWF notifies the access network device of the first network of the second time, or the N3IWF notifies the terminal device of the second time, and then the terminal device notifies the access network device of the first network of the second time.

With reference to the sixth aspect, in some implementations of the sixth aspect, the seventh message further carries one or more of the following information: the first time, the cause, the immediate pause indication information, and the proximity indication information.

With reference to the sixth aspect, in some implementations of the sixth aspect, after the core network control plane network element of the second network receives the sixth message from the terminal device, the method further includes: If the terminal device does not access the second network after third time, the core network control plane network element of the second network queries location information of the terminal device; and the core network control plane network element of the second network manages the cross-network movement of the terminal device based on the location information of the terminal device.

With reference to the sixth aspect, in some implementations of the sixth aspect, that the core network control plane network element of the second network manages the cross-network movement of the terminal device based on the location information of the terminal device includes: If the terminal device is currently located in a source cell or another cell of the first network, the core network control plane network element of the second network queries whether the terminal device still needs to perform the cross-network movement, and performs at least one of the following operations based on a query result: If determining that the terminal device still needs to perform the cross-network movement, the core network control plane network element of the second network continues to wait for the terminal device to access the second network; or if determining that the terminal device cancels the cross-network movement, the core network control plane network element of the second network notifies the core network user plane network element of the second network and the access network device of the first network to resume the transmission of the user plane data of the second network of the terminal device.

Herein, when the core network control plane network element of the second network notifies the access network device of the first network to resume the transmission of the user plane data of the second network of the terminal device, the core network control plane network element of the second network may notify the access network device of the first network in the following manners.

For example, the core network control plane network element of the second network directly notifies the access network device of the first network.

For another example, the core network control plane network element of the second network first notifies the UE, and then the UE notifies the access network device of the first network.

For another example, the core network control plane network element of the second network notifies the core network control plane network element of the first network by using another network element, and then the core network control plane network element of the first network notifies the access network device of the first network. In this case, the access network device may be shared by the first network and the second network.

With reference to the sixth aspect, in some implementations of the sixth aspect, that the core network control plane network element of the second network manages the cross-network movement of the terminal device based on the location information of the terminal device includes: If determining the terminal device has moved to the second network, the core network control plane network element of the second network continues to wait.

With reference to the sixth aspect, in some implementations of the sixth aspect, that the core network control plane network element of the second network manages the cross-network movement of the terminal device based on the location information of the terminal device includes: If the terminal device is not found, the core network control plane network element of the second network notifies a network element of the first network to page the terminal device in the first network, and if the terminal device is not paged in the first network, the core network control plane network element of the second network pages the terminal device in the second network; and if the terminal device is still not paged in the second network, after waiting for a period of time, the core network control plane network element of the second network notifies the access network device of the first network and the core network user plane network element of the second network to release a context of the protocol data unit PDU session of the second network of the terminal device.

Similar to the foregoing descriptions, the core network control plane network element of the second network may directly notify the access network device of the first network, or the core network control plane network element of the second network first notifies the UE, and then the UE notifies the access network device of the first network. Alternatively, the core network control plane network element of the second network first notifies the core network control plane network element of the first network, and then the core network control plane network element of the first network notifies the access network device of the first network.

With reference to the sixth aspect, in some implementations of the sixth aspect, that the core network control plane network element of the second network queries location information of the terminal device includes: The core network control plane network element of the second network sends a location reporting control message to the N3IWF or an access network device of the second network, where the location reporting control message is used to query the location information of the terminal device. The method further includes: The core network control plane network element of the second network receives a location report from the N3IWF or the access network device of the second network, where the location report carries the location information of the terminal device.

With reference to the sixth aspect, in some implementations of the sixth aspect, that the core network control plane network element of the second network notifies the core network user plane network element of the second network and the access network device of the first network to resume the transmission of the user plane data of the second network of the terminal device includes: The core network control plane network element of the second network sends a resume message to the core network user plane network element of the second network and the access network device of the first network, where the resume message carries one or more of the following information: a session identifier of the PDU session of the second network of the terminal device, a device identifier of the terminal device, a cause for resuming the transmission, and information indicating whether to immediately resume the transmission.

Similar to the foregoing descriptions, the core network control plane network element of the second network may directly send the resume message to the access network device of the first network, or the core network control plane network element of the second network first notifies the UE, and then the UE notifies the access network device of the first network to resume the transmission of the user plane data of the second network of the UE. Alternatively, the core network control plane network element of the second network first notifies the core network control plane network element of the first network, and then the core network control plane network element of the first network notifies the access network device of the first network to resume the transmission of the user plane data of the second network of the UE.

According to a seventh aspect, this application provides a data transmission method. The method includes: A core network user plane network element of a second network receives a seventh message from a core network control plane network element of the second network, where the seventh message is used to indicate the core network user plane network element of the second network to pause transmission of user plane data of the second network of the terminal device; and the core network user plane network element of the second network returns an eighth message to the core network control plane network element of the second network, where the eighth message is used to indicate that the core network user plane network element of the second network is to pause the transmission of the second network user plane data of the terminal device.

In this technical solution of this application, the core network user plane network element of the second network receives the seventh message from the core network control plane network element of the second network, to learn that the UE is to perform cross-network movement. The core network user plane network element of the second network may pause the transmission of the user plane data of the second network of the UE, to prevent air interface packet loss caused because the core network user plane network element of the second network continues to send user plane data of a PDU session of the second network of the UE during the cross-network movement of the UE, thereby reducing an air interface packet loss rate during the cross-network movement of the UE.

With reference to the seventh aspect, in some implementations of the seventh aspect, the eighth message carries second time information, and the second time information is used to indicate that the core network user plane network element of the second network is to pause the transmission of the user plane data of the second network of the terminal device after second time.

With reference to the seventh aspect, in some implementations of the seventh aspect, the eighth message further carries one or more of the following information: first time information, a cause, immediate pause indication information, or proximity indication information, where the first time information is used to indicate that the terminal device is to trigger the cross-network movement after first time; the cause is used to indicate the cross-network movement; the immediate pause indication information is used to indicate whether to immediately pause the transmission of the user plane data of the second network of the terminal device; and the proximity indication information is used to indicate that the terminal device is entering or leaving a neighboring area of one or more cells of a non-public network, or the proximity indication information is used to indicate that the terminal device is entering or leaving one or more cells of a non-public network; and the first network is a public network and the second network is a non-public network, or the first network is a non-public network and the second network is a public network. In addition, the method further includes: The core network user plane network element of the second network retains a context of the second network of the terminal device after the first time or the second time.

According to an eighth aspect, this application provides a communication apparatus. The communication apparatus has a function of implementing the method according to any one of the first aspect or the possible implementations of the first aspect, or the communication apparatus has a function of implementing the method according to any one of the fifth aspect or the possible implementations of the fifth aspect. The function may be implemented by hardware, or may be implemented by hardware executing corresponding software. The hardware or the software includes one or more units corresponding to the function.

Optionally, the communication apparatus has the function of implementing the method according to any one of the first aspect or the possible implementations of the first aspect.

The communication apparatus includes a processing unit and a transceiver unit. The processing unit is configured to: enable the communication apparatus to access a first network; and when determining that the communication apparatus needs to move from the first network to a second network, control the transceiver unit to send a first message to a core network control plane network element of the first network or send a first RRC message to an access network device of the first network, where the first message or the first RRC message is used to indicate that the communication apparatus 4000 is to move from the first network to the second network; and the first network is a public network and the second network is a non-public network, or the first network is a non-public network and the second network is a public network.

Optionally, in an implementation, the transceiver unit is further configured to receive a second RRC message from the access network device of the first network, where the second RRC message carries second time information, and the second time information is used to indicate that a core network user plane network element of the first network is to pause transmission of user plane data of the first network of the communication apparatus after second time; or the transceiver unit is further configured to receive a NAS message from the core network control plane network element of the first network, where the NAS message carries the second time information; and the processing unit is further configured to still retain a context of the first network after first time or the second time.

Optionally, in an implementation, the transceiver unit is further configured to send a NAS message to the core network control plane network element of the first network, where the NAS message is used to indicate that the communication apparatus has accessed the second network; and the transceiver unit is further configured to receive a third RRC message from the access network device of the first network, where the third RRC message carries one or more of the following information: a session identifier of a PDU session of the first network of the communication apparatus, a device identifier of the communication apparatus, a cause for resuming the transmission, or information indicating whether to immediately resume the transmission; and the processing unit is further configured to resume the context of the first network based on the third RRC message.

Optionally, the communication apparatus has the function of implementing the method according to any one of the fifth aspect or the possible implementations of the fifth aspect. The communication apparatus includes a processing unit and a transceiver unit. The processing unit is configured to enable the communication apparatus to access to a second network by using a first network. The processing unit is further configured to: when determining that the terminal device needs to move from the first network to the second network, control the transceiver unit to send a first message to a core network control plane network element of the second network, where the first message is used to indicate that the terminal device is to move from the first network to the second network; and the first network is a public network and the second network is a non-public network, or the first network is a non-public network and the second network is a public network.

Optionally, in an implementation, the transceiver unit is further configured to receive a NAS message from the core network control plane network element of the second network, where the NAS message carries second time information, and the second time information is used to indicate that a core network user plane network element of the second network is to pause transmission of user plane data of the second network of the terminal device after second time; and the processing unit is further configured to retain a context of the second network after first time or the second time.

Optionally, in an implementation, the transceiver unit is further configured to send an RRC message to an access network device of the first network, where the RRC message carries the second time information.

Optionally, in an implementation, the transceiver unit is further configured to send a NAS message to a core network control plane network element of the first network, where the NAS message is used to notify to send buffered user plane data of the second network of the terminal device.

According to a ninth aspect, this application provides a communication apparatus. The communication apparatus has a function of implementing the method according to any one of the second aspect or the possible implementations of the second aspect, or the communication apparatus has a function of implementing the method according to any one of the sixth aspect or the possible implementations of the sixth aspect. The function may be implemented by hardware, or may be implemented by hardware executing corresponding software. The hardware or the software includes one or more units corresponding to the function.

Optionally, the communication apparatus has the function of implementing the method according to any one of the second aspect or the possible implementations of the second aspect. The communication apparatus includes a receiving unit and a sending unit. The receiving unit is configured to receive a first message, where the first message is used to indicate that a terminal device is to move from a first network to a second network; and the first network is a public network and the second network is a non-public network, or the first network is a non-public network and the second network is a public network. The sending unit is configured to send a second message to a core network user plane network element of the first network, where the second message is used to indicate the core network user plane network element of the first network to pause transmission of user plane data of the first network of the terminal device.

Optionally, in an implementation, the receiving unit is further configured to receive a third message from the core network user plane network element of the first network, where the third message carries second time information, and the second time information is used to indicate that the core network user plane network element of the first network is to pause the transmission of the user plane data of the first network of the terminal device after second time; and the communication apparatus further includes a processing unit, configured to retain a context of the first network of the terminal device after first time or the second time.

Optionally, in an implementation, the receiving unit is specifically configured to receive the first message from an access network device of the first network, and the sending unit is further configured to send a fourth message to the access network device of the first network, where the fourth message carries the second time information, and the fourth message is used to notify the access network device of the first network that a core network control plane network element of the first network is to pause the transmission of the user plane data of the first network of the terminal device after the second time.

Optionally, in an implementation, the receiving unit is configured to receive a NAS message from the terminal device, where the NAS message is the first message; and the sending unit is further configured to send a fourth message to the first access network device, where the fourth message carries the following information: the second time information, first time information, a cause, an immediate pause indication information, and a proximity indication information.

Optionally, in an implementation, the receiving unit is further configured to receive a NAS message from the terminal device, where the NAS message is used to indicate that the terminal device has moved to the second network and accessed the second network; and the sending unit is further configured to send a fifth message to the access network device of the first network, where the fifth message is used to indicate the first access network device to send buffered user plane data of the first network of the terminal device.

Optionally, the communication apparatus has the function of implementing the method according to any one of the sixth aspect or the possible implementations of the sixth aspect. The communication apparatus includes a receiving unit and a sending unit.

Optionally, the communication apparatus has the function of implementing the method according to any one of the sixth aspect or the possible implementations of the sixth aspect. The communication apparatus includes a receiving unit and a sending unit. The receiving unit is configured to receive a sixth message from a terminal device, where the terminal device is located in a first network, and the sixth message is used to indicate that the terminal device is to move from the first network to a second network. The sending unit is configured to send a seventh message to a core network user plane network element of the second network, where the seventh message is used to indicate the core network user plane network element of the second network to pause transmission of user plane data of the second network of the terminal device.

Optionally, in an implementation, the receiving unit is further configured to receive an eighth message from the core network user plane network element of the second network, where the eighth message carries second time information, and the second time information is used to indicate that the core network user plane network element of the second network is to pause the transmission of the user plane data of the second network of the terminal device after second time; and a processing unit is further configured to retain a context of the second network of the terminal device after first time or the second time.

Optionally, in an implementation, the sending unit is further configured to send the second time information to the terminal device, or send the second time information to an N3IWF.

According to a tenth aspect, this application provides a communication apparatus. The communication apparatus has a function of implementing the method according to any one of the third aspect or the possible implementations of the third aspect. The function may be implemented by hardware, or may be implemented by hardware executing corresponding software. The hardware or the software includes one or more units corresponding to the function.

The communication apparatus includes a receiving unit and a sending unit. The receiving unit is configured to receive a first RRC message from a terminal device, where the first RRC message is used to indicate that the terminal device is to move from a first network to a second network. The sending unit is configured to send a first message to a core network control plane network element of the first network, where the first message is used to indicate to the core network control plane network element of the first network that the terminal device is to move from the first network to the second network; and the first network is a public network and the second network is a non-public network, or the first network is a non-public network and the second network is a public network.

Optionally, in an implementation, the receiving unit is further configured to receive a fourth message from the core network control plane network element of the first network, where the fourth message carries second time information, and the second time information is used to indicate that a core network user plane network element of the first network is to pause transmission of user plane data of the first network of the terminal device after second time.

Optionally, in an implementation, the sending unit is further configured to send a second RRC message to the terminal, where the second RRC message carries the second time information, and the second time information is used to indicate that the core network user plane network element of the first network is to pause the transmission of the user plane data of the first network of the terminal device after the second time; and the communication apparatus further includes a processing unit, configured to retain a context of the first network of the terminal device after first time or the second time.

Optionally, in an implementation, the receiving unit is further configured to receive a fifth message from the core network control plane network element of the first network, where the fifth message is used to indicate an access network device of the first network is to send buffered user plane data of the first network of the terminal device.

Optionally, in an implementation, the processing unit is further configured to control, based on first time information, the sending unit not to send data to the terminal device after the first time.

Optionally, in an implementation, the receiving unit is further configured to receive a notification from the core network control plane network element of the first network for resuming the transmission of the user plane data of the first network of the terminal device; the processing unit is further configured to resume the context of the first network of the terminal device based on the notification; and the processing unit is further configured to control the sending unit to send a third RRC message to the terminal, where the third RRC message is used to notify the terminal device to resume the context of the first network, and the third RRC message carries one or more of the following information: a session identifier of a PDU session of the first network of the terminal device, a device identifier of the terminal device, a cause for resuming the transmission, and information indicating whether to immediately resume the transmission.

According to an eleventh aspect, this application provides a communication apparatus. The communication apparatus has a function of implementing the method according to any one of the fourth aspect or the possible implementations of the fourth aspect, and/or the communication apparatus has a function of implementing the method according to any one of the seventh aspect or the possible implementations of the seventh aspect. The function may be implemented by hardware, or may be implemented by hardware executing corresponding software. The hardware or the software includes one or more units corresponding to the function.

Optionally, the communication apparatus has the function of implementing the method according to any one of the fourth aspect or the possible implementations of the fourth aspect. The communication apparatus includes a receiving unit and a sending unit. The receiving unit is configured to receive a second message from a core network control plane network element of a first network, where the second message is used to indicate a core network user plane network element of the first network to pause transmission of user plane data of the first network of a terminal device. The sending unit is configured to return a third message to the core network control plane network element of the first network, where the third message is used to indicate that the core network user plane network element of the first network is to pause the transmission of the user plane data of the first network of the terminal device.

Optionally, in an implementation, the communication apparatus further includes a processing unit, configured to retain a context of the first network of the terminal device after first time or second time based on first time information and second time information.

Optionally, the communication apparatus has the function of implementing the method according to any one of the seventh aspect or the possible implementations of the seventh aspect. The communication apparatus includes a receiving unit and a sending unit. The receiving unit is configured to receive a seventh message from a core network control plane network element of a second network, where the seventh message is used to indicate a core network user plane network element of the second network to pause transmission of user plane data of the second network of a terminal device. The sending unit is configured to return an eighth message to the core network control plane network element of the second network, where the eighth message is used to indicate that the core network user plane network element of the second network is to pause the transmission of the user plane data of the second network of the terminal device.

According to a twelfth aspect, this application provides a terminal device, including a processor and a memory. The memory is configured to store a computer program, and the processor is configured to invoke and run the computer program stored in the memory, so that the terminal device performs the method according to any one of the first aspect or the possible implementations of the first aspect, or performs the method according to any one of the fifth aspect or the possible implementations of the fifth aspect.

According to a thirteenth aspect, this application provides a network device, including a processor and a memory. The memory is configured to store a computer program, and the processor is configured to invoke and run the computer program stored in the memory, so that the network device performs the method according to any one of the second aspect or the possible implementations of the second aspect, or performs the method according to any one of the sixth aspect or the possible implementations of the sixth aspect.

According to a fourteenth aspect, this application provides a network device, including a processor and a memory. The memory is configured to store a computer program, and the processor is configured to invoke and run the computer program stored in the memory, so that the network device performs the method according to any one of the third aspect or the possible implementations of the third aspect.

According to a fifteenth aspect, this application provides a network device, including a processor and a memory. The memory is configured to store a computer program, and the processor is configured to invoke and run the computer program stored in the memory, so that the network device performs the method according to any one of the fourth aspect or the possible implementations of the fourth aspect, or performs the method according to any one of the seventh aspect or the possible implementations of the seventh aspect.

According to a sixteenth aspect, this application provides a computer-readable storage medium. The computer-readable storage medium stores computer instructions. When the computer instructions are run on a computer, the computer is enabled to perform the method according to any one of the first aspect or the possible implementations of the first aspect, or perform the method according to any one of the fifth aspect or the possible implementations of the fifth aspect.

According to a seventeenth aspect, this application provides a computer-readable storage medium. The computer-readable storage medium stores computer instructions. When the computer instructions are run on a computer, the computer is enabled to perform the method according to any one of the second aspect or the possible implementations of the second aspect, or perform the method according to any one of the sixth aspect or the possible implementations of the sixth aspect.

According to an eighteenth aspect, this application provides a computer-readable storage medium. The computer-readable storage medium stores computer instructions. When the computer instructions are run on a computer, the computer is enabled to perform the method according to any one of the third aspect or the possible implementations of the third aspect.

According to a nineteenth aspect, this application provides a computer-readable storage medium. The computer-readable storage medium stores computer instructions. When the computer instructions are run on a computer, the computer is enabled to perform the method according to any one of the fourth aspect or the possible implementations of the fourth aspect, or perform the method according to any one of the seventh aspect or the possible implementations of the seventh aspect.

According to a twentieth aspect, this application provides a chip, including a processor. The processor is configured to read and execute a computer program stored in a memory, to perform the method according to any one of the first aspect or the possible implementations of the first aspect, or perform the method according to any one of the fifth aspect or the possible implementations of the fifth aspect.

Optionally, the chip further includes the memory, and the memory and the processor are connected through a circuit or a wire.

Further, optionally, the chip further includes a communication interface.

According to a twenty-first aspect, this application provides a chip, including a processor. The processor is configured to read and execute a computer program stored in a memory, to perform the method according to any one of the second aspect or the possible implementations of the second aspect, or perform the method according to any one of the sixth aspect or the possible implementations of the sixth aspect.

Optionally, the chip further includes the memory, and the memory and the processor are connected through a circuit or a wire.

Further, optionally, the chip further includes a communication interface.

According to a twenty-second aspect, this application provides a chip, including a processor. The processor is configured to read and execute a computer program stored in a memory, to perform the method according to any one of the third aspect or the possible implementations of the third aspect.

Optionally, the chip further includes the memory, and the memory and the processor are connected through a circuit or a wire.

Further, optionally, the chip further includes a communication interface.

According to a twenty-third aspect, this application provides a chip, including a processor. The processor is configured to read and execute a computer program stored in a memory, to perform the method according to any one of the fourth aspect or the possible implementations of the fourth aspect, or perform the method according to any one of the seventh aspect or the possible implementations of the seventh aspect.

Optionally, the chip further includes the memory, and the memory and the processor are connected through a circuit or a wire.

Further, optionally, the chip further includes a communication interface.

According to a twenty-fourth aspect, this application provides a computer program product. The computer program product includes computer program code. When the computer program code runs on a computer, the computer is enabled to perform the method according to any one of the first aspect or the possible implementations of the first aspect, or perform the method according to any one of the fifth aspect or the possible implementations of the fifth aspect.

According to a twenty-fifth aspect, this application provides a computer program product. The computer program product includes computer program code. When the computer program code runs on a computer, the computer is enabled to perform the method according to any one of the second aspect or the possible implementations of the second aspect, or perform the method according to any one of the sixth aspect or the possible implementations of the sixth aspect.

According to a twenty-sixth aspect, this application provides a computer program product. The computer program product includes computer program code. When the computer program code runs on a computer, the computer is enabled to perform the method according to any one of the third aspect or the possible implementations of the third aspect.

According to a twenty-seventh aspect, this application provides a computer program product. The computer program product includes computer program code. When the computer program code runs on a computer, the computer is enabled to perform the method according to any one of the fourth aspect or the possible implementations of the fourth aspect, or perform the method according to any one of the seventh aspect or the possible implementations of the seventh aspect.

According to a twenty-eighth aspect, this application provides a communication system, including two or more of the terminal device according to the twelfth aspect, the network device according to the thirteenth aspect, the network device according to the fourteenth aspect, and the network device according to the fifteenth aspect.

In an example, in the communication system, after the terminal device accesses a first network, when needing to move from the first network to a second network, the terminal device sends a first message to a core network control plane network element of the first network or sends a first RRC message to an access network device of the first network, where the first message or the first RRC message is used to indicate that the terminal device is to move from the first network to the second network; and the first network is a public network and the second network is a non-public network, or the first network is a non-public network and the second network is a public network.

The core network control plane network element of the first network receives the first message from the terminal device, and sends a second message to a core network user plane network element of the first network, where the second message is used to indicate the core network user plane network element of the first network to pause transmission of user plane data of the first network of the terminal device.

The core network user plane network element of the first network receives the second message from the core network control plane network element of the first network, and returns a third message to the core network control plane network element of the first network, where the third message is used to indicate that the core network user plane network element of the first network is to pause the transmission of the user plane data of the first network of the terminal device.

Optionally, the core network control plane network element may be an AMF, and the core network user plane network element may be a UPF.

DESCRIPTION OF EMBODIMENTS

The following describes technical solutions in this application with reference to the accompanying drawings.

The technical solutions in the embodiments of this application may be applied to various communication systems, for example, a long term evolution (long term evolution, LTE) system, an LTE frequency division duplex (frequency division duplex, FDD) system, an LTE time division duplex (time division duplex, TDD) system, a 5th generation (5th generation, 5G) system, a new radio (new radio, NR) system, or a future communication system.

A terminal device in the embodiments of this application may be user equipment, an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a 5G network, a terminal device in a future evolved public land mobile communication network (public land mobile network, PLMN), or the like. This is not limited in this application.

A radio access network device in the embodiment of this application may be any device having a wireless transceiver function. The access network device includes but is not limited to an evolved NodeB (evolved Node B, eNB), a radio network controller (radio network controller, RNC), a NodeB (Node B, NB), a base station controller (base station controller, BSC), a base transceiver station (base transceiver station, BTS), a home base station (home evolved NodeB, or home Node B, HNB), a baseband unit (baseband unit, BBU), an access point (access point, AP) in a wireless fidelity (wireless fidelity, Wi-Fi) system, a wireless relay node, a wireless backhaul node, a transmission point (transmission point, TP) or a transmission reception point (transmission and reception point, TRP), and the like; or may be a gNB or a transmission point (TRP or TP) in a fifth generation (fifth generation, 5G) system, for example, new radio (new radio, NR), or one antenna panel or a group of antenna panels (including a plurality of antenna panels) of a gNodeB in a 5G system; or may be a network node, for example, a baseband unit (building baseband unit, BBU) or a distributed unit (distributed unit, DU), that constitutes a gNB or a transmission point.

Figure 1:
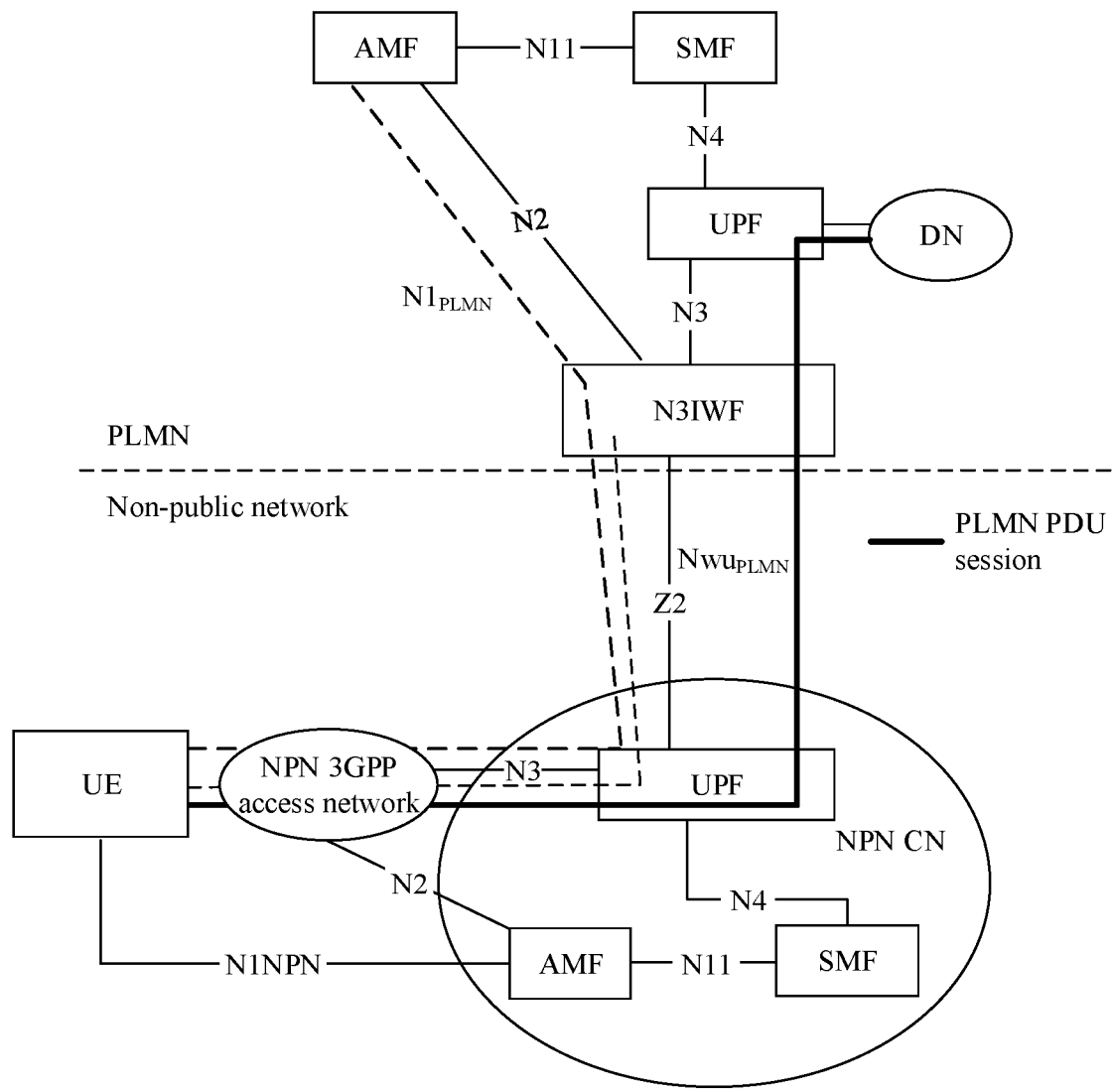
FIG. 1 is an example of a system architecture applicable to an embodiment of this application.

FIG. 1 is an example of a system architecture applicable to an embodiment of this application. As shown in FIG. 1, in NPN standalone networking, each of an NPN and a PLMN has an independent radio access network (radio access network, RAN) and an independent core network (core network, CN). The standalone NPN is considered as a non-3GPP network. The core network of the NPN and the core network of the PLMN are connected by using a non-3GPP interworking function (non-3GPP interworking function, N3IWF) network element, and the N3IWF network element can implement user-plane and control-plane interworking.

Interfaces between network elements in the architecture are shown in FIG. 1. An interface Z2, between the N3IWF and a UPF, shown in FIG. 1 may alternatively be N6. In addition, $Nwu_{PLMN}$ represents an interface between the N3IWF and UE.

It should be noted that the interface names between the network elements shown in FIG. 1 are merely used as examples. In different communication systems or with system evolution, the interfaces between the network elements shown in FIG. 1 may alternatively be different from those shown in FIG. 1. This is not limited herein.

In the architecture shown in FIG. 1, an NPN service of the UE may be provided by using the NPN, or may be provided by using the PLMN. A PLMN service of the UE may be provided by using the PLMN, or may be provided by using the NPN.

The PLMN service is provided for the UE by using the NPN, to be specific, when the UE is in the NPN, a PLMN PDU session resource is established for the UE. A PDU session resource establishment process is a process of configuring a radio resource and a wired resource for transmission of user plane data. PDU session establishment involves a plurality of network elements, for example, an access and mobility management function (access and mobility management function, AMF), a session management function (session management function, SMF), and a user plane function (user plane function, UPF), from a terminal device to a data network (data network, DN), and is an end-to-end configuration process. A process of providing the NPN service for the UE by using the PLMN (namely, a process of establishing an NPN PDU session resource for the UE when the UE is in the PLMN) is similar to a process of providing the PLMN service for the UE by using the NPN.

The PLMN service is provided for the UE by using the PLMN, to be specific, when the UE is in a cell of the PLMN, a radio resource (for example, a DRB) established for a PLMN PDU session of the UE is carried on an access network device of the PLMN (for example, a PLMN NG-RAN). A wired resource (a core network data transmission tunnel) is carried on a core network device (for example, a UPF) of the PLMN. In this case, the process of configuring the PLMN PDU session resource for the UE is the same as a conventional process of establishing a PDU session. Details are not described herein.

The NPN service is provided for the UE by using the PLMN, to be specific, when the UE is in the PLMN, an NPN PDU session resource is established for the UE. A process of providing the PLMN service for the UE by using the NPN (namely, a process of establishing a PLMN PDU session resource for the UE when the UE is in the NPN) is similar to a process of providing the NPN service for the UE by using the PLMN.

The NPN service is provided for the UE by using the NPN (to be specific, when the UE is in the NPN, an NPN PDU session resource is established for the UE). A PDU session resource establishment process is a process of configuring a radio resource and a wired resource for transmission of user plane data. PDU session establishment involves a plurality of network elements (for example, the AMF, the SMF, and the UPF) between the terminal and the DN, and is an end-to-end configuration process. When the UE is located in a cell of the NPN, a radio resource (for example, a DRB) established for the NPN PDU session of the UE is carried on an access network device of the NPN (for example, an NPN NG-RAN, where a 3GPP radio access network is deployed on the NPN, but the 3GPP access network does not belong to the PLMN). A wired resource (a core network data transmission tunnel) is carried on a core network device (for example, a UPF) of the NPN. In this case, the process of configuring the NPN PDU session resource for the UE is the same as a conventional process of establishing a PDU session. Details are not described herein.

Due to mobility of the UE, the UE may move from a private network to a public network or move from a public network to a private network.

For ease of description, in this specification, a network in which the UE is located before the UE moves is defined as a first network, and a network to which the UE is to move is defined as a second network.

As described above, when the UE is located in the first network, the UE may establish a PDU session of the first network by using the first network, or may establish a PDU session of the second network by using the first network; or the UE simultaneously establishes respective PDU sessions in the first network and the second network. One of the first network and the second network is a public network, and the other is a non-public network. For example, the first network is a public network and the second network is a non-public network, or the first network is a non-public network and the second network is a public network.

Scenario 1

The UE accesses the first network. When the UE needs to perform cross-network movement from the first network to the second network, the UE notifies a core network element of the first network that the UE is to trigger the cross-network movement.

Figure 2:
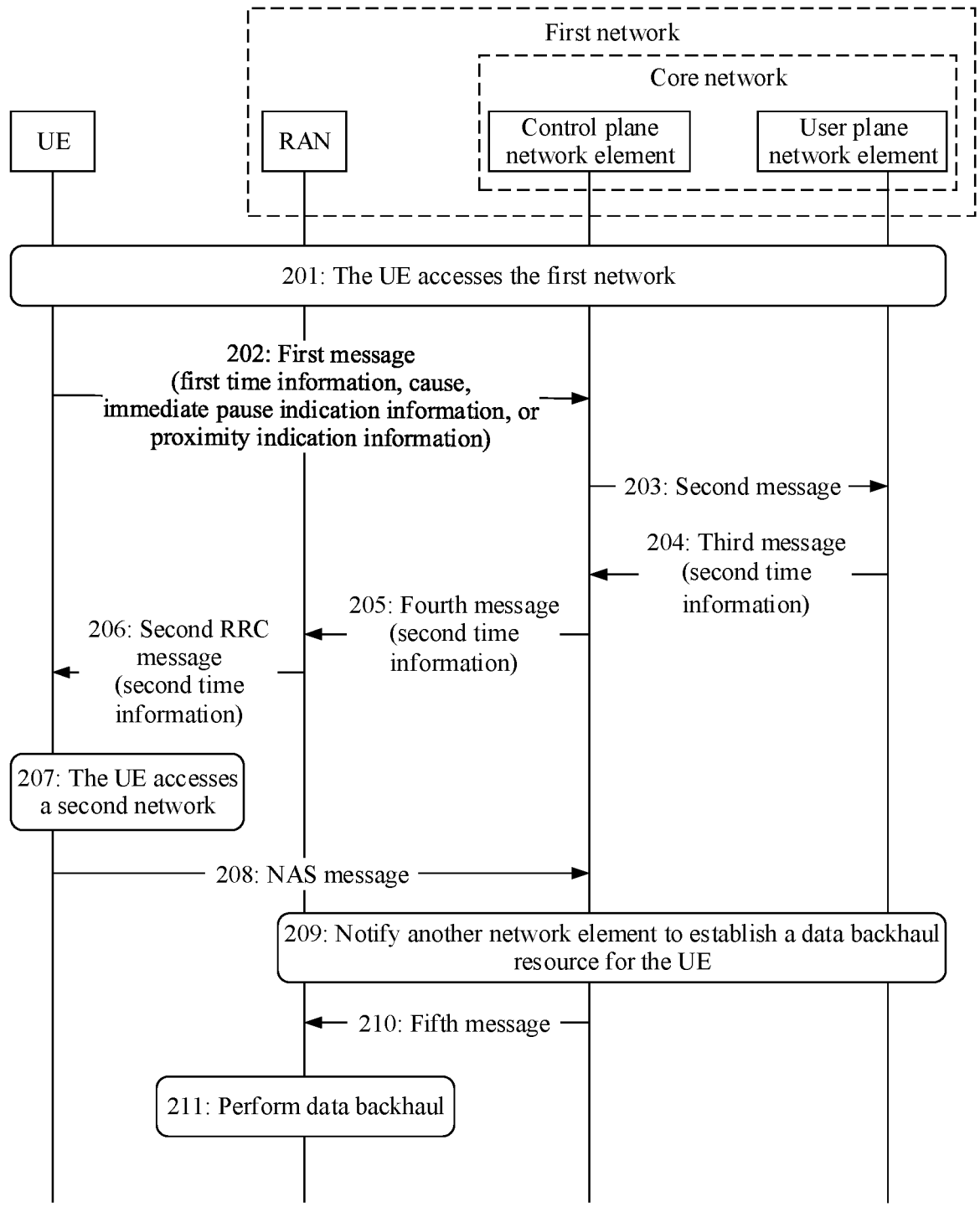
FIG. 2 is an example of a procedure in which UE performs cross-network movement according to this application.

FIG. 2 is an example of a procedure in which the UE performs the cross-network movement.

201: The UE accesses the first network.

Optionally, the UE may establish a PDU session of the first network, or the UE may not establish a PDU session of the first network.

202: When the UE needs to move from the first network to the second network, the UE sends a first message to a core network control plane network element of the first network.

Correspondingly, the core network control plane network element of the first network receives the first message from the UE.

The first message may be used to indicate that the UE is to move from the first network to the second network. In addition, whether the UE needs to move from the first network to the second network may be determined by the UE.

In an implementation, the UE sends a non-access stratum (non-access stratum, NAS) message to the core network control plane network element of the first network, to notify that the UE is to trigger the cross-network movement from the first network to the second network. Specifically, the UE first sends the NAS message to a RAN, and then the RAN forwards the NAS message to the core network control plane network element of the first network.

In another implementation, the UE sends a first RRC message to an access network device of the first network, where the first RRC message is used to notify that the UE is to trigger the cross-network movement. Further, the access network device of the first network sends the first message to the core network control plane network element of the first network, to be specific, the access network device of the first network notifies the core network control plane network element of the first network that the UE is to trigger the cross-network movement.

Optionally, each of the first message and the first RRC message sent by the UE carries one or more of the following information: first time information, a cause (or referred to as a movement cause), immediate pause indication information, or proximity indication information.

The first time information is used to indicate that the UE is to trigger the cross-network movement after first time. The cause is used to indicate the cross-network movement. The immediate pause indication information is used to indicate whether to immediately pause transmission of user plane data of the first network of the UE. The proximity indication information is used to indicate that the UE is entering or leaving a neighboring area of one or more cells of a non-public network, or the proximity indication information is used to indicate that the UE is entering or leaving one or more cells of a non-public network.

In addition, the proximity indication information may carry one or more of the following information: information indicating that the UE is entering the neighboring area of the one or more cells of the non-public network, information indicating that the UE is leaving the neighboring area of the one or more cells of the non-public network, information indicating that the UE is entering the one or more cells of the non-public network, information indicating that the UE is leaving the one or more cells of the non-public network, or identifier information of the one or more cells. For example, character strings entering and leaving are respectively used to indicate entering and leaving, an absolute radio frequency channel number (absolute radio frequency channel number, ARFCN) of the cell is used to identify the cell, or a cell ID is used to identify the cell.

The movement cause may include: NPN to PLMN, PLMN to NPN, non-3GPP to 5GS, 5GS to non-3GPP, NPN to 5GS, 5GS to NPN, or the like.

The NPN may be specifically a standalone NPN (stand alone NPN, SNPN). For example, the movement cause may further include: SNPN to 5GS, SNPN to PLMN, 5GS to SNPN, or PLMN to SNPN.

Optionally, the immediate pause indication information may be in an explicit indication manner or an implicit indication manner.

For example, the immediate pause indication information may be one or more bits. For example, 1 indicates immediate pause, and 0 indicates not immediate pause. For another example, the immediate pause indication information may be a value. The value is compared with a threshold, to determine whether to immediately pause the transmission of the user plane data of the first network of the UE. For example, when the value indicated by the immediate pause indication information is greater than or equal to a specified threshold, it indicates to immediately pause the data transmission. When the value indicated by the immediate pause indication information is less than the specified threshold, it indicates that the data transmission does not need to be immediately paused.

Optionally, in an implementation, the first time (denoted as time1 below) indicated by the first time information also has a function of indicating whether to immediately pause the transmission. For example, when time1 is equal to 0, it indicates to immediately pause the transmission of the user plane data of the first network of the UE. When time1 is not equal to 0, it indicates that the UE triggers the cross-network movement after time1.

In addition, the first message or the first RRC message may further carry the following information: a UE ID, an identifier of the second network to which the UE is to move, an ID of a cell of the second network to which the UE is to move, an ID of an access network device of the second network, an address of an N3IWF to be connected to the UE after the UE moves to the second network, and the like.

For example, the UE moves from the NPN to the PLMN. In addition to the first time information, the cause, the immediate pause indication information, and the proximity indication information, information that may be carried in the first message and the first RRC message may further include one or more of the following:

the UE ID, an ID of the PLMN to which the UE moves, TAC, a PLMN NG-RAN Cell ID, the UE ID, a PLMN NG-RAN Node ID, information about an NPN-N3IWF to be connected to the UE after the UE moves to the PLMN, and the like. Herein, the information about the NPN-N3IWF may be an address of the NPN-N3IWF. If the UE moves from the PLMN to the NPN, an identifier of the NPN may be the PLMN ID and/or a network identifier (network identifier, NID).

Optionally, in an implementation, the UE may indicate, by using an RRC message (for example, an RRC release message or a proximity indication message), a RAN of the first network to retain a context of the UE, and the RAN of the first network further sends a message to indicate the core network control plane network element of the first network to retain the context of the UE. Alternatively, the UE indicates, by using a NAS message (for example, a proximity indication message), the core network control plane network element of the first network to retain a context of the UE, and the core network control plane network element of the first network further sends a message to indicate the RAN of the first network to retain the context of the UE. Alternatively, the UE separately sends an RRC message and a NAS message to the RAN and the core network control plane network element of the first network, and the RAN and the core network control plane network element of the first network retain a context of the UE as indicated by the UE.

The RRC message (for example, the RRC release message or the proximity indication message) may carry one piece of indication information or one indication identifier, and the indication information or the indication identifier is used to indicate the RAN to retain the context of the UE. The RRC message (for example, the RRC release message or the proximity indication message) may further carry a cause (cause), where the cause may be that the UE moves from the first network to the second network, for example, may include: NPN to PLMN, PLMN to NPN, non-3GPP to 5GS, 5GS to non-3GPP, NPN to 5GS, 5GS to NPN, SNPN to 5GS, SNPN to PLMN, 5GS to SNPN, or PLMN to SNPN.

Alternatively, the NAS message sent by the UE to the core network control plane network element of the first network carries the indication information or the indication identifier, the cause, and the like.

After the UE moves to the second network and accesses the second network, the UE notifies the core network control plane network element of the first network to resume the context of the UE. In addition, the UE or the core network control plane network element of the first network may alternatively notify the RAN of the first network to resume the context of the UE. The notification may carry the cause.

Optionally, when the UE needs to move from the first network to the second network, the UE may further send a NAS message (for example, a proximity indication message) to a core network control plane network element of the second network, where the NAS message is used to notify the core network control plane network element of the second network to resume the context of the UE.

The NAS message sent by the UE to the core network control plane network element of the second network may carry the indication information or the indication identifier, the cause, and the like.

After the UE moves to the second network and accesses the second network, the UE sends an RRC message (for example, an RRC resume request message) to a RAN of the second network, where the RRC message is used to indicate to resume the context of the UE. The RAN of the second network further obtains the context of the UE from the core network control plane network element of the second network, and responds to the UE with an RRC message (for example, an RRC Resume message). The RRC message (for example, the RRC resume request message or the RRC Resume message) may further carry the cause (cause).

Alternatively, after accessing the second network, the UE may notify, by using a NAS message, the core network control plane network element of the second network to resume the context of the UE, where the NAS message may carry the cause (cause), and the core network control plane network element of the second network further sends the context of the UE to the RAN of the second network. Then, the RAN of the second network responds to the UE with an RRC message (for example, an RRC Resume message), where the RRC message may carry the cause.

Optionally, in another implementation, before moving from the first network to the second network, the UE sends an RRC message (for example, an RRC release message or a proximity indication message) to the RAN of the first network. The RAN of the first network determines, based on the RRC message (for example, the RRC release message or the proximity indication message), whether to retain the context of the UE, and sends an RRC message (for example, an RRC Release message) to notify the UE whether to retain the context of the UE. Alternatively, the UE sends a NAS message (for example, a proximity indication message) to the core network control plane network element of the first network. The core network control plane network element of the first network determines, based on the NAS message, whether to retain the context of the UE, and separately notifies the RAN of the first network and the UE, or the core network control plane network element of the first network notifies the RAN of the first network whether to retain the context of the UE. Further, the RAN of the first network sends an RRC message (for example, an RRC Release message) to notify the UE.

The RRC message (for example, the RRC release message) may carry one piece of indication information or one indication identifier, and the indication information or the indication identifier is used to indicate the UE to retain the context. The RRC message (for example, the RRC release message) may further carry the cause.

Alternatively, notifications separately sent by the core network control plane network element of the first network to the RAN of the first network and the UE carry the indication information or the indication identifier, the cause, and the like. After the UE moves to the second network and accesses the second network, the UE notifies the core network control plane network element of the first network to resume the context of the UE. In addition, the UE or the core network control plane network element of the first network may alternatively notify the RAN of the first network to resume the context of the UE. The notification may carry the cause.

Optionally, when the UE needs to move from the first network to the second network, the UE may further send a NAS message (for example, a proximity indication message) to the core network control plane network element of the second network, and the core network control plane network element of the second network determines, based on the NAS message, whether to retain the context of the UE, and sends a NAS message to notify the UE whether to retain the context.

The NAS message sent by the core network control plane network element of the second network to the UE may carry one piece of indication information or one indication identifier, and the indication information or the indication identifier is used to indicate the UE to retain the context. The NAS message may further carry the cause.

After the UE moves to the second network and accesses the second network, the UE sends an RRC message (for example, an RRC resume request message) to the RAN of the second network, where the RRC message is used to indicate to resume the context of the UE. The RAN of the second network further obtains the context of the UE from the core network control plane network element of the second network, and responds to the UE with an RRC message (for example, an RRC Resume message). The RRC message (for example, the RRC resume request message or the RRC Resume message) may further carry the cause.

Alternatively, after accessing the second network, the UE may notify, by using a NAS message, the core network control plane network element of the second network to resume the context of the UE, where the NAS message may carry the cause (cause), and the core network control plane network element of the second network further sends the context of the UE to the RAN of the second network. Then, the RAN of the second network responds to the UE with an RRC message (for example, an RRC Resume message), where the RRC message may carry the cause.

203: The core network control plane network element of the first network sends a second message to a core network user plane network element of the first network.

Correspondingly, the core network user plane network element of the first network receives the second message from the core network control plane network element of the first network.

The second message is used to indicate the core network user plane network element of the first network to pause the transmission of the user plane data of the first network of the UE.

It should be noted that there may be no direct interface between the core network control plane network element of the first network and the core network user plane network element of the first network, and forwarding needs to be performed by using a session management network element, for example, a session management function (session management function, SMF). Therefore, a person skilled in the art should understand that the second message received by the core network user plane network element of the first network from the core network control plane network element of the first network is a message sent by the core network control plane network element of the first network and processed by the session management network element.

204: The core network user plane network element of the first network sends a third message to the core network control plane network element of the first network.

Correspondingly, the core network control plane network element of the first network receives the third message from the core network user plane network element of the first network. The third message is used as a response message of the second message.

The third message carries second time information. The second time information is used to indicate that the core network user plane network element of the first network is to pause the transmission of the user plane data of the first network of the UE after second time.

The second time may be later than the first time, or may be equal to the first time, or may be later than the first time. This is not limited herein.

Optionally, the third message may carry one or more of the following information: the first time information, the cause, the immediate pause indication information, the proximity indication information, the UE identifier, and a session identifier of a PDU session established by the UE in the first network.

In addition, the core network user plane network element of the first network still needs to retain the context of the UE after the first time or the second time.

In addition, the core network control plane network element of the first network still needs to retain the context of the UE after the first time or the second time.

It should be noted that when the second time is earlier than the first time, the core network control plane network element and the core network user plane network element of the first network still retain a context of the first network of the UE after the first time. When the second time is later than the first time, the core network control plane network element and the core network user plane network element of the first network still retain the context of the first network of the UE after the second time. When the second time overlaps the first time, the core network control plane network element and the core network user plane network element of the first network still retain the context of the UE after the first time (namely, the second time). In the following descriptions, another network element retains the context of the UE in a similar manner.

Optionally, after 204, the core network control plane network element of the first network further performs 205.

205: The core network control plane network element of the first network sends a fourth message to the access network device of the first network.

Correspondingly, the access network device of the first network receives the fourth message from the core network control plane network element of the first network.

The fourth message is used to notify the access network device of the first network that the core network user plane network element of the first network is to pause the transmission of the user plane data of the first network of the UE after the second time.

In an implementation, in 203, if the core network control plane network element of the first network learns, by receiving the first message from the access network device of the first network, that the UE is to trigger the cross-network movement, the fourth message carries the second time information. In addition, the fourth message further carries one or more of the following information: the first time information, the movement cause, the immediate pause indication information, and the proximity indication information.

It should be noted that if the core network control plane network element of the first network learns, by directly receiving the first message from the UE, that the UE is to move from the first network to the second network, the access network device of the first network does not know that the UE needs to perform the cross-network movement. Therefore, in 205, the core network control plane network element of the first network notifies, by using the fourth message, the access network device of the first network of the first time information, the movement cause, the immediate pause indication information, and the proximity indication information that are related to the cross-network movement of the UE, the second time information, and the like.

In another implementation, in 203, if the core network control plane network element of the first network learns, by directly receiving the first message from the UE, that the UE is to move from the first network to the second network, the fourth message carries the second time information.

In the foregoing two implementations, the fourth message further carries one or more of the following information: the UE ID, the identifier of the PDU session of the first network of the UE, a quality of service flow identifier (quality flow identifier, QFI), and a data radio bearer identifier (data radio bearer identifier, DRB ID).

In addition, the access network device of the first network still needs to retain the context of the UE after the first time or the second time.

In 205, the access network device of the first network receives the fourth message from the core network control plane network element of the first network. Then, the access network device of the first network performs 206.

206: The access network device of the first network sends a second RRC message to the UE.

Correspondingly, the UE receives the second RRC message from the access network device of the first network. The second RRC message carries the second time information.

It may be understood that the second RRC message is used to notify the UE that the core network user plane network element of the first network is to pause the transmission of the user plane data of the first network of the UE after the second time.

In addition, the access network device of the first network does not send data to the UE after the first time based on the first time information. In other words, the access network device of the first network buffers received user plane data of the first network of the UE that is still not sent when the first time arrives and user plane data of the first network of the UE that is newly arrived after the first time, and stores the context of the UE for a period of time.

In addition, the UE retains the context of the first network for a period of time after the first time or the second time.

It should be understood that downlink data transmission is used as an example herein. The access network device of the first network does not send data to the UE after the first time.

During uplink data transmission, the access network device of the first network may still send data to the core network user plane network element of the first network after the first time. Some uplink data, for example, out-of-order data, needs to be backhauled to a network element of the second network, for example, backhauled to the access network device of the second network, and is uploaded by the access network device of the second network to the core network user plane network element of the first network, but cannot be directly uploaded by the access network device of the first network to the core network user plane network element of the first network. Similarly, for uplink data, the core network user plane network element of the first network may continue to upload received uplink data to a data network after the second time.

After the foregoing steps 201 to 206, before triggering the movement from the first network to the second network, the UE notifies a network element of the first network that the UE is to trigger the cross-network movement, so that the core network user plane network element of the first network and the access network device of the first network element pause the transmission of the user plane data of the first network of the UE, to prevent air interface packet loss during the cross-network movement of the UE, and reduce a data backhaul amount of the network after the cross-network movement of the UE is completed.

It may be understood that for downlink data transmission, both the core network user plane network element of the first network and the access network device of the first network may buffer user plane data that is of the first network and that is not sent to the UE. After the UE accesses the second network, the data is backhauled to the UE. For uplink data transmission, the access network device of the first network buffers data that is from the UE and that is not sent to the core network user plane network element of the first network.

After the first time, the UE performs the cross-network movement.

207: The UE accesses the second network.

208: The UE sends a NAS message to the core network control plane network element of the first network.

Correspondingly, the core network control plane network element of the first network receives the NAS message from the UE.

The NAS message is used to indicate that the UE has moved to the second network. It should be understood that an indication manner of the NAS message used to indicate that the UE has moved to the second network may be explicit or implicit. For the implicit indication, for example, if the core network control plane network element of the first network receives the first NAS message from the UE, the core network control plane network element of the first network may learn that the UE has moved to the second network.

209: The core network control plane network element of the first network notifies another network element of the first network to establish a data backhaul resource for the UE.

Herein, the another network element of the first network may include the core network user plane network element of the first network, the access network device of the first network, and a first N3IWF.

The establishment of the data backhaul resource may include establishment of a backhaul channel, allocation of a transport network layer port address, and allocation of a PDU session resource used to carry the backhaul channel.

210: The core network control plane network element of the first network sends a fifth message, where the fifth message is used to notify the access network device of the first network to send the buffered user plane data of the first network of the UE.

In other words, the core network control plane network element of the first network notifies the access network device of the first network to backhaul the buffered user plane data of the first network of the UE.

Specifically, the fifth message sent by the core network control plane network element of the first network to the access network device of the first network may further carry the following information: the UE ID (for example, an NGAP UE ID), the PDU session identifier of the first network, the DRB ID, the QFI, and the like.

211: The access network device of the first network sends the buffered user plane data of the first network of the UE to the UE.

In other words, the RAN of the first network backhauls the buffered user plane data of the first network of the UE to the UE.

The access network device of the first network backhauls the buffered user plane data of the first network of the UE to the UE based on information received from the core network control plane network element of the first network by using the network element of the second network. Optionally, the first access network device may further backhaul, to the UE, the user plane data that is of the first network of the UE and that is newly arrived after the first time.

It should be noted that, similar to the descriptions in 206, downlink data transmission is used for example in the procedure shown in FIG. 2. Therefore, after the UE moves from the first network to the second network, the access network device of the first network sends the buffered user plane data of the first network of the UE to the UE. If the UE moves to the second network during uplink data transmission, the access network device of the first network sends the buffered user plane data of the first network of the UE to the network element of the second network, for example, to the access network device of the second network. Then, the access network device of the second network sends uplink data to the core network user plane network element of the first network (for example, a UPF of the first network).

It should be understood that the steps 201 to 211 shown in FIG. 2 are numbered only for the purpose of clearly describing this embodiment. In a specific implementation, steps are not limited to the same as the steps shown in FIG. 2. For example, all the steps in FIG. 2 may be included, a step other than the steps 201 to 211 may be included, or only a part of the steps 201 to 211 may be included. This is not limited in the solutions of this application. This is also applicable to the following embodiments, and details are not described herein again.

In addition, in the procedure shown in FIG. 2, the UE or the RAN notifies the core network control plane network element that the transmission of the corresponding user plane data of the UE is to be paused, and then the core network control plane network element notifies the core network user plane network element to pause the transmission of the corresponding user plane data of the UE. In another implementation, alternatively, the UE or the RAN may directly notify the core network user plane network element to pause the transmission of the corresponding user plane data of the UE. For example, the UE or the RAN adds pause indication information to a sent user plane data packet.

In the embodiment shown in FIG. 2, the UE successfully accesses the second network from the first network. However, in some cases, after the UE notifies a network device that the UE is to perform the cross-network movement, after a period of time, a network side delays perceiving that the UE accesses the second network. For example, the UE may not move to the second network, or the UE does not access the second network after the UE moves to the second network. In this case, it is proposed in this application that the network side initiates a process of searching for a location of the UE, and determines, based on a searching result, to continue to wait for access of the UE, resume a context of the PDU session of the first network of the UE, maintain the transmission of the user plane data of the first network of the UE, release the context of the UE, or the like. The following provides descriptions with reference to FIG. 3.

Figure 3:
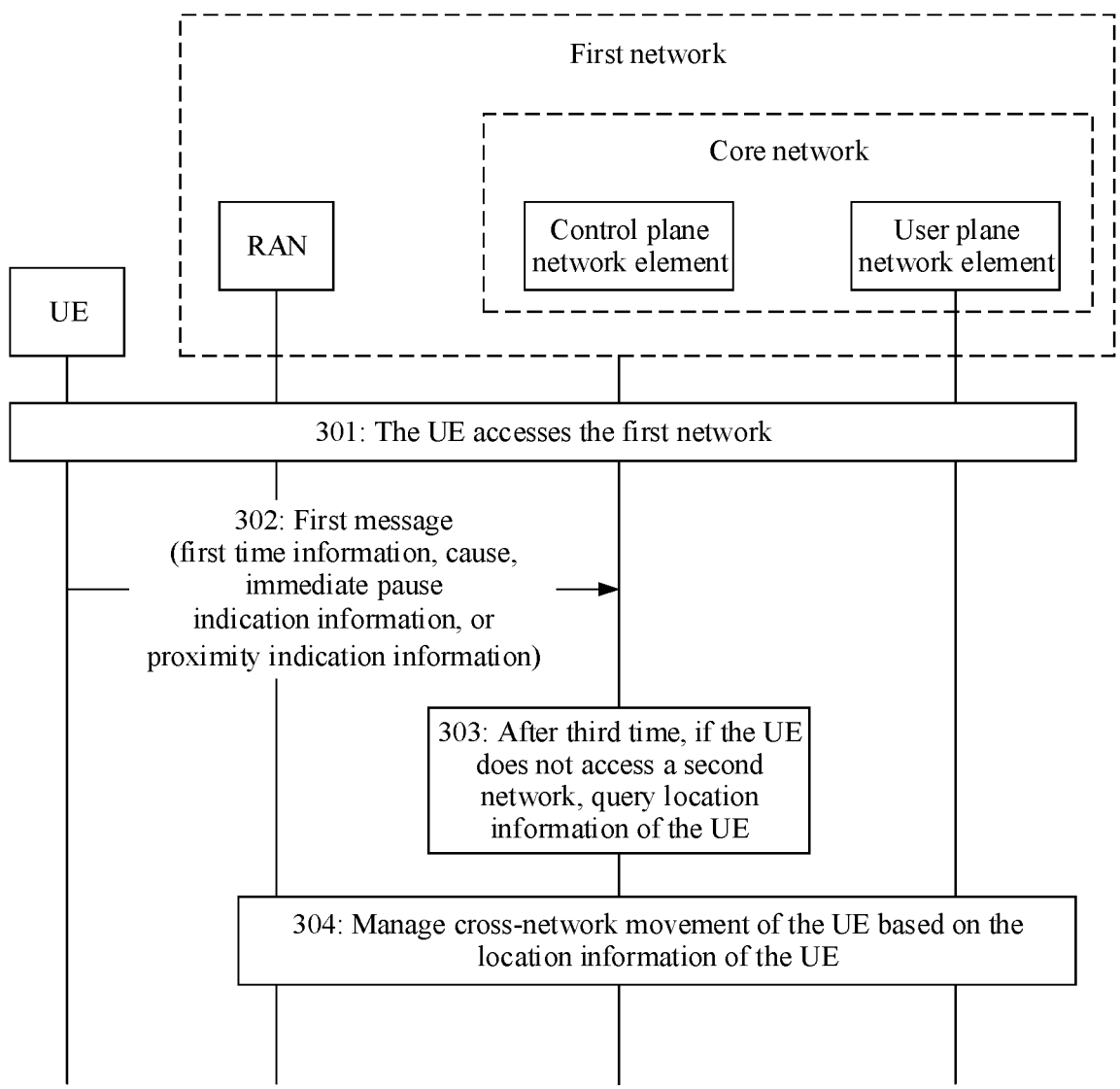
FIG. 3 is an example of a procedure in which UE performs cross-network movement according to this application.

FIG. 3 is an example of a procedure in which the UE performs the cross-network movement according to this application.

301: The UE accesses the first network.

Optionally, the UE establishes a PDU session of the first network, or the UE does not establish a PDU session of the first network.

302: When the UE needs to move from the first network to the second network, the UE sends a first message to a core network control plane network element of the first network.

Herein, for a specific implementation in which the UE sends the first message to the core network control plane network element of the first network, refer to step 203 above. Details are not described herein again.

Correspondingly, the core network control plane network element of the first network receives the first message from the UE.

303: After third time, if the UE does not access the second network, the core network control plane network element of the first network queries location information of the UE.

It should be understood that the third time needs to be greater than first time.

In 303, the core network control plane network element of the first network may query the location information of the UE in a plurality of manners. Several examples are provided below for description.

Manner 1

The core network control plane network element of the first network sends a location reporting control message to an access network device of the first network, where the location reporting control message is used to query the location information of the UE.

Herein, the location reporting control message may be specifically a location reporting control message.

The location reporting control message carries an identifier of the UE, a cause (or referred to as a query cause), a type (or referred to as a query type), or the like.

The query cause is used to indicate the core network control plane network element of the first network to query whether the UE has completed the cross-network movement. The query type is used to indicate a type of the cross-network movement of the UE, and may include that the UE moves from a public network to a non-public network, the UE moves from a non-public network to a public network, or the like. Specifically, for example, the UE moves from an NPN to an NPN, the UE moves from an NPN to a PLMN, the UE moves from a PLMN to a PLMN, or the UE moves from a PLMN to an NPN.

Correspondingly, the access network device of the first network receives the location reporting control message from the core network control plane network element of the first network. After querying a location of the UE, the access network device of the first network sends a location report to the core network control plane network element of the first network, where the location report is used to indicate current location information of the UE.

Herein, the current location information of the UE may include a part or all of an ID of a network in which the UE is currently located, a cell ID, tracking area information, or a timestamp at which the UE appears at a corresponding location.

Optionally, the location report may further carry movement indication information, to indicate whether the UE has moved to the second network. For example, 1 indicates that the UE has moved to the second network, 0 indicates that the UE does not move to the second network, and vice versa.

Manner 2

The core network control plane network element of the first network sends a location reporting control message to an N3IWF, where the location reporting control message is used to request to query the location information of the UE.

Information carried in the location reporting control message may be the same as that in the location reporting control message in Manner 1. Details are not described again.

It should be noted that the N3IWF herein may be an N3IWF of the first network, or may be an N3IWF of the second network, or may be an N3IWF shared by the first network and the second network.

Similarly, the N3IWF sends a location report to the core network control plane network element of the first network, where the location report is used to indicate current location information of the UE.

Optionally, the core network control plane network element of the first network may alternatively send a location reporting control message to an access network device of the second network. Further, the core network control plane network element of the first network receives a location report of the UE from the access network device of the second network.

304: The core network control plane network element of the first network manages the cross-network movement of the UE based on the location information of the UE.

Specifically, the core network control plane network element of the first network performs different processing based on different current locations of the UE.

In a possible case, the UE is still located in the first network.

In this case, in an implementation, the core network control plane network element of the first network sends an air interface message to the access network device of the first network through an NG interface, to query whether the UE still needs to perform the cross-network movement. The access network device of the first network queries the UE by using an RRC message. The UE feeds back, to the access network device of the first network by using an RRC message, whether the UE still needs to perform the cross-network movement. In another implementation, the core network control plane network element of the first network directly queries, by using a NAS message, whether the UE still needs to perform the cross-network movement. Correspondingly, the UE directly feeds back, to the core network control plane network element of the first network by using a NAS message, whether the UE still needs to perform the cross-network movement.

If the UE still needs to perform the cross-network movement, the UE feeds back an RRC message to the access network device of the first network, where the RRC message carries fourth time information. The access network device of the first network forwards the fourth time information to the core network control plane network element of the first network by using the RRC message. Alternatively, the UE sends a NAS message to the core network control plane network element of the first network, where the NAS message carries the fourth time information.

The fourth time information is used to indicate that the UE is to perform the cross-network movement after fourth time. Optionally, the fourth time may be equal to the foregoing first time. For example, the fourth time indicated by the fourth time information may be the foregoing time1.

It may be understood that, after learning that the UE still needs to perform the cross-network movement, the core network control plane network element of the first network continues to wait for the UE to move to and then access the second network. Therefore, for a subsequent process, refer to the procedure in which the UE performs the cross-network movement in FIG. 2. Details are not described herein again.

Optionally, the UE cancels the cross-network movement.

In this case, if the UE is still located in a source cell before the cross-network movement is triggered, the core network control plane network element of the first network notifies a core network user plane network element of the first network and the access network device of the first network to resume a context of the PDU session of the first network of the UE. Specifically, the core network control plane network element of the first network may notify the core network user plane network element of the first network and the access network device of the first network, of a device identifier of the terminal device, a session identifier of the PDU session of the first network of the UE that needs to be resumed, a cause for resuming transmission (for example, the cross-network movement is not performed), information indicating whether to immediately resume the transmission, and the like.

In another possible case, the UE is handed over to another cell of the first network. In this case, the core network control plane network element of the first network initiates reconfiguration of a PDU session resource for the UE.

For example, the core network control plane network element of the first network notifies the access network device of the first network to reconfigure a resource and re-establish a data radio bearer (data radio bearer, DRB) and a signaling radio bearer (signaling radio bearer, SRB) for the UE.

In still another possible case, the UE has moved to the second network, but does not initiate access. In this case, the core network control plane network element of the first network continues to wait. For example, the core network control plane network element of the first network waits to establish a backhaul tunnel of user plane data of the PDU session of the first network for the UE.

In still another possible case, the core network control plane network element of the first network does not find the UE. In this case, the core network control plane network element of the first network notifies a network element of the first network to initiate paging for the UE in the first network. If the UE is located in another RAN of the first network, intra-network handover is performed for the UE. The intra-network handover may be handover based on the NG interface, or may be handover based on an Xn interface. This is not limited herein. If the UE is located in the second network, the core network control plane network element of the first network continues to wait. For example, the core network control plane network element of the first network waits to establish the backhaul tunnel of the user plane data of the PDU session of the first network for the UE.

If the paging in the first network fails, and the UE is not found, the core network control plane network element of the first network notifies a network element of the second network to initiate paging for the UE in the second network. If it is found that the UE has accessed a cell other than the source cell of the first network, the core network control plane network element of the first network reconfigures a PDU session resource for the UE. If it is found that the UE has moved to the second network, the core network control plane network element of the first network continues to wait. If the UE is still not found in the second network, after waiting for a period of time, the core network control plane network element of the first network notifies the access network device of the first network and the core network user plane network element of the first network to release a context the UE.

With reference to FIG. 2 and FIG. 3, the foregoing describes in detail the process in which the UE performs the cross-network movement from the first network to the second network when the UE accesses the first network.

The following describes a process in which the UE performs the cross-network movement from the first network to the second network when the UE is located in the first network and establishes a PDU session in the second network by using the first network.

Scenario 2

The UE accesses the second network by using the first network. When the UE needs to perform cross-network movement from the first network to the second network, the UE notifies a core network element of the second network that the UE is to trigger the cross-network movement.

Herein, that the UE accesses the second network by using the first network should be understood as that the UE accesses the second network by using an interworking network element (for example, an N3IWF) of the first network and the second network, instead of accessing the second network by using a RAN of the second network.

Figure 4:
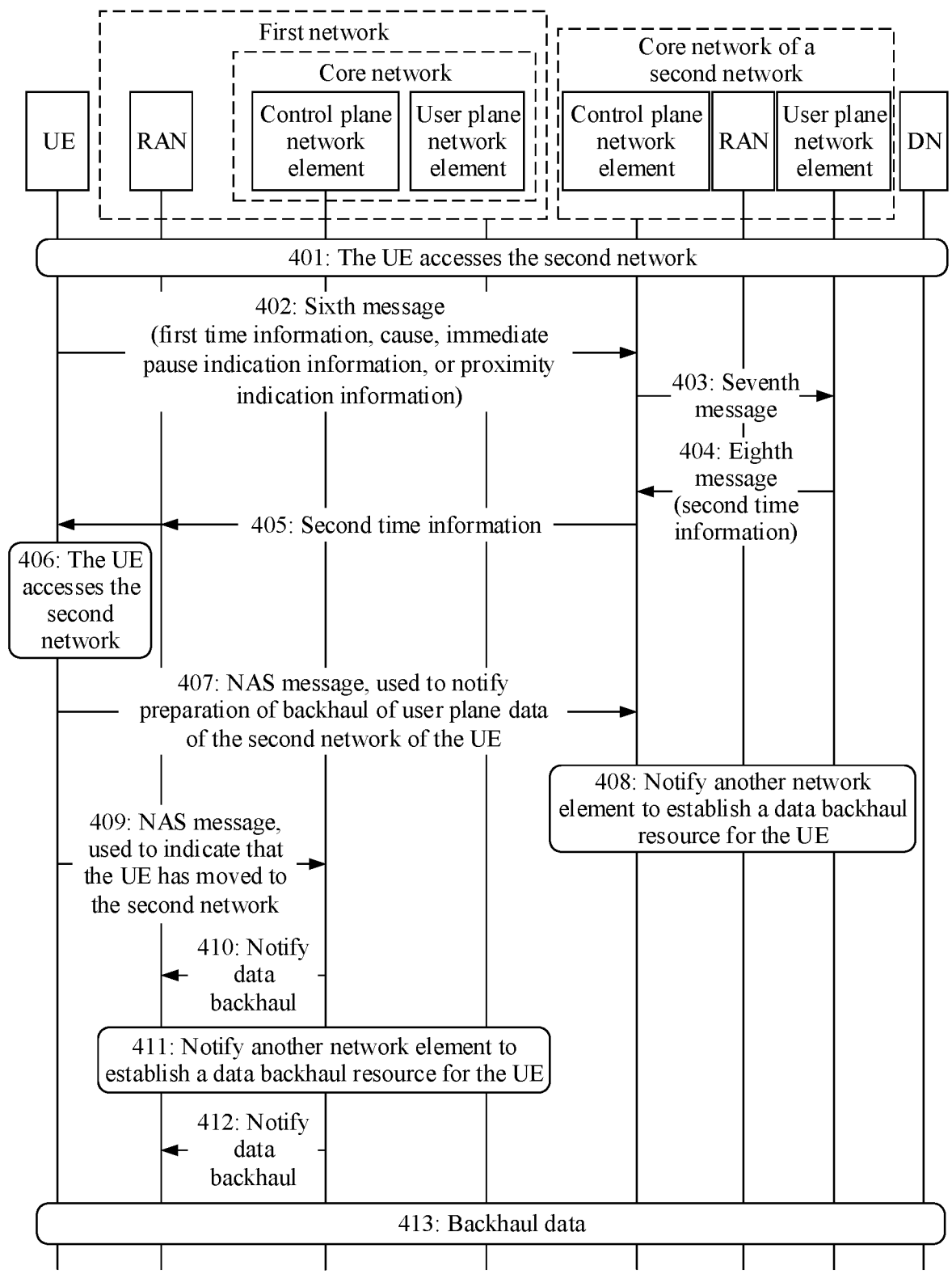
FIG. 4 is another example of a procedure in which UE performs cross-network movement.

FIG. 4 is another example of a procedure in which the UE performs the cross-network movement.

401: The UE accesses the second network.

Optionally, the UE may establish a PDU session of the second network, or the UE may not establish a PDU session of the second network.

402: When the UE needs to move from the first network to the second network, the UE sends a sixth message to a core network control plane network element of the second network.

Correspondingly, the core network control plane network element of the second network receives the sixth message from the UE.

Optionally, the sixth message may be a NAS message.

The sixth message may carry one or more of the following information: first time information, a cause (or referred to as a movement cause), immediate pause indication information, or proximity indication information.

The first time information is used to indicate that the UE is to trigger the cross-network movement after first time. The movement cause is used to indicate the cross-network movement. The immediate pause indication information is used to indicate whether to immediately pause transmission of user plane data of the second network of the UE.

In addition, the proximity indication information may carry one or more of the following information: information indicating that the UE is entering a neighboring area of one or more cells of a non-public network, information indicating that the UE is leaving a neighboring area of one or more cells of a non-public network, information indicating that the UE is entering one or more cells of a non-public network, information indicating that the UE is leaving one or more cells of a non-public network, or identifier information of one or more cells.

For example, character strings entering and leaving respectively indicate entering and leaving, and an ARFCN of the cell or a cell ID may be used to identify the cell.

In addition, the sixth message may further carry the following information: a UE ID, an identifier of the second network to which the UE is to move, an ID of a cell of the second network to which the UE is to move, an ID of an access network device of the second network, and an address of an N3IWF to be connected to the UE after the UE moves to the second network.

403: The core network control plane network element of the second network sends a seventh message to a core network user plane network element of the second network.

Correspondingly, the core network user plane network element of the second network receives the seventh message from the core network control plane network element of the second network.

The seventh message is used to indicate the core network user plane network element of the second network to pause the transmission of the user plane data of the second network of the UE.

Optionally, the seventh message further carries one or more of the following information: the first time information, the movement cause, the immediate pause indication information, or the proximity indication information.

404: The core network user plane network element of the second network sends an eighth message to the core network control plane network element of the second network.

Correspondingly, the core network control plane network element of the second network receives the eighth message from the core network user plane network element of the second network.

Optionally, a response message of the eighth message carries second time information. The second time information is used to indicate that the core network user plane network element of the second network is to pause the transmission of the user plane data of the second network of the UE after second time.

Optionally, the eighth message further carries a session identifier of the PDU session of the second network of the UE, the immediate pause indication information, and the like.

In addition, the core network control plane network element and the core network user plane network element of the second network still needs to retain a context of the UE after the first time or the second time.

405: The core network control plane network element of the second network notifies an access network device of the first network and the UE of the second time information.

In an implementation of 405, the core network control plane network element of the second network directly sends a NAS message to the UE, where the NAS message carries the second time information. After obtaining the second time information from the NAS message, the UE notifies the access network device of the first network of the first time information and the second time information.

In another implementation of 405, the core network control plane network element of the second network directly sends a ninth message to the N3IWF, where the ninth message carries the first time information and the second time information. The N3IWF further notifies the access network device of the first network of the first time information and the second time information. Alternatively, after obtaining the second time information carried in the ninth message, the N3IWF notifies the UE of the second time information. Further, the UE notifies the access network device of the first network of the first time information and the second time information.

After learning of the first time information of the UE, the access network device of the first network does not send the user plane data of the second network to the UE after the first time based on the first time information. In other words, the access network device of the first network buffers user plane data that is of the second network of the UE and that is still not sent when the first time arrives.

Similar to the descriptions in scenario 1, for uplink transmission, the access network device of the first network needs to buffer out-of-order uplink data, and cannot directly send the out-of-order uplink data to the core network user plane network element of the second network. Instead, the access network device of the first network backhauls the out-of-order uplink data to a network element of the second network, and the network element of the second network sends the out-of-order uplink data to the core network user plane network element of the second network.

After the foregoing steps 401 to 405, before triggering the cross-network movement from the first network to the second network, the UE notifies the network element of the second network that the UE is to trigger the cross-network movement.

After the first time, the UE triggers the cross-network movement.

406: The UE moves from the first network to the second network, and accesses the second network.

407: The UE sends a NAS message to the core network control plane network element of the second network. The NAS message is used to notify the core network control plane network element of the second network to prepare to send the buffered user plane data of the second network of the UE.

Alternatively, the NAS message in step 407 is used to notify the core network control plane network element of the second network to backhaul the user plane data of the second network of the UE.

408: After receiving the NAS message from the UE, the core network control plane network element of the second network notifies another network element of the second network (for example, the core network control plane network element of the second network notifies the access network device of the second network and the core network user plane network element of the second network) to establish a data backhaul resource for the UE.

409: The UE sends a NAS message to a core network control plane network element of the first network. The NAS message is used to indicate that the UE has accessed the second network.

It should be understood that indication information may be explicit or implicit. For an implicit indication, for example, if the core network control plane network element of the first network receives the first NAS message from the UE, the core network control plane network element of the first network may learn that the UE has moved to the second network.

410: The core network control plane network element of the first network notifies the access network device of the first network to send the buffered user plane data of the second network of the UE to the UE.

411: The core network control plane network element of the first network notifies another network element of the first network to establish a data backhaul resource for the UE.

Herein, the another network element of the first network may include a core network user plane network element of the first network, the access network device of the first network, and a first N3IWF.

412: The core network control plane network element of the first network notifies the access network device of the first network to send the buffered user plane data of the second network of the UE.

Specifically, the fifth message sent by the core network control plane network element of the first network to the access network device of the first network may further carry the following information: the UE ID (for example, an NGAP UE ID), the identifier of the PDU session of the second network, a DRB ID, a QFI, and the like.

413: The access network device of the first network sends the buffered user plane data of the second network of the UE to the UE.

In other words, a RAN of the first network backhauls the buffered user plane data of the second network of the UE to the UE.

The access network device of the first network backhauls the buffered user plane data of the second network of the UE to the UE based on information received from the core network control plane network element of the first network by using the network element of the second network.

In the embodiment shown in FIG. 4, the UE moves from the first network to the second network, and successfully accesses the second network. Similar to the embodiment shown in FIG. 3, in some cases, after the UE notifies the network element of the second network that the UE is to trigger the cross-network movement, the network element of the second network delays perceiving that the UE has successfully accessed the second network. In this case, the network element of the second network also initiates a process of searching for a location of the UE, and determines, based on a searching result, to continue to wait for the UE to access the second network, resume a context of the PDU session of the second network of the UE, continue the transmission of the user plane data of the second network of the UE, release the context of the UE, or the like. The following provides descriptions with reference to FIG. 5.

Figure 5:
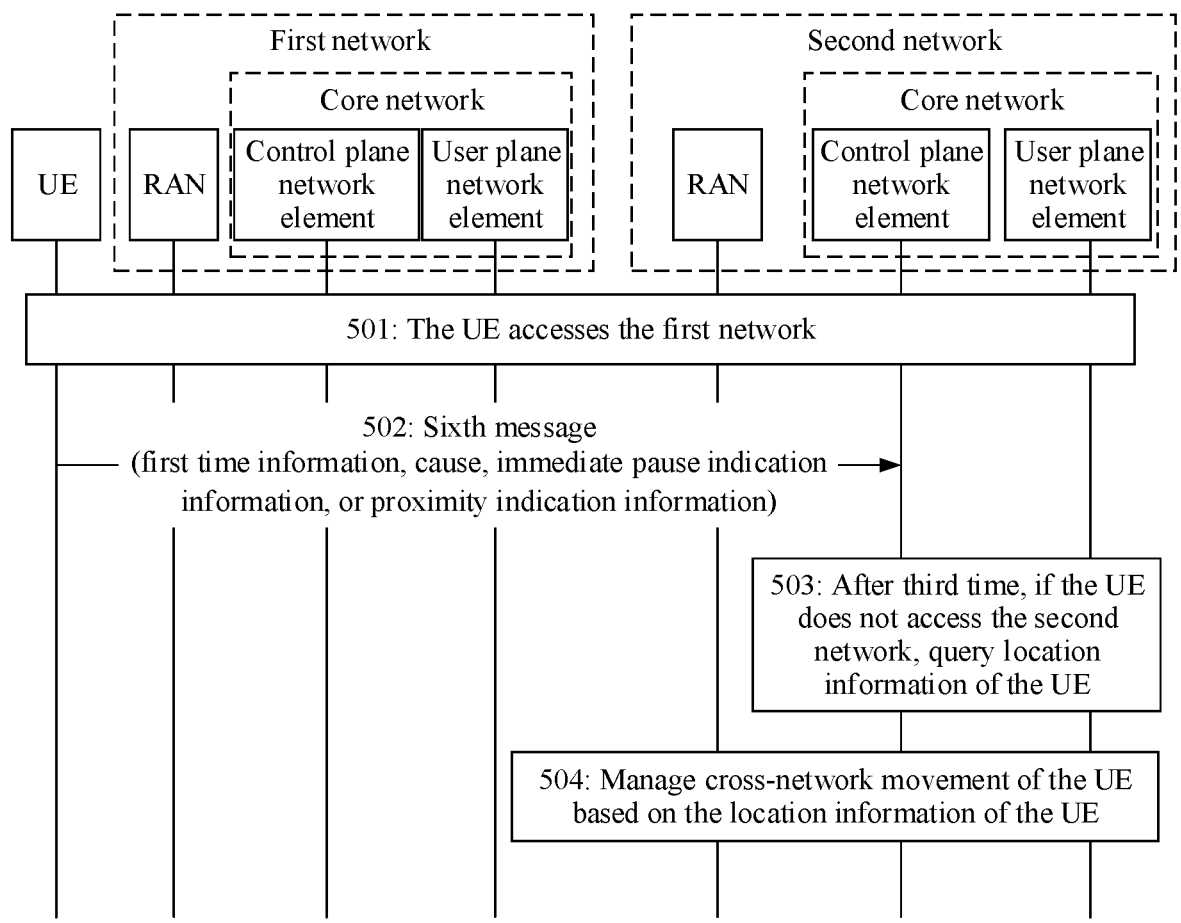
FIG. 5 is another example of a procedure in which UE performs cross-network movement.

FIG. 5 is another example of a procedure in which the UE performs the cross-network movement.

501: The UE accesses the first network.

Optionally, the UE may establish a PDU session of the second network by using the first network, or the UE may not establish a PDU session of the second network.

502: When the UE needs to move from the first network to the second network, the UE sends a sixth message to a core network control plane network element of the second network.

503: After third time, if the UE still does not access the second network, the core network control plane network element of the second network queries location information of the UE.

In 503, the core network control plane network element of the second network may query the location information of the UE in a plurality of manners. For example, the core network control plane network element of the second network may send a location reporting control message to an access network device of the second network or an N3IWF, to request to query current location information of the UE.

The location reporting control message may carry information such as an identifier of the UE, a query cause, or a query type.

In addition, the N3IWF in 503 may be an N3IWF of the second network, or an N3IWF of the first network, or an N3IWF shared by the first network and the second network. This is not limited herein.

Correspondingly, after receiving the location reporting control message from the core network control plane network element of the second network, an access network device of the first network or the N3IWF sends a query message to the UE. The query message carries the query cause, information used to query whether the UE has moved to the second network, and the like.

The UE feeds back the location information of the UE to the access network device of the first network or the N3IWF. The location information may include one or more of the following: an identifier of a network in which the UE is located, a cell identifier of a cell in which the UE is located, tracking area information, a timestamp at which the UE appears at a corresponding location, and the like. In addition, the UE may further notify the access network device of the first network or the N3IWF whether the UE has moved to the second network.

The access network device of the first network or the N3IWF sends a location of the UE to the core network control plane network element of the second network, and notifies the UE whether the UE has moved to the second network.

504: The core network control plane network element of the second network manages the cross-network movement of the UE based on the current location information of the UE.

Similar to the scenario 1, the core network control plane network element of the second network performs different processing based on different current locations of the UE.

In a possible case, the UE is still located in a source cell of the first network, or is handed over to another cell of the first network.

In this case, in an implementation, the core network control plane network element of the second network queries, through an NG interface, the access network device of the first network whether the UE still needs to perform the cross-network movement. The access network device of the first network queries, by using an RRC message, whether the UE still needs to perform the cross-network movement. The UE feeds back, to the access network device of the first network by using an RRC message, whether the UE still needs to perform the cross-network movement. Further, the access network device of the first network forwards the feedback of the UE to the core network control plane network element of the second network through the NG interface. In another implementation, the core network control plane network element of the second network directly queries, by using a NAS message, whether the UE still needs to perform the cross-network movement. Correspondingly, the UE directly feeds back, to the core network control plane network element of the second network by using a NAS message, whether the UE still needs to perform the cross-network movement.

If the UE still needs to perform the cross-network movement, the UE feeds back an RRC message to the access network device of the first network, where the RRC message carries fourth time information. The access network device of the first network feeds back the fourth time information to the core network control plane network element of the second network through the NG interface. Alternatively, the UE sends a NAS message to the core network control plane network element of the second network, where the NAS message carries the fourth time information. The fourth time information is used to indicate that the UE is to perform the cross-network movement after fourth time. Optionally, the fourth time may be equal to the foregoing first time. For example, the fourth time indicated by the fourth time information may be the foregoing time1.

It may be understood that, after learning that the UE still needs to perform the cross-network movement, the core network control plane network element of the second network continues to wait for the UE to access the second network.

Optionally, the UE feeds back cancellation of the cross-network movement to the core network control plane network element of the second network.

In this case, if the UE is still located in the source cell of the first network, the core network control plane network element of the second network notifies a core network user plane network element of the first network to resume a context of the UE and transmission of user plane data of the second network of the UE, and notifies the core network user plane network element of the first network of information such as a session identifier of the PDU session of the second network of the UE that needs to be resumed, a cause for resuming the data transmission (for example, the cross-network movement is not performed), and whether to immediately resume the transmission.

In addition, the core network control plane network element of the second network further needs to notify the N3IWF to resume the context of the UE and transmission of user plane data of the corresponding PDU session, and notify the cause for resuming the data transmission (for example, the cross-network movement is not performed), whether to immediately resume the transmission, and the like.

Further, the N3IWF notifies the access network device of the first network to resume the context of the UE and the transmission of the user plane data of the PDU session of the second network of the UE. Alternatively, the N3IWF notifies, by using a NAS message (through an N1 interface), the UE to resume the context and the transmission of the user plane data of the PDU session of the second network of the UE. Further, the UE notifies, by using an RRC message, the access network device of the first network to resume the context of the UE and the transmission of the user plane data of the PDU session of the second network of the UE.

In another possible case, the UE is still located in the first network, but the UE is handed over to another cell of the first network.

In this case, the core network control plane network element of the second network notifies the N3IWF to reconfigure a PDU session resource for the UE. Then, the N3IWF notifies the access network device of the first network to reconfigure the PDU session resource for the UE. For example, the access network device of the first network reconfigures the PDU session resource and re-establishes a DRB and an SRB for the UE.

In still another possible case, the core network control plane network element of the second network does not find the UE.

In this case, the core network control plane network element of the second network sends a location reporting control message to the N3IWF, to query the location information of the UE. The N3IWF sends the location reporting control to a core network control plane network element of the first network, to request to query the location information of the UE.

The core network control plane network element of the first network initiates paging for the UE in the first network. The core network control plane network element of the first network reports the location information of the UE to the N3IWF based on a paging result, and notifies the N3IWF whether the UE has moved to the second network. Further, the N3IWF reports the location information of the UE to the core network control plane network element of the second network, and notifies the core network control plane network element of the second network whether the UE has moved to the second network.

If the UE is located in another RAN of the first network, intra-network handover is performed for the UE. The intra-network handover herein may be handover based on the NG interface, or may be handover based on an Xn interface.

If the UE has moved to the second network, the core network control plane network element of the second network continues to wait. For example, the core network control plane network element of the second network waits to establish a backhaul tunnel of the user plane data of the PDU session of the second network for the UE.

If the paging fails, and the UE is not found, the core network control plane network element of the second network initiates paging for the UE in the first network by using a network element of the first network. If it is found that the UE is located in the first network, the core network control plane network element of the second network continues to wait. If the UE is still not found in the second network, the core network control plane network element of the second network continues to wait for a period of time. After the period of time, the core network control plane network element of the second network notifies the access network device of the first network and the core network user plane network element of the second network to release the context of the UE.

The foregoing describes in detail the procedure in which the UE performs the cross-network movement from the first network to the second network in the scenario 2.

The following describes the foregoing procedures in which the UE performs the cross-network movement in the scenario 1 and scenario 2 by using examples.

In this application, an AMF is used as an example of the core network control plane network element and a UPF is used as an example of the core network user plane network element.

For ease of description, in the following embodiments, an AMF in the first network is referred to as a first AMF, a UPF in the first network is referred to as a first UPF, an access network device in the first network is referred to as a first access network device, and an N3IWF in the first network is referred to as a first N3IWF. An AMF in the second network is referred to as a second AMF, a UPF in the second network is referred to as a second UPF, an access network device in the second network is referred to as a second access network device, and an N3IWF in the second network is referred to as a second N3IWF.

In addition, in the following embodiments, an example in which the first network is an NPN and the second network is a PLMN is used for description. In addition, cross-network cell reselection of UE is used as an example for description in the following embodiments.

It should be noted that a process in which the UE performs cross-network movement from the PLMN to the NPN is also similar to the cross-network cell reselection of the UE. A person skilled in the art can learn how to perform reselection from the PLMN to the NPN based on the procedure in which the UE performs reselection from the NPN to the PLMN provided in this application. To avoid unnecessary descriptions, details are not described.

Figure 6A:
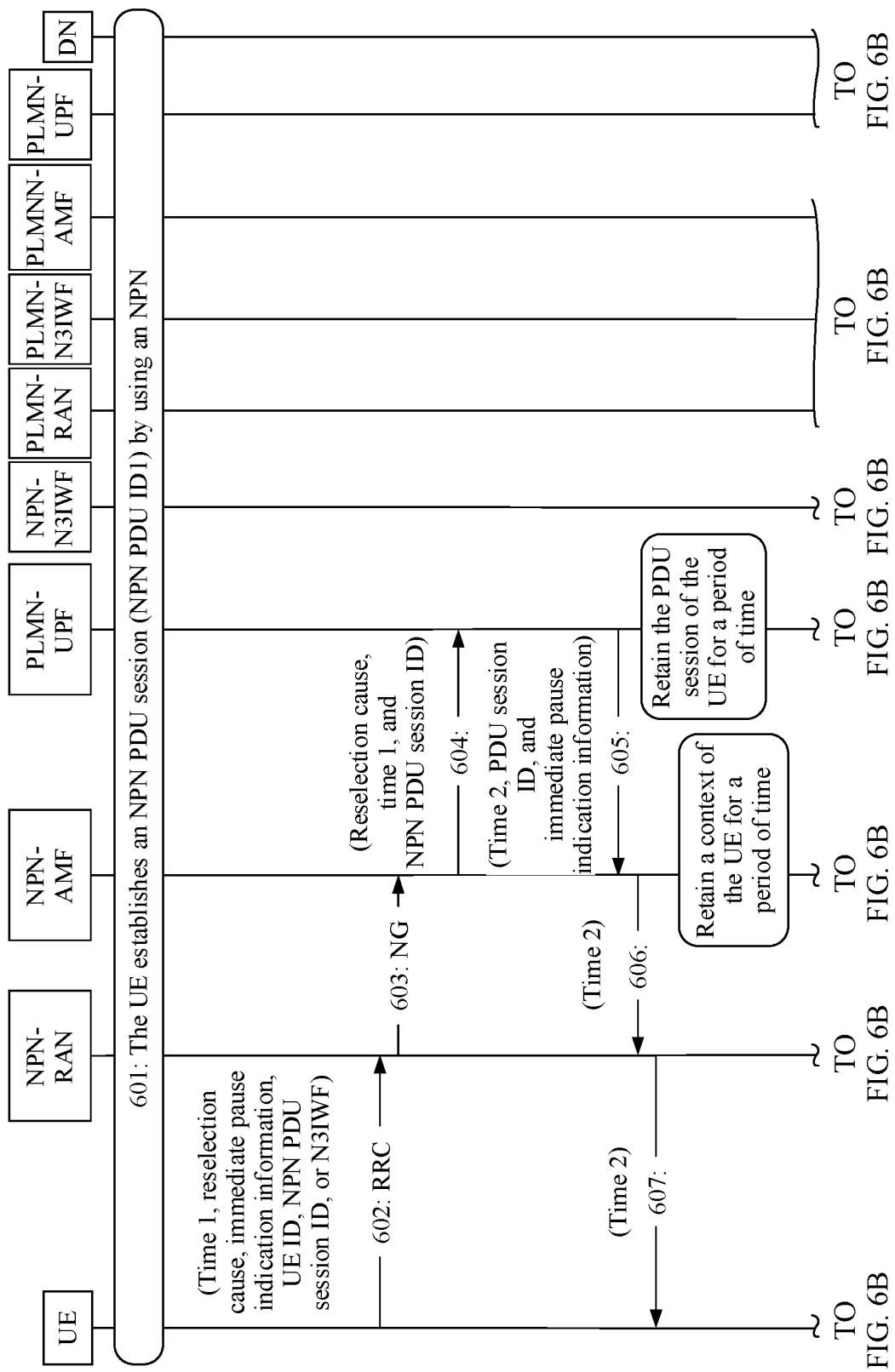
FIG. 6A and FIG. 6B are an example in which UE performs cross-network cell reselection from an NPN to a PLMN.
Figure 6B:
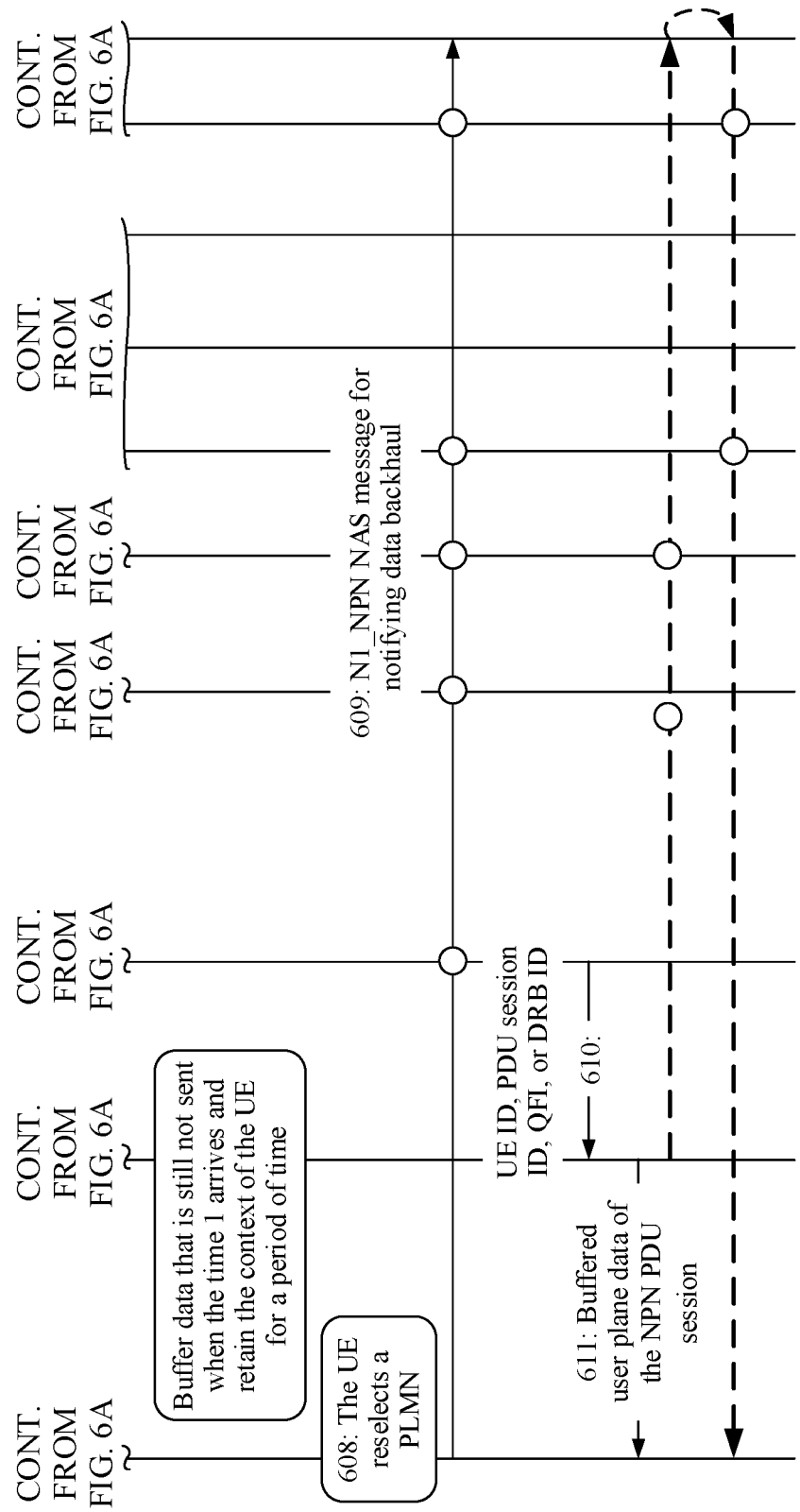

FIG. 6A and FIG. 6B are an example in which UE performs cross-network cell reselection from an NPN to a PLMN.

It should be understood that the cell reselection in this application is different from conventional cell reselection performed by UE in an idle state. Instead, the UE in a connected state autonomously determines to perform cross-network cell "handover" and the cell "handover" is not controlled by a network side. Alternatively, another term, for example, cross-network self-handover, may be used.

601: The UE establishes a PDU session of the NPN by using the NPN.

The PDU session of the NPN is referred to as an NPN PDU session below. It is assumed that a session identifier of the NPN PDU session established by the UE is an NPN PDU ID1.

602: When the UE needs to perform the reselection from the NPN to the PLMN, the UE sends RRC signaling to an NPN-RAN, where the RRC signaling is used to notify that the UE is to perform the cross-network cell reselection.

The RRC signaling may carry a reselection cause or first time information.

Optionally, the RRC signaling may further include information such as an identifier of the PLMN that the UE is to reselect (denoted as a PLMN ID below), TAC, a PLMN NG-RAN Cell ID, a UE ID, and a PLMN NG-RAN Node ID.

Optionally, the RRC signaling may further carry information about an NPN-N3IWF to which the UE is to be connected after the UE reselects the PLMN, for example, an IP address of the NPN-N3IWF.

In another implementation, the UE may further directly notify, by using NAS information, an NPN-AMF that the UE is to perform the cross-network cell reselection. The NAS message also carries the foregoing information. Details are not described again. The NAS message herein may be an example of the first message.

The UE ID carried in the RRC signaling or the NAS message may be indicated by an NGAP UE ID.

603: The NPN-RAN notifies, by using NG interface signaling, the NPN-AMF that the UE served by the NPN-RAN is to perform the cross-network cell reselection, and notifies the information received in 602 to the NPN-AMF.

It should be understood that, in 603, a message that is sent by the NPN-RAN through an NG interface and that is used to notify the NPN-AMF that the UE served by the NPN-RAN is to perform the cross-network cell reselection may be another example of the first message.

604: The NPN-AMF sends a transmission pause message to an NPN-UPF, to notify the NPN-UPF to pause transmission of user plane data of the NPN PDU ID1 of the UE.

It should be understood that "pause" is because in a period when the UE performs cross-network movement, data that is still not sent when the first time arrives is buffered. After accessing the second network, the UE needs to continue to send the buffered data to the UE.

Optionally, "pause" in this specification may also be expressed as "stop". However, similarly, "stop" indicates stop during the cross-network movement of the UE.

Herein, the transmission pause message may be an example of the foregoing second message.

The transmission pause message includes an NPN PDU session ID (which is specifically the NPN PDU ID1 herein), time1, a cause for pausing the transmission of the user plane data of the NPN PDU ID1, an identifier indicating whether to immediately perform the pause, or proximity indication information. time1 is represented as time 1 in the figure.

605: The NPN-UPF notifies the NPN-AMF that the NPN-UPF is to pause the transmission of the user plane data of the NPN PDU ID1 of the UE after time2.

time2 is represented as time 2 in the figure. In addition, a message sent by the NPN-UPF to the NPN-AMF may carry the time 2, the NPN PDU session ID, or the immediate pause indication information.

In addition, the NPN-UPF needs to retain the NPN PDU session identified by the NPN PDU ID1 for a period of time.

The message sent by the NPN-UPF to the NPN-AMF in step 605 is an example of the third message.

606: The NPN-AMF notifies, through the NG interface, the NPN-RAN that transmission of data of the PDU session of the NPN PDU ID1 of the UE served by the NPN-RAN is to be paused after time2.

In addition, the NPN-AMF notifies the NPN-RAN of the UE ID (for example, an NG UE ID), the identifier of the NPN PDU session (which is specifically the NPN PDU ID1), the cause for pausing the transmission (for example, the cross-network cell reselection), and the like.

In addition, the NPN-AMF then stores a context of the UE for a period of time.

A message sent by the NPN-AMF to the NPN-RAN through the NG interface in step 606 is an example of the fourth message.

607: The NPN-RAN notifies the UE that the transmission of the user plane data of the NPN PDU ID1 of the UE is to be paused after time2.

In addition, the NPN-RAN stores the context of the UE for a period of time, and buffers user plane data that is of the NPN PDU session identified by the NPN PDU ID1 and that is still not sent when time1 arrives.

608: The UE performs the reselection from the NPN to the PLMN.

609: The UE sends a NAS message in the PLMN through an N1_NPN interface to notify the NPN-AMF that backhaul of the user plane data of the NPN PDU ID1 is to be performed.

After receiving the NAS message from the UE, the NPN-AMF notifies another network element (for example, the NPN-UPF, the NPN-N3IWF, or the NPN-RAN) to establish a data backhaul resource for the UE.

610: The NPN-AMF notifies, by using an NG interface message, the NPN-RAN to backhaul the buffered user plane data of the NPN PDU session identified by the NPN PDU ID1 to the UE.

Specifically, the NPN-AMF notifies the NPN-RAN of the UE ID (for example, the NGAP UE ID), the NPN PDU session identifier (which is specifically the NPN PDU ID1 herein), a QFI, a DRB ID, or the like.

The NG interface message in step 610 is an example of the fifth message.

611: The NPN-RAN sends the buffered user plane data of the NPN PDU session of the UE to the UE.

Figure 7:
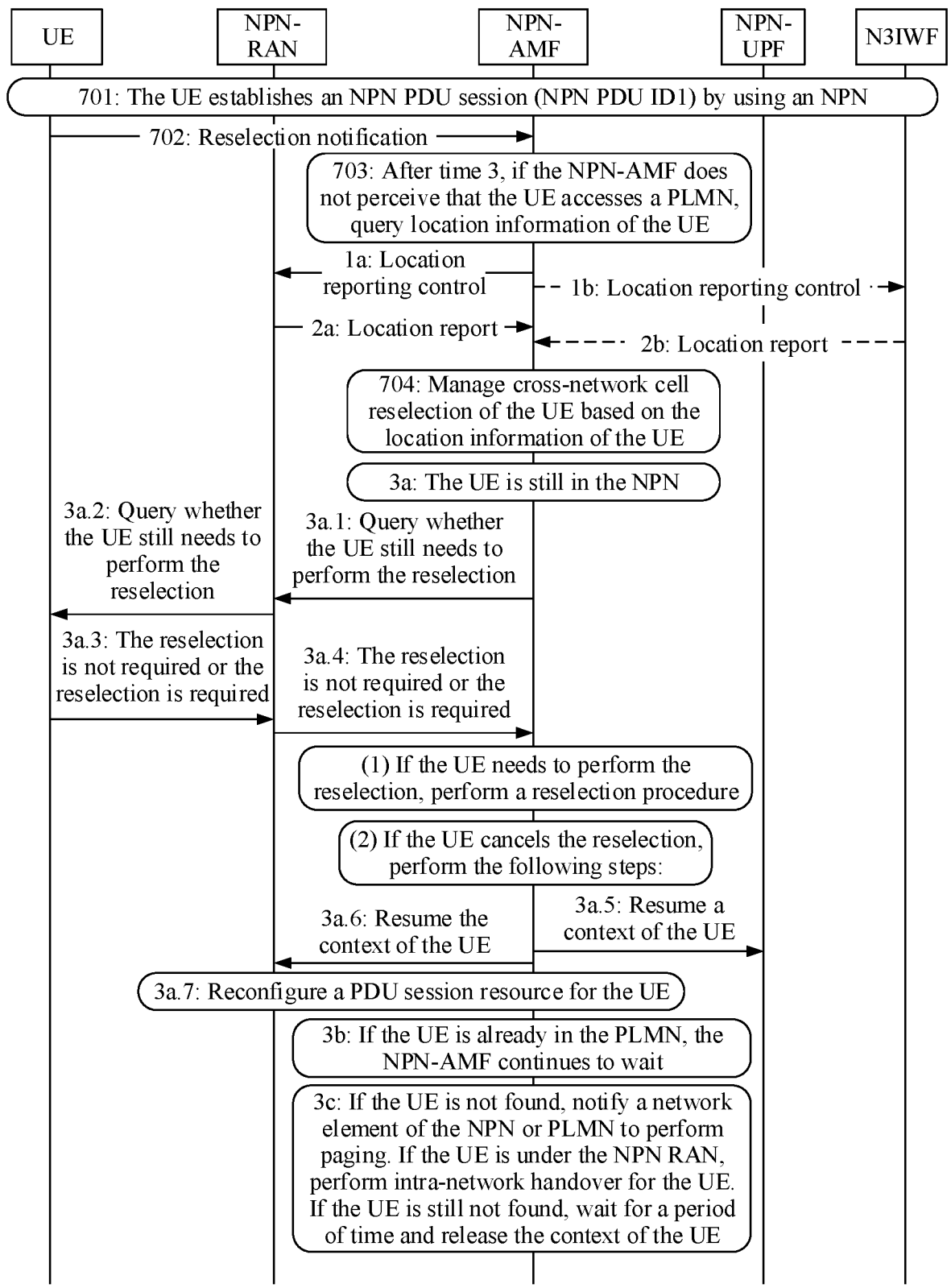
FIG. 7 is an example of a processing procedure of a network device when UE does not reselect a second network.

FIG. 6A and FIG. 6B show the procedure in which the UE successfully reselects the PLMN. In some cases, after the UE notifies the NPN-AMF that the cross-network cell reselection is to be performed, the UE does not reselect the PLMN, and the NPN-AMF initiates a process of searching for location information of the UE, or determines to continue to wait for access of the UE, resume a context of the NPN PDU session of the UE, continue the transmission of the user plane data of the NPN PDU session of the UE, and release the context of the UE. Refer to FIG. 7.

FIG. 7 is an example of a processing procedure of a network device when UE does not reselect a second network.

701: The UE establishes a PDU session of an NPN by using the NPN.

The PDU session of the NPN is referred to as an NPN PDU session below. It is assumed that an identifier of the NPN PDU session is an NPN PDU ID1.

702: When the UE needs to perform reselection from the NPN to a PLMN, the UE sends a reselection notification to an NPN-AMF.

In the cross-network cell reselection process shown in FIG. 6A and FIG. 6B, before the reselection, the UE notifies the NPN-AMF that the UE is to perform the cross-network cell reselection. After a period of time (for example, time3), if the NPN-AMF does not directly or indirectly perceive that the UE accesses the PLMN, for example, the NPN-AMF does not receive an N1_NPN NAS message that is from the UE and that is used to request to re-establish a PDU session, the NPN-AMF performs the following procedure:

703: After third time, if the NPN-AMF does not perceive that the UE accesses the PLMN, the NPN-AMF queries location information of the UE.

To distinguish from the time 1 and the time 2, the third time may be time 3.

1a: The NPN-AMF sends a location reporting control (location reporting control) message to an NPN-RAN to query the location information of the UE.

The location reporting control message carries a UE ID (for example, an NGAP UE ID), an IP address of the UE, and a query cause (for example, it is queried whether the UE has completed the reselection).

1b: The NPN-AMF sends the location reporting control message to an N3IWF to query the location information of the UE.

The location reporting control message carries a UE ID (for example, an IP address of the UE or the NGAP UE ID) and a query cause (for example, it is queried whether the UE has completed the reselection).

It should be understood that 1a and 1b respectively represent two manners in which the NPN-AMF queries the location information of the UE.

2a: The NPN-RAN reports the location information of the UE to the NPN-AMF, and notifies the NPN-AMF whether the UE has completed the cross-network cell reselection.

Herein, the location information of the UE may include, for example, the following information: information about a network in which the UE is located (for example, a PLMN ID or an NPN ID), a cell in which the UE is located, or a tracking area (for example, an NPN CGI, an NPN TAI, a PLMN CGI, or a PLMN TAI) and a timestamp at which the UE appears at a corresponding location.

2b: The N3IWF reports the location information of the UE to the NPN-AMF, and notifies the NPN-AMF whether the UE has completed the cross-network cell reselection.

For the location information of the UE herein, refer to the descriptions in 2a. Details are not described again.

It should be understood that 2a corresponds to 1a in 703, and 2b corresponds to 1b in 703.

In 703, if the NPN-AMF queries the location information of the UE in the manner 1a, the NPN-AMF obtains a location report of the UE in the manner 2a. If the NPN-AMF queries the location information of the UE in the manner 1b, the NPN-AMF obtains a location report of the UE in the manner 2b.

704: The NPN-AMF manages the cross-network cell reselection of the UE based on the location information of the UE.

Based on the location information of the UE, the following separately describes cases 3a, 3b, 3c, and 3d.

3a: The UE is still in the NPN, for example, the UE is located in a source cell of the NPN, or is handed over to another cell of the NPN.

3a.1: The NPN-AMF queries the NPN-RAN through an NG interface whether the UE still needs to perform the cross-network cell reselection.

3a.2: The NPN-RAN queries the UE by using an RRC message.

Optionally, the NPN-AMF may alternatively directly query, by using NAS information, the UE whether the UE still needs to perform the cross-network cell reselection.

3a.3: The UE feeds back, to the NPN-RAN by using an RRC message, whether the UE still needs to perform the cross-network cell reselection. Specifically, the UE may perform indication by using an indication identifier. For example, 0 indicates that the reselection is not required, and 1 indicates that the reselection is required.

If the UE still needs to perform the reselection, as described in the foregoing embodiment, the UE feeds back time1 to the NPN-RAN.

3a.4: The NPN-RAN forwards information received from the UE in step 3a.3 to the NPN-AMF through the NG interface.

Optionally, the UE may alternatively directly feed back, to the NPN-AMF by using NAS information, whether the UE still needs to perform the reselection.

(1) If the UE needs to perform the reselection, the NPN-AMF continues to wait for the UE to access the PLMN.

(2) If the UE cancels the reselection, the UE needs to distinguish whether the UE is located in the source cell of the NPN or the UE is handed over to another cell.

If the UE is still located in the source cell of the NPN, the NPN-AMF performs steps 3a.5 and 3a.6.

3a.5: The NPN-AMF notifies an NPN-UPF to resume a context of the UE and transmission of user plane data of the NPN PDU ID1, and notifies the NPN-UPF of a cause for resuming the transmission (for example, the cross-network cell reselection is not performed) and whether to immediately resume the data transmission.

3a.6: The NPN-AMF notifies the NPN-RAN to resume the context of the UE and the transmission of the user plane data of the NPN PDU ID1, and notifies the NPN-RAN of the cause for resuming the transmission and whether to immediately resume the data transmission.

If the UE has been handed over to another cell of a source NPN-RAN, the NPN-AMF performs 3a.7.

3a.7: The NPN-AMF initiates reconfiguration of a PDU session resource for the UE.

For example, the PN-AMF notifies the NPN-RAN to reconfigure the resource for the UE. Further, the NPN-RAN re-establishes a DRB, an SRB, and the like.

3b: If the UE has been handed over to the PLMN, the NPN-AMF continues to wait.

For example, the NPN-AMF waits to establish a backhaul tunnel of the user plane data of the NPN PDU session for the UE.

3c: If the UE is not found, the NPN-AMF notifies another network element of the NPN or the PLMN to initiate paging.

If the UE is served by an NPN-RAN other than the source NPN, NG- or Xn-based intra-network handover is performed for the UE.

If it is paged that the UE is already in the PLMN, the NPN-AMF continues to wait. For example, the NPN-AMF waits to establish the backhaul tunnel of the user plane data of the NPN PDU session for the UE.

If the paging fails and the UE is not found, the NPN-AMF continues to wait for a period of time. After the period of time, the NPN-AMF notifies network elements such as the NPN-RAN and NPN-UPF to release the context of the UE.

The UE performs cross-network cell reselection between the NPN and PLMN. Before performing reselection from a source network to a target network, after the UE notifies a network side that the UE is to perform the cross-network cell reselection, the network side delays in perceiving that the UE accesses the target network. The network side queries location information of the UE, and then determines, based on a location of the UE, to continue to wait for the UE to access the target network, resume a context of a PDU session of the UE in the source network, or release the context of the UE.

Figure 8:
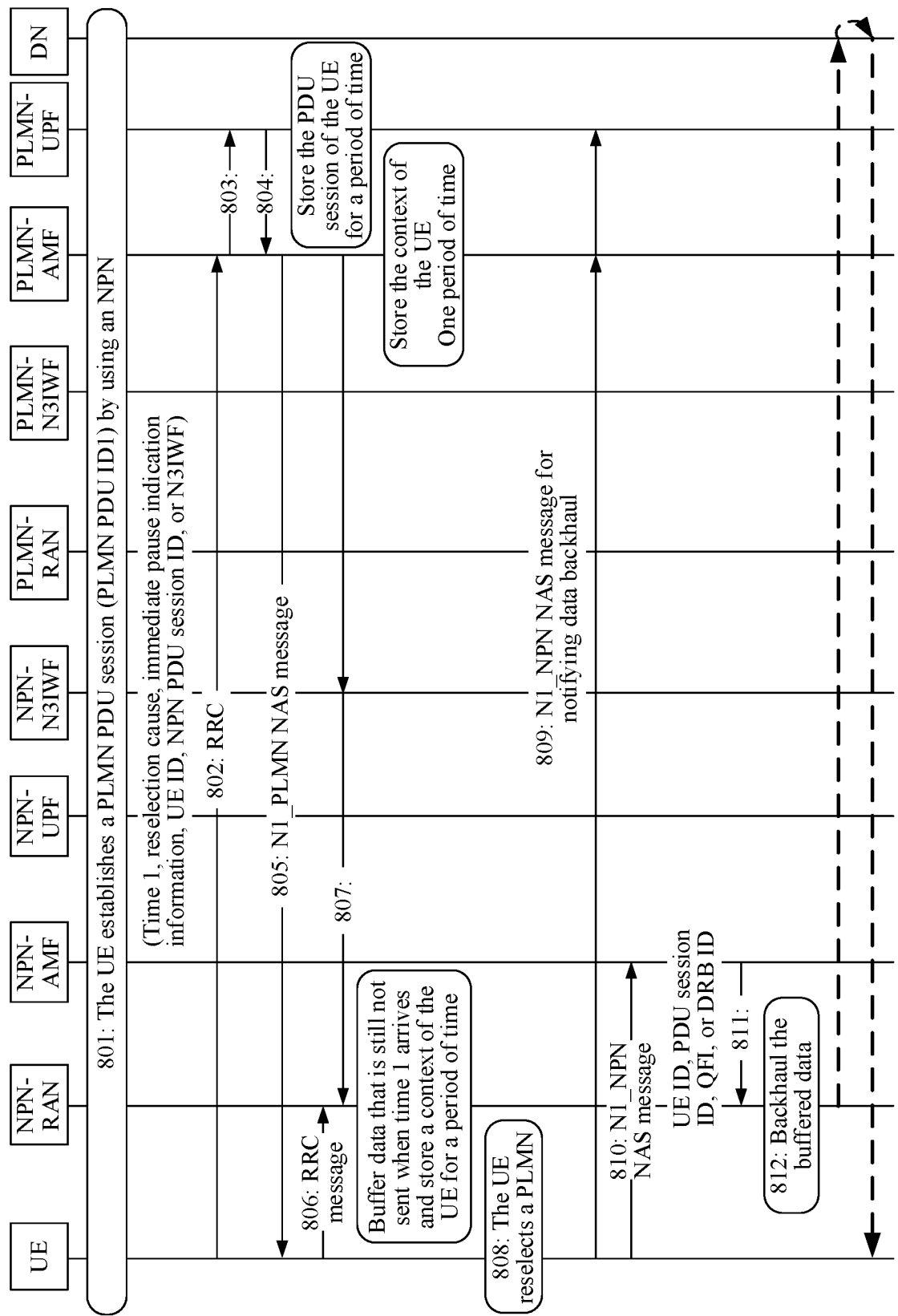
FIG. 8 is another example in which UE performs cross-network cell reselection from an NPN to a PLMN.

FIG. 8 is another example in which UE performs cross-network cell reselection from an NPN to a PLMN.

801: The UE establishes a PDU session of the PLMN by using the NPN.

For ease of description, the PDU session of the PLMN is referred to as a PLMN PDU session below. It is assumed that an identifier of the PLMN PDU session is a PLMN PDU ID1.

802: When the UE needs to perform the reselection from the NPN to the PLMN, the UE notifies, by using an N1PLMN NAS message, a PLMN-AMF that the UE is to perform the cross-network cell reselection.

It should be understood that the cell reselection herein is different from conventional cell reselection performed by UE in an idle state. Instead, the UE in a connected state autonomously determines to perform cross-network cell "handover" and the cell "handover" is not controlled by a network side. Alternatively, another term, for example, cross-network self-handover, may be used.

The N1_PLMN NAS message herein may be an example of the sixth message.

The NAS message may carry first time information and a reselection cause. The first time information is used to notify the PLMN-AMF of approximate duration after which the UE is to trigger the reselection. The first time information is indicated by using an information element time 1.

In addition, the NAS message may further carry a PLMN ID of the PLMN that the UE is to reselect, and information about a cell or tracking area that the UE reselects, for example, information such as TAC, a PLMN NG-RAN Cell ID, a UE ID, and a PLMN NG-RAN Node ID. In addition, the NAS message may further include information about an NPN-N3IWF to which the UE is to be connected after the UE reselects the PLMN, for example, an IP address of the NPN-N3IWF. In addition, the UE notifies the PLMN-AMF of approximate duration after which the UE is to trigger the handover. The duration is indicated by the information element time 1.

803: The PLMN-AMF sends a transmission pause message to a PLMN-UPF, to indicate a PLMN-RAN to pause transmission of user plane data related to the PDU session of the UE.

Herein, the transmission pause message may be an example of the seventh message.

The transmission pause message carries the identifier of the PDU session whose user plane data transmission needs to be paused (which is specifically the PLMN PDU ID1 herein), a cause for pausing the data transmission, and information indicating whether to immediately perform the pause.

804: The PLMN-UPF replies with a response message of the transmission pause message to the PLMN-AMF.

The response message of the transmission pause message may be an example of the eighth message.

The response message carries second time information. The second time information is used to indicate that the PLMN-UPF is to pause, after second time, the transmission of the user plane data of the PLMN PDU session identified by the PLMN PDU ID1. The second time may be identified by an information element time2.

Optionally, the response message may further carry indication information indicating whether to immediately pause the data transmission.

In addition, the PLMN-UPF retains the session that is of the UE and that corresponds to the PLMN PDU ID1 for a period of time.

805: The PLMN-AMF sends a NAS message through an N1PLMN interface to notify the UE that the transmission of the user plane data of the PLMN PDU session is to be paused after time 2.

In addition, the PLMN-AMF may further notify the cause for pausing the data transmission, for example, the cross-network cell reselection.

806: The UE notifies, by using an RRC message, an NPN-RAN that the transmission of the user plane data of the corresponding PLMN PDU session is to be paused after the second time. In addition, the UE notifies the NPN-RAN of the cause for pausing the data transmission.

Alternatively, the UE may first notify an NPN-AMF of the foregoing information by using a NAS message, and the NPN-AMF then notify the NPN-RAN of the foregoing information through an NPN NG interface.

Then, the NPN-RAN buffers user plane data that is of the PLMN PDU session identified by the PLMN PDU ID1 and that is still not sent when time1 arrives, and stores a context of the UE for a period of time.

807: The PLMN-AMF notifies the PLMN-N3IWF that the transmission of the user plane data of the PDU session of the UE served by the PLMN-N3IWF is to be paused after the second time.

In addition, the PLMN-AMF notifies the PLMN-N3IWF of the cause for pausing the transmission.

In addition, the PLMN-AMF and the PLMN-N3IWF store the context of the UE for a period of time.

808: The UE reselects the PLMN.

809: The UE sends a NAS message in the PLMN through an N1_PLMN interface to notify the PLMN-AMF that backhaul of the user plane data of the PLMN PDU session is to be performed.

After receiving the NAS message from the UE, the PLMN-AMF notifies another network element of the PLMN (for example, the PLMN-UPF or the PLMN-RAN) to establish a data backhaul resource for the UE.

810: The UE sends a NAS message in the PLMN through an N1_NPN interface to notify the NPN-AMF that backhaul of the user plane data of the PLMN PDU session is to be performed.

After receiving the NAS message from the UE, the NPN-AMF notifies another network element of the NPN (for example, an NPN-UPF, the NPN-N3IWF, or the NPN-RAN) to establish a data backhaul resource for the UE.

811: The NPN-AMF notifies the NPN-RAN to backhaul the buffered user plane data of the PLMN PDU session identified by the PLMN PDU ID1 to the UE.

Herein, the user plane data of the PLMN PDU session of the UE that needs to be backhauled is identified by the PLMN PDU session ID (which is specifically the PLMN PDU ID1 herein), a DRB ID, a QFI, and the like.

812: The NPN-RAN backhauls the buffered user plane data of the PLMN PDU session to the UE.

For that the NPN-RAN backhauls the data to the UE, refer to a dashed line below step 812 in FIG. 8. The NPN-RAN backhauls the buffered user plane data of the PLMN PDU session of the UE to the UE through a network element of the PLMN.

Figure 9A:
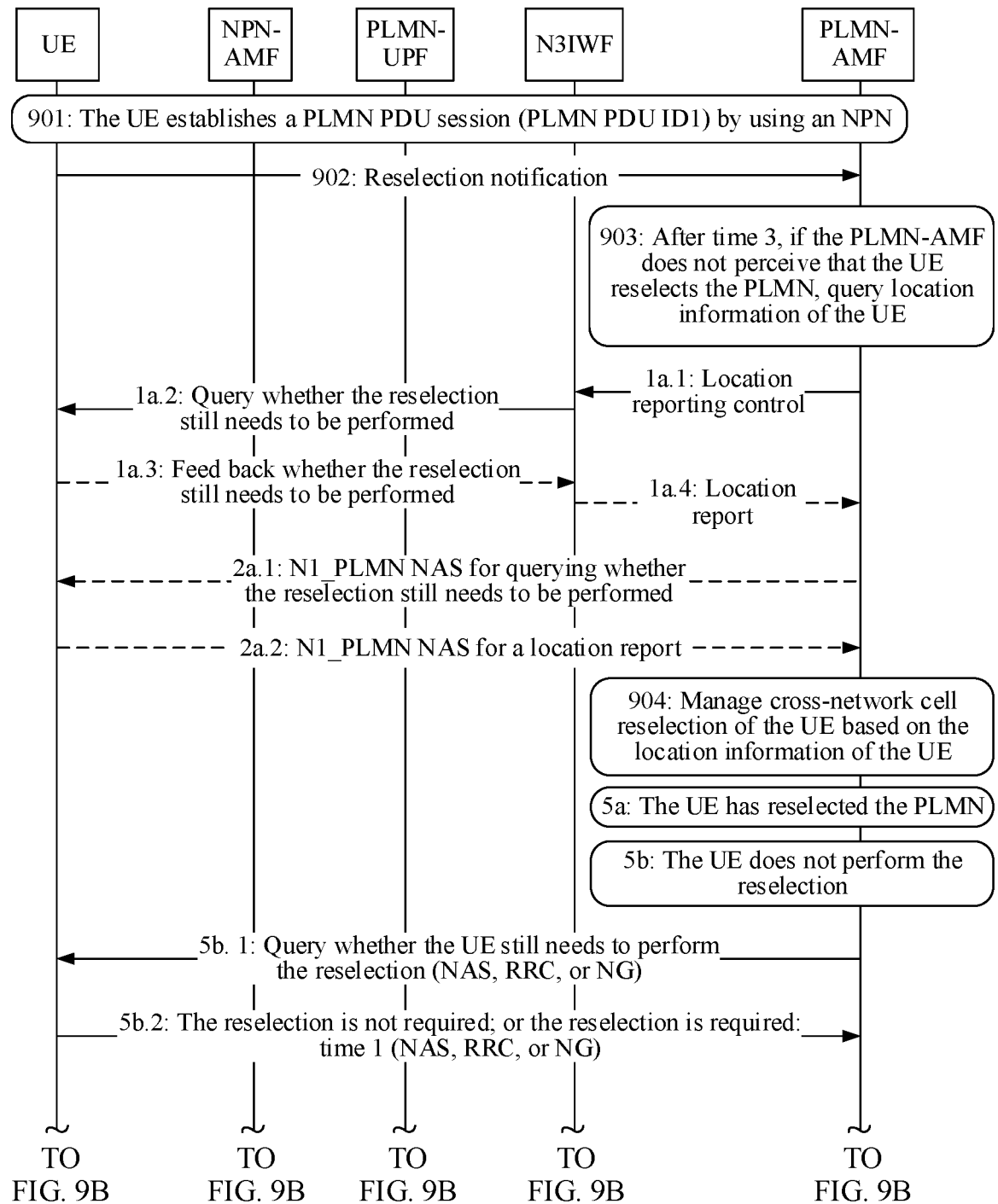
FIG. 9A and FIG. 9B are another example of a processing procedure of a network device when UE does not reselect a second network.
Figure 9B:
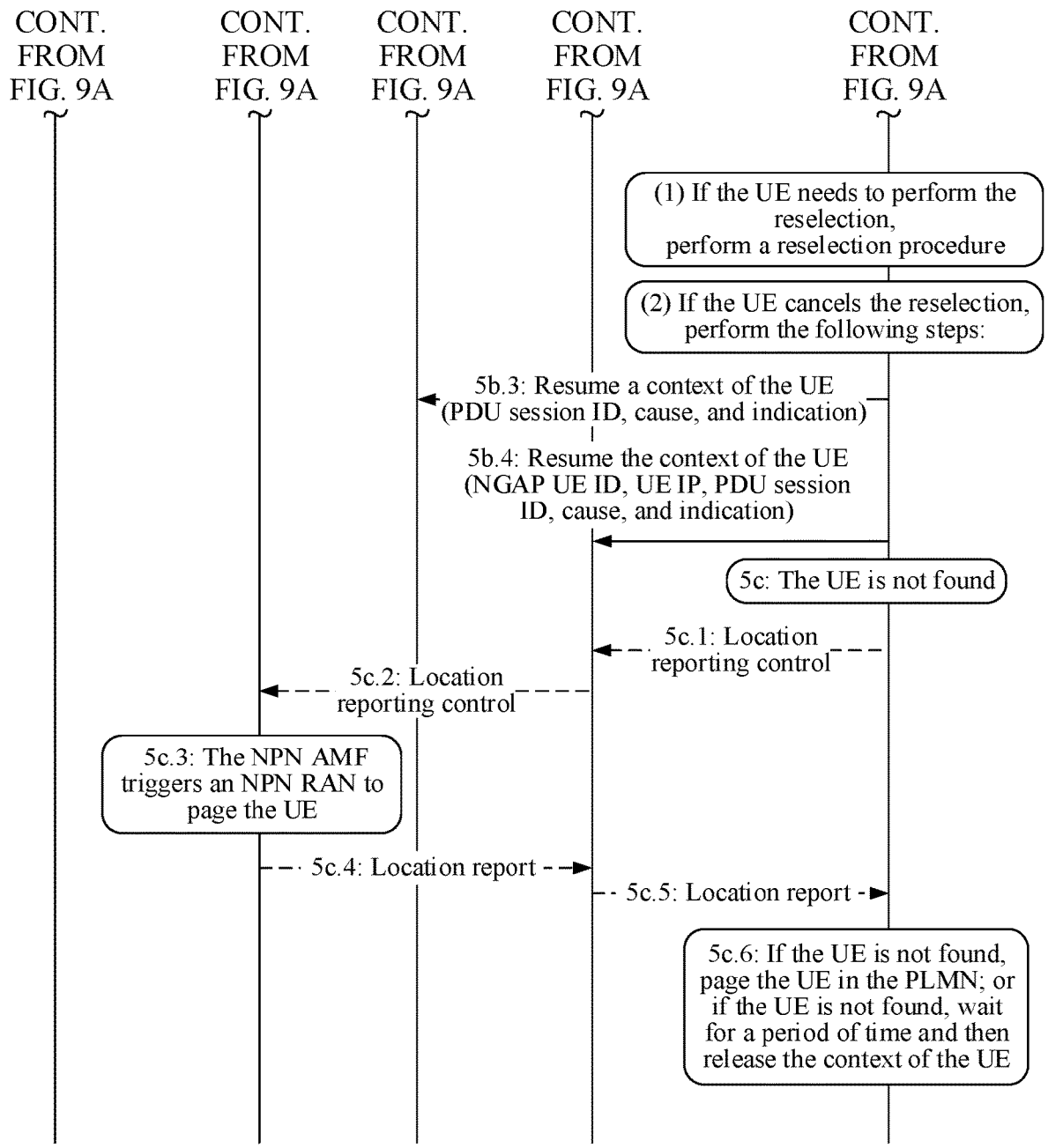

In some cases, the UE does not reselect the PLMN after notifying the PLMN-AMF that the UE is to perform the cross-network cell reselection. In this case, the PLMN-AMF initiates a process of querying location information of the UE, and then determines, based on the location information of the UE, to continue to wait for access of the UE, resume a context of the PLMN PDU session of the UE, continue the transmission of the user plane data of the PLMN PDU session, and release the context of the UE. Refer to FIG. 9A and FIG. 9B.

FIG. 9A and FIG. 9B are another example of a processing procedure of a network device when UE does not reselect a second network.

901: The UE establishes a PDU session of a PLMN by using an NPN.

It is assumed that an identifier of the PLMN PDU session is a PLMN PDU ID1.

902: When the UE needs to perform reselection from the NPN to the PLMN, the UE sends a reselection notification to a PLMN-AMF.

903: After third time, if the PLMN-AMF does not perceive that the UE accesses the PLMN, the PLMN-AMF queries location information of the UE.

In the embodiment shown in FIG. 8, before the cross-network cell reselection, the UE notifies the PLMN-AMF that the UE is to perform the cross-network cell reselection. After a period of time (for example, time3), the PLMN-AMF still does not directly or indirectly perceive that the UE accesses the PLMN. For example, the PLMN-AMF does not receive, from the UE, a request message that is used to request to re-establish a PLMN PDU session. The request message may be an N1_PLMN NAS message. In this case, the PLMN-AMF queries the location information of the UE.

Optionally, the PLMN-AMF may query the location information of the UE in a plurality of manners.

In an implementation, the PLMN-AMF queries the location information of the UE by using an N3IWF.

1a.1: The PLMN-AMF sends location reporting control to the N3IWF.

1a.2: The N3IWF queries whether the UE needs to perform the reselection.

1a.3: The UE feeds back the location information of the UE to the N3IWF.

Optionally, the UE feeds back the location information of the UE to a PLMN-RAN. The PLMN-RAN forwards the location information of the UE to the N3IWF.

1a.4: The N3IWF sends a location report to the PLMN-AMF.

In another implementation, the PLMN-AMF directly sends location reporting control to the UE.

2a.1: The PLMN-AMF sends the location reporting control to the UE by using an N1_PLMN-NAS message.

2a.2: The UE sends a location report to the PLMN-AMF by using an N1_PLMN-NAS message.

In any one of the foregoing implementations, the location reporting control message carries a UE ID (for example, an NGAP UE ID or an IP address of the UE) and a query cause (for example, it is queried whether the UE has performed the reselection).

In addition, the PLMN-AMF may find the PLMN-RAN based on information that is notified to the PLMN-AMF before the UE triggers the reselection in step 803 shown in FIG. 8, for example, information such as a PLMN NG-RAN Cell ID and a PLMN NG-RAN Node ID that are obtained after the UE performs the reselection.

Optionally, the N3IWF may be an NPN-N3IWF connected to the UE before the UE triggers the reselection in the NPN, or may be an N3IWF of the reselected PLMN, or may be an N3IWF shared by the source NPN and the target PLMN.

904: The PLMN-AMF manages the cross-network cell reselection of the UE based on the location information of the UE.

Based on the location information of the UE, the following separately describes cases 5a, 5b, 5c, and 5d.

5a: The UE has reselected the PLMN.

In this case, the PLMN-AMF continues to wait. For example, the PLMN-AMF continues to wait to establish a backhaul tunnel of user plane data of the PLMN PDU session (which is identified by the PLMN PDU ID1) for the UE.

5b: The UE does not perform the reselection.

In a possible case, the UE is still located in the source NPN, for example, is located in a source cell or is handed over to another cell of the source NPN.

5b.1: The PLMN-AMF may alternatively directly query, by using NAS information, the UE whether the UE still needs to perform the reselection.

5b.2: The UE feeds back, to the PLMN-AMF by using a NAS message, whether the UE still needs to perform the reselection.

Optionally, the PLMN-AMF queries the NPN-RAN through an NG interface whether the UE still needs to perform the cross-network cell reselection. The NPN-RAN queries the UE whether the UE still needs to perform the reselection. The UE feeds back, to the NPN-RAN by using an RRC message, whether the UE still needs to perform the reselection.

In an implementation, the UE indicates, by using an indication identifier, whether the UE still needs to perform the reselection. For example, 0 indicates that the reselection is not required, and 1 indicates that the reselection is required.

(1) Based on the feedback of the UE, if the UE needs to perform the cross-network cell reselection, the PLMN-AMF performs subsequent steps of the cross-network cell reselection based on the procedure shown in FIG. 8.

(2) If the UE does not perform the cross-network cell reselection, the PLMN-AMF performs the following procedure:

If the UE is still in the source cell, the PLMN-AMF notifies an NPN-UPF to resume a context of the UE and transmission of the user plane data of the PLMN PDU session (which is identified by the PLMN PDU ID1), and notifies the NPN-UPF of a cause for resuming the transmission and whether to immediately resume the data transmission.

In addition, the PLMN-AMF notifies the N3IWF to resume the context of the UE and the transmission of the user plane data of the PLMN PDU session (which is identified by the PLMN PDU ID1), and notifies the N3IWF of the cause for resuming the transmission and whether to immediately resume the data transmission. Further, the N3IWF notifies a network element such as the NPN-RAN to resume the context of the UE and the transmission of the user plane data of the PLMN PDU session (which is identified by the PLMN PDU ID1). Alternatively, the N3IWF first notifies, by using an N1 NAS message, the UE to resume the context and the transmission of the user plane data of the PLMN PDU session (which is identified by the PLMN PDU ID1). The UE further notifies, by using an RRC message, a network element such as the NPN-RAN to resume the context of the UE and the transmission of the user plane data of the PLMN PDU session (which is identified by the PLMN PDU ID1), as shown in 2-1 and 2-2 in FIG. 9A and FIG. 9B.

If the UE has been handed over to another cell of the source NPN-RAN, the PLMN-AMF initiates a procedure of reconfiguring a PDU session resource for the UE.

For example, the PLMN-AMF notifies the N3IWF to reconfigure the PLMN PDU session resource for the UE, and the N3IWF further notifies the NPN-RAN to reconfigure the resource and re-establish a PLMN DRB and an SRB for the UE.

5c: The PLMN-AMF does not find the UE.

In this case, the PLMN-AMF continues the following procedure:

5c.1: The PLMN-AMF sends a location reporting control message to the N3IWF to request to query the location information of the UE.

Herein, the N3IWF may be an N3IWF connected to the UE before the UE triggers the reselection in the NPN, or may be an N3IWF of the PLMN (namely, a PLMN-N3IWF) that the UE needs to reselect, or may be an N3IWF shared by the NPN and the PLMN.

The reporting control message carries the UE ID (for example, the IP address of the UE or the NGAP UE ID) and the query cause (for example, it is queried whether the UE has completed the reselection).

5c.2: The N3IWF sends the location reporting control message to the NPN-AMF to request to query the location information of the UE.

5c.3: The NPN-AMF initiates paging for the UE in the NPN.

5c.4: The NPN-AMF reports the location information of the UE to the N3IWF, and notifies the N3IWF whether the UE has triggered the cross-network cell reselection.

5c.5: The N3IWF reports the location information of the UE to the PLMN-AMF, and notifies the PLMN-AMF whether the UE has triggered the cross-network cell reselection.

In a possible case, the PLMN-AMF does not find the UE. In this case, the PLMN-AMF performs 5c.6.

5c.6: The PLMN-AMF notifies another network element of the PLMN to initiate paging for the UE in the PLMN.

If the UE is served by another NPN-RAN, intra-network handover is performed for the UE.

If paging that the UE is already in the PLMN, the NPN-AMF continues to wait, for example, to establish the backhaul tunnel of the user plane data of the PLMN PDU session for the UE.

If the paging fails and the UE is still not found, the NPN-AMF continues to wait for a period of time. After the period of time, the NPN-AMF notifies network elements such as the NPN-RAN and NPN-UPF to release the context of the UE.

It should be noted that in the steps 5c.1 to 5c.6, the PLMN-AMF initiates the paging for the UE in the NPN by using the network element of the NPN, and if the UE is not found, in step 5c.6, the PLMN-AMF initiates the paging again to the UE in the PLMN. A sequence of paging the UE in the PLMN and the NPN is not limited in this application, and is merely used as an example herein. For example, in 5c, if the UE is not found, the PLMN-AMF may alternatively first initiate the paging for the UE in the PLMN, and then initiate the paging for the UE in the NPN if the UE is not found.

The foregoing describes in detail the data transmission method in the process in which the UE performs the cross-network cell reselection in the NPN standalone networking architecture provided in this application. In conclusion, in this application, when UE performs cross-network cell reselection between an NPN and a PLMN, the UE notifies a network side in advance that the UE is to trigger the cross-network cell reselection, so that the network side pauses user plane data transmission of the UE. This reduces air interface packet loss caused during the cross-network reselection of the UE.

In addition, the network side buffers, based on a UE reselection notification, data that is not sent before the UE triggers the reselection, and then backhauls the data to the UE after the UE successfully reselects a target network. Therefore, a data backhaul amount can be reduced.

Alternatively, when the UE does not perform the cross-network cell reselection as planned, the network side promptly resumes transmission of user plane data of a PDU session of the UE, continues to wait for the UE to access the target network, or other processing. Therefore, a network-side processing solution is provided when the UE does not complete the cross-network reselection between the PLMN and the NPN.

The method provided in this application is described in detail above. The following describes communication apparatuses provided in this application.

Figure 10:
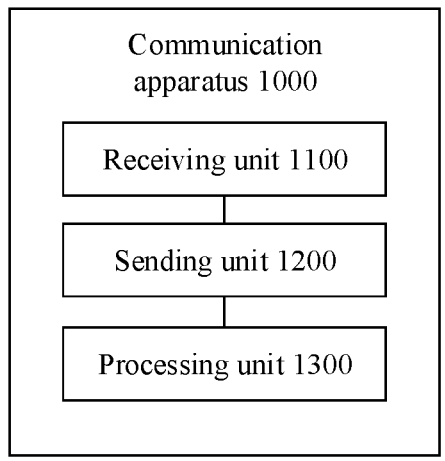
FIG. 10 is a schematic block diagram of a communication apparatus 1000 according to this application.

FIG. 10 is a schematic block diagram of a communication apparatus 1000 according to this application. As shown in FIG. 10, the communication apparatus 1000 includes a receiving unit 1100 and a sending unit 1200.

The receiving unit 1100 is configured to receive a first message, where the first message is used to indicate that a terminal device is to move from a first network to a second network, where the first network is a public network and the second network is a non-public network, or the first network is a non-public network and the second network is a public network.

The sending unit 1200 is configured to send a second message to a core network user plane network element of the first network, where the second message is used to indicate the core network user plane network element of the first network to pause transmission of user plane data of the first network of the terminal device.

Optionally, the receiving unit 1100 and the sending unit 1200 may alternatively be integrated into one transceiver unit, and have both receiving and sending functions. This is not limited herein.

Optionally, in an embodiment, the receiving unit 1100 is further configured to receive a third message from the core network user plane network element of the first network, where the third message carries second time information, and the second time information is used to indicate that the core network user plane network element of the first network is to pause the transmission of the user plane data of the first network of the terminal device after second time. Further, the communication apparatus 1000 further includes a processing unit 1300. The processing unit 1300 is configured to retain a context of the first network of the terminal device after first time or the second time.

Optionally, in an embodiment, the receiving unit 1100 receives the first message from an access network device of the first network, and the sending unit 1200 is further configured to send a fourth message to the access network device of the first network, where the fourth message carries the second time information, and the fourth message is used to notify the access network device of the first network that a core network control plane network element of the first network is to pause the transmission of the user plane data of the first network of the terminal device after the second time.

Optionally, in an embodiment, the receiving unit 1100 receives the first message from the terminal device, and the sending unit 1200 is further configured to send a fourth message to the first access network device, where the fourth message carries the following information: the second time information, first time information, a cause, immediate pause indication information, and proximity indication information.

Optionally, in an embodiment, the receiving unit 1100 is further configured to receive a NAS message from the terminal device, where the NAS message is used to indicate that the terminal device has accessed the second network; and the sending unit 1200 is further configured to send a fifth message to the access network device of the first network, where the fifth message is used to indicate the first access network device to send buffered user plane data of the first network of the terminal device.

Optionally, in an embodiment, the processing unit 1300 is configured to: after third time, determine whether the terminal device has accessed the second network, and when determining that the terminal device does not access the second network, query location information of the terminal device, and manage cross-network movement of the terminal device based on the location information of the terminal device.

Optionally, in an embodiment, the processing unit 1300 is further configured to: when determining that the terminal device is located in a source cell or another cell of the first network, query whether the terminal device still needs to perform the cross-network movement, and perform at least one of the following operations based on a query result:

If determining that the terminal device still needs to perform the cross-network movement, the processing unit 1300 continues to wait for the terminal device to access the second network.

Alternatively, if determining that the terminal device cancels the cross-network movement and the terminal device is currently located in the source cell, the sending unit 1200 is further configured to notify the core network user plane network element of the first network and the access network device of the first network to resume the transmission of the user plane data of the first network of the terminal device.

Alternatively, if determining that the terminal device cancels the cross-network movement and the terminal device is currently located in the another cell of the first network, the processing unit 1300 is further configured to reconfigure a PDU session resource for the terminal device.

Optionally, in an embodiment, the processing unit 1300 is further configured to: when determining that the terminal device has re-accessed the second network, continue to wait.

Optionally, in an embodiment, when the processing unit 1300 does not find the terminal device, the sending unit 1200 is further configured to notify a network element of the second network to initiate paging for the terminal device in the second network, and perform at least one of the following operations based on a paging result:

If it is paged that the terminal device has moved to the second network, the processing unit 1300 is further configured to wait for the terminal device to access the second network.

Alternatively, if the terminal device is not paged in the second network, the processing unit 1300 pages the terminal device in the first network, and if the terminal device is still not paged in the first network, the processing unit 1300 waits for a period of time and releases a context of the terminal device; and the sending unit 1200 is further configured to notify the access network device of the first network and the core network user plane network element of the first network to release a context of a PDU session of the first network of the terminal device.

Optionally, in an embodiment, the sending unit 1200 is further configured to send a location reporting control message to an N3IWF, the access network device of the first network, or an access network device of the second network, where the location reporting control message is used to query the location information of the terminal device.

In addition, the receiving unit 1100 is further configured to receive a location report from the N3IWF, the access network device of the first network, or the access network device of the second network, where the location report carries the location information of the terminal device.

Optionally, in an embodiment, the sending unit 1200 is further configured to send a resume message to the core network user plane network element of the first network and the access network device of the first network, where the resume message carries one or more of the following information: a session identifier of the PDU session of the first network of the terminal device, a device identifier of the terminal device, a cause for resuming the transmission, and information indicating whether to immediately resume the transmission.

In an implementation, the communication apparatus 1000 may be the core network control plane network element of the first network in the method embodiments. In this implementation, the receiving unit 1100 may be a receiver, and the sending unit 1200 may be a transmitter. The receiver and the transmitter may alternatively be integrated into one transceiver. The processing unit 1300 may be a processing apparatus.

In another implementation, the communication apparatus 1000 may be a chip or an integrated circuit installed in the core network control plane network element of the first network. In this implementation, the receiving unit 1100 and the sending unit 1200 may be communication interfaces. For example, the receiving unit 1100 is an input interface or an input circuit, and the sending unit 1200 is an output interface or an output circuit. The processing unit 1300 may be a processing apparatus.

Herein, a function of the processing apparatus may be implemented by hardware, or may be implemented by hardware executing corresponding software. For example, the processing apparatus may include a memory and a processor. The memory is configured to store a computer program, and the processor reads and executes the computer program stored in the memory, so that the communication apparatus 1000 performs an operation and/or processing performed by the core network control plane network element of the first network in the method embodiments. Optionally, the processing apparatus may include only the processor, and the memory configured to store the computer program is located outside the processing apparatus. The processor is connected to the memory through a circuit/cable, to read and execute the computer program stored in the memory.

Figure 11:
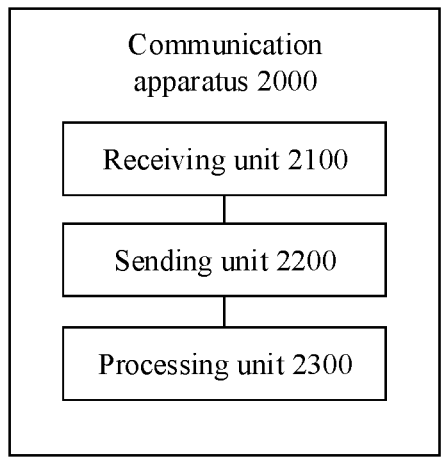
FIG. 11 is a schematic block diagram of a communication apparatus 2000 according to this application.

FIG. 11 is a schematic block diagram of a communication apparatus 2000 according to this application. As shown in FIG. 11, the communication apparatus 2000 includes a receiving unit 2100 and a sending unit 2200.

The receiving unit 2100 is configured to receive a first RRC message from a terminal device, where the first RRC message is used to indicate that the terminal device is to move from a first network to a second network, where the first network is a public network and the second network is a non-public network, or the first network is a non-public network and the second network is a public network.

The sending unit 2200 is configured to send a first message to a core network control plane network element of the first network, where the first message is used to indicate to the core network control plane network element of the first network that the terminal device is to move from the first network to the second network.

Optionally, the receiving unit 2100 and the sending unit 2200 may alternatively be integrated into one transceiver unit, and have both receiving and sending functions. This is not limited herein.

Optionally, in an embodiment, the receiving unit 2100 is further configured to receive a fourth message from the core network control plane network element of the first network, where the fourth message carries second time information, and the second time information is used to indicate that a core network user plane network element of the first network is to pause transmission of user plane data of the first network of the terminal device after second time.

Optionally, in an embodiment, the sending unit 2200 is further configured to send a second RRC message to the terminal, where the second RRC message carries the second time information, and the second time information is used to indicate that the core network user plane network element of the first network is to pause the transmission of the user plane data of the first network of the terminal device after the second time. Further, the communication apparatus 2000 further includes a processing unit 2300. The processing unit 2300 is configured to retain a context of the first network of the terminal device after first time or the second time.

Optionally, in an embodiment, the receiving unit 2100 is further configured to receive a fifth message from the core network control plane network element of the first network, where the fifth message is used to indicate an access network device of the first network to send buffered user plane data of the first network of the terminal device.

Optionally, in an embodiment, the processing unit 2300 is configured to indicate, based on first time information received by the receiving unit 2100, the sending unit 2200 not to send data to the terminal device after the first time. In addition, the processing unit 2300 is further configured to: after determining that the receiving unit 2100 receives a notification from the core network control plane network element of the first network for resuming the transmission of the user plane data of the first network of the terminal device, resume the context of the first network of the terminal device, and control the sending unit 2200 to send a third RRC message to the terminal device, where the third RRC message is used to notify the terminal device to resume the context of the first network, and the third RRC message carries one or more of the following information: a session identifier of a PDU session of the first network of the terminal device, a device identifier of the terminal device, a cause for resuming the transmission, and information indicating whether to immediately resume the transmission.

In an implementation, the communication apparatus 2000 may be the core network control plane network element of the first network in the method embodiments. In this implementation, the receiving unit 2100 may be a receiver, and the sending unit 2200 may be a transmitter. The receiver and the transmitter may alternatively be integrated into one transceiver. The processing unit 2300 may be a processing apparatus.

In another implementation, the communication apparatus 2000 may be a chip or an integrated circuit installed in the access network device of the first network. In this implementation, the receiving unit 2100 and the sending unit 2200 may be communication interfaces. For example, the receiving unit 2100 is an input interface or an input circuit, and the sending unit 2200 is an output interface or an output circuit. The processing unit 2300 may be a processing apparatus.

Herein, a function of the processing apparatus may be implemented by hardware, or may be implemented by hardware executing corresponding software. For example, the processing apparatus may include a memory and a processor. The memory is configured to store a computer program, and the processor reads and executes the computer program stored in the memory, so that the communication apparatus 2000 performs an operation and/or processing performed by the access network device of the first network in the method embodiments. Optionally, the processing apparatus may include only the processor, and the memory configured to store the computer program is located outside the processing apparatus. The processor is connected to the memory through a circuit/cable, to read and execute the computer program stored in the memory.

Figure 12:
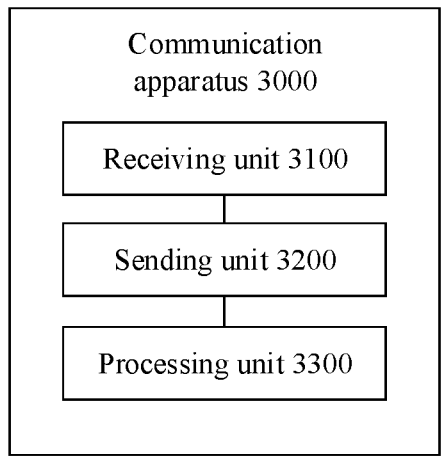
FIG. 12 is a schematic block diagram of a communication apparatus 3000 according to this application.

FIG. 12 is a schematic block diagram of a communication apparatus 3000 according to this application. As shown in FIG. 12, the communication apparatus 3000 includes a receiving unit 3100 and a sending unit 3200.

The receiving unit 3100 is configured to receive a second message from a core network control plane network element of a first network, where the second message is used to indicate the communication apparatus 3000 to pause transmission of user plane data of the first network of a terminal device.

The sending unit 3200 is configured to send a third message to the core network control plane network element of the first network, where the third message is used to indicate that the communication apparatus 3000 is to pause the transmission of the user plane data of the first network of the terminal device.

Optionally, the receiving unit 3100 and the sending unit 3200 may alternatively be integrated into one transceiver unit, and have both receiving and sending functions. This is not limited herein.

Further, the communication apparatus 3000 may further include a processing unit 3300. The processing unit 3300 is configured to retain a context of the first network of the terminal device after first time or second time.

In an implementation, the communication apparatus 3000 may be the core network user plane network element of the first network in the method embodiments. In this implementation, the receiving unit 3100 may be a receiver, and the sending unit 3200 may be a transmitter. The receiver and the transmitter may alternatively be integrated into one transceiver. The processing unit 3300 may be a processing apparatus.

In another implementation, the communication apparatus 2000 may be a chip or an integrated circuit installed in the access network device of the first network. In this implementation, the receiving unit 3100 and the sending unit 3200 may be communication interfaces. For example, the receiving unit 3100 is an input interface or an input circuit, and the sending unit 3200 is an output interface or an output circuit. The processing unit 3300 may be a processing apparatus.

Herein, a function of the processing apparatus may be implemented by hardware, or may be implemented by hardware executing corresponding software. For example, the processing apparatus may include a memory and a processor. The memory is configured to store a computer program, and the processor reads and executes the computer program stored in the memory, so that the communication apparatus 3000 performs an operation and/or processing performed by the access network device of the first network in the method embodiments. Optionally, the processing apparatus may include only the processor, and the memory configured to store the computer program is located outside the processing apparatus. The processor is connected to the memory through a circuit/cable, to read and execute the computer program stored in the memory.

Figure 13:
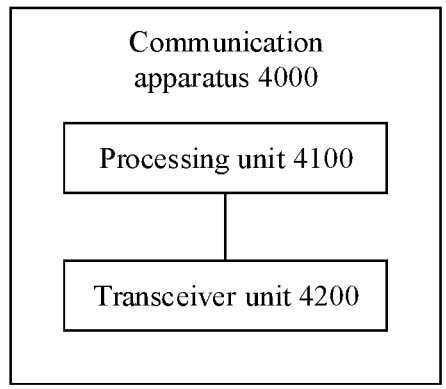
FIG. 13 is a schematic block diagram of a communication apparatus 4000 according to this application.

FIG. 13 is a schematic block diagram of a communication apparatus 4000 according to this application. As shown in FIG. 13, the communication apparatus 4000 includes a processing unit 4100 and a transceiver unit 4200.

The processing unit 4100 is configured to enable the communication apparatus 4000 to access a first network.

The processing unit 4100 is further configured to: when determining that the communication apparatus 4000 needs to perform cross-network movement from the first network to a second network, control the transceiver unit 4200 to send a first message to a core network control plane network element of the first network or send a first RRC message to an access network device of the first network, where the first message or the first RRC message is used to indicate that the communication apparatus 4000 is to move from the first network to the second network; and the first network is a public network and the second network is a non-public network, or the first network is a non-public network and the second network is a public network.

Optionally, the transceiver unit 4200 may alternatively be replaced with a receiving unit and/or a sending unit.

For example, the transceiver unit 4200 may be replaced with a receiving unit when the transceiver unit 4200 performs a receiving step. The transceiver unit 4200 may be replaced with the sending unit when the transceiver unit 4200 performs a sending step.

Optionally, in an embodiment, the transceiver unit 4200 is further configured to receive a second RRC message from the access network device of the first network, where the second RRC message carries second time information, and the second time information is used to indicate that a core network user plane network element of the first network is to pause transmission of user plane data of the first network of the communication apparatus 4000 after second time; or the transceiver unit 4200 is further configured to receive a NAS message from the core network control plane network element of the first network, where the NAS message carries the second time information. Further, the processing unit 4100 is further configured to still retain a context of the first network after first time or the second time.

Optionally, in an embodiment, the transceiver unit 4200 is further configured to send a NAS message to the core network control plane network element of the first network, where the NAS message is used to indicate that the communication apparatus 4000 has accessed the second network, so that the core network control plane network element of the first network notifies the access network device of the first network to send buffered user plane data of the first network of the communication apparatus 4000. In addition, the transceiver unit 4200 is further configured to receive a third RRC message from the access network device of the first network, where the third RRC message carries one or more of the following information: a session identifier of a PDU session of the first network of the communication apparatus, a device identifier of the communication apparatus, a cause for resuming the transmission, or information indicating whether to immediately resume the transmission. The processing unit 4100 is further configured to resume the context of the first network based on the third RRC message.

Optionally, in an embodiment, when the communication apparatus is located in the first network, the processing unit 4100 and the transceiver unit 4200 are further configured to enable the communication apparatus to access the second network by using the first network. When the processing unit 4100 determines that the communication apparatus needs to move from the first network to the second network, the transceiver unit 4200 is further configured to send a first message to a core network control plane network element of the second network, where the first message is used to indicate that the communication apparatus 4000 is to move from the first network to the second network; and the first network is a public network and the second network is a non-public network, or the first network is a non-public network and the second network is a public network.

Optionally, in an embodiment, the transceiver unit 4200 is further configured to receive a NAS message from the core network control plane network element of the second network, where the NAS message carries second time information, and the second time information is used to indicate that a core network user plane network element of the second network is to pause transmission of user plane data of the second network of the communication apparatus 4000 after second time.

Optionally, in an embodiment, the transceiver unit 4200 is further configured to send an RRC message to the access network device of the first network, where the RRC message carries the second time information.

Optionally, in an embodiment, the transceiver unit 4200 is further configured to send a NAS message to the core network control plane network element of the first network, where the NAS message is used to notify to send buffered user plane data of the second network of the communication apparatus 4000.

In an implementation, the communication apparatus 4000 may be the terminal device in the method embodiments. In this implementation, the transceiver unit 4200 may be a transceiver. The transceiver has a sending function and/or a receiving function. The processing unit 4100 is a processing apparatus.

In another implementation, the communication apparatus 4000 may be a chip or an integrated circuit installed in the terminal device. In this implementation, the transceiver unit 4200 may be a communication interface, for example, an input/output interface or an input/output circuit. The processing unit 4100 may be a processing apparatus.

Herein, a function of the processing apparatus may be implemented by hardware, or may be implemented by hardware executing corresponding software. For example, the processing apparatus may include a memory and a processor. The memory is configured to store a computer program, and the processor reads and executes the computer program stored in the memory, so that the communication apparatus 3000 performs an operation and/or processing performed by the terminal device in the method embodiments. Optionally, the processing apparatus may include only the processor, and the memory configured to store the computer program is located outside the processing apparatus. The processor is connected to the memory through a circuit/cable, to read and execute the computer program stored in the memory.

Figure 14:
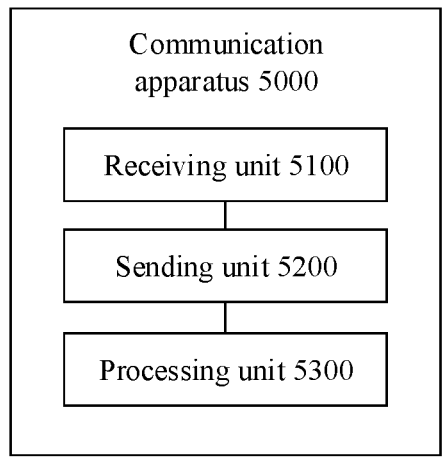
FIG. 14 is a schematic block diagram of a communication apparatus 5000 according to this application.

FIG. 14 is a schematic block diagram of a communication apparatus 5000 according to this application. As shown in FIG. 14, the communication apparatus 5000 includes a receiving unit 5100 and a sending unit 5200.

The receiving unit 5100 is configured to receive a sixth message from a terminal device, where the terminal device is located in a first network, and the sixth message is used to indicate that the terminal device is to move from the first network to a second network, where the first network is a public network and the second network is a non-public network, or the first network is a non-public network and the second network is a public network.

The sending unit 5200 is configured to send a seventh message to a core network user plane network element of the second network, where the seventh message is used to indicate the core network user plane network element of the second network to pause transmission of user plane data of the second network of the terminal device.

Optionally, the receiving unit 5100 and the sending unit 5200 may alternatively be integrated into one transceiver unit, and have both receiving and sending functions. This is not limited herein.

Optionally, in an embodiment, the receiving unit 5100 is further configured to receive an eighth message from the core network user plane network element of the second network, where the eighth message carries second time information, and the second time information is used to indicate that the core network user plane network element of the second network is to pause the transmission of the user plane data of the second network of the terminal device after second time. Further, the communication apparatus 5000 further includes a processing unit 5300. The processing unit 5300 is configured to retain a context of the second network of the terminal device after first time or the second time.

Optionally, in an embodiment, the sending unit 5200 is further configured to send the second time information to the terminal device by using a NAS message; or the sending unit 5200 is further configured to send the second time information to a non-3rd generation partnership project interworking function N3IWF.

Optionally, in an embodiment, the processing unit 5300 is further configured to: after third time, determine whether the terminal device has accessed the second network, and when determining that the terminal device does not access the second network, query location information of the terminal device, and manage cross-network movement of the terminal device based on the location information of the terminal device.

Optionally, in an embodiment, the processing unit 5300 is further configured to: when determining that the terminal device is located in a source cell or another cell of the first network, query whether the terminal device still needs to perform the cross-network movement, and perform at least one of the following operations based on a query result:

If determining that the terminal device still needs to perform the cross-network movement, the processing unit 5300 continues to wait for the terminal device to access the second network.

Alternatively, if determining that the terminal device cancels the cross-network movement, the sending unit 5200 is further configured to notify the core network user plane network element of the second network and an access network device of the first network to resume the transmission of the user plane data of the second network of the terminal device.

Optionally, in an embodiment, the processing unit 5300 is further configured to: when determining that the terminal device has moved to the second network, continue to wait.

Optionally, in an embodiment, the processing unit 5300 is further configured to: when the terminal device is not found, control the sending unit 5200 to notify a network element of the first network to page the terminal device in the first network. When determining that the terminal device is not paged in the first network, the processing unit 5300 pages the terminal device in the second network.

The processing unit 5300 is further configured to: after a period of time after determining that the terminal device is still not paged in the second network, control the sending unit 5200 to notify an access network device of the second network and the core network user plane network element of the second network to release a context of a protocol data unit PDU session of the second network of the terminal device.

Optionally, in an embodiment, the sending unit 5200 is further configured to send a location reporting control message to the N3IWF or the access network device of the second network, where the location reporting control message is used to query the location information of the terminal device; and the receiving unit 5100 is further configured to receive a location report from the N3IWF or the access network device of the second network, where the location report carries the location information of the terminal device.

Optionally, in an embodiment, the sending unit 5200 is further configured to send a resume message to the core network user plane network element of the second network and the access network device of the first network, where the resume message carries one or more of the following information: a session identifier of the PDU session of the second network of the terminal device, a device identifier of the terminal device, a cause for resuming the transmission, and information indicating whether to immediately resume the transmission.

In an implementation, the communication apparatus 5000 may be the core network control plane network element of the second network in the method embodiments. In this implementation, the receiving unit 5100 may be a receiver, and the sending unit 5200 may be a transmitter. The receiver and the transmitter may alternatively be integrated into one transceiver. The processing unit 5300 may be a processing apparatus.

In another implementation, the communication apparatus 5000 may be a chip or an integrated circuit installed in the access network device of the first network. In this implementation, the receiving unit 5100 and the sending unit 5200 may be communication interfaces. For example, the receiving unit 5100 is an input interface or an input circuit, and the sending unit 5200 is an output interface or an output circuit. The processing unit 5300 may be a processing apparatus.

Herein, a function of the processing apparatus may be implemented by hardware, or may be implemented by hardware executing corresponding software. For example, the processing apparatus may include a memory and a processor. The memory is configured to store a computer program, and the processor reads and executes the computer program stored in the memory, so that the communication apparatus 5000 performs an operation and/or processing performed by the core network control plane network element of the second network in the method embodiments. Optionally, the processing apparatus may include only the processor, and the memory configured to store the computer program is located outside the processing apparatus. The processor is connected to the memory through a circuit/cable, to read and execute the computer program stored in the memory.

Figure 15:
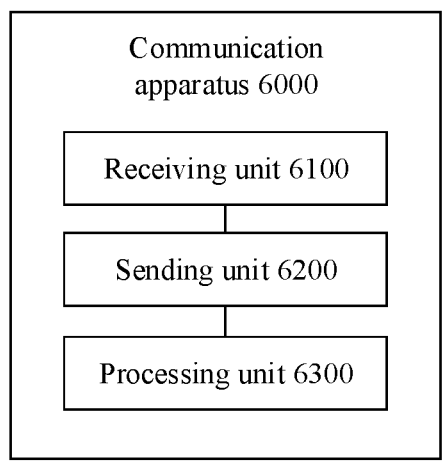
FIG. 15 is a schematic block diagram of a communication apparatus 6000 according to this application.

FIG. 15 is a schematic block diagram of a communication apparatus 6000 according to this application. As shown in FIG. 15, the communication apparatus 6000 includes a receiving unit 6100 and a sending unit 6200.

The receiving unit 6100 is configured to receive a seventh message from a core network control plane network element of a second network, where the seventh message is used to indicate a core network user plane network element of the second network to pause transmission of user plane data of the second network of a terminal device.

The sending unit 6200 is configured to return an eighth message to the core network control plane network element of the second network, where the eighth message is used to indicate that the core network user plane network element of the second network is to pause the transmission of the user plane data of the second network of the terminal device.

Optionally, the receiving unit 6100 and the sending unit 6200 may alternatively be integrated into one transceiver unit, and have both receiving and sending functions. This is not limited herein.

Optionally, the communication apparatus 6000 may further include a processing unit 6300. The processing unit 6300 is further configured to retain a context of the second network of the terminal device after first time or second time.

In an implementation, the communication apparatus 6000 may be the core network user plane network element of the second network in the method embodiments. In this implementation, the receiving unit 6100 may be a receiver, and the sending unit 6200 may be a transmitter. The receiver and the transmitter may alternatively be integrated into one transceiver. The processing unit 6300 may be a processing apparatus.

In another implementation, the communication apparatus 6000 may be a chip or an integrated circuit installed in the core network user plane network element of the second network. In this implementation, the receiving unit 6100 and the sending unit 6200 may be communication interfaces. For example, the receiving unit 6100 is an input interface or an input circuit, and the sending unit 6200 is an output interface or an output circuit. The processing unit 6300 may be a processing apparatus.

Herein, a function of the processing apparatus may be implemented by hardware, or may be implemented by hardware executing corresponding software. For example, the processing apparatus may include a memory and a processor. The memory is configured to store a computer program, and the processor reads and executes the computer program stored in the memory, so that the communication apparatus 6000 performs an operation and/or processing performed by the core network user plane network element of the second network in the method embodiments. Optionally, the processing apparatus may include only the processor, and the memory configured to store the computer program is located outside the processing apparatus. The processor is connected to the memory through a circuit/cable, to read and execute the computer program stored in the memory.

Figure 16:
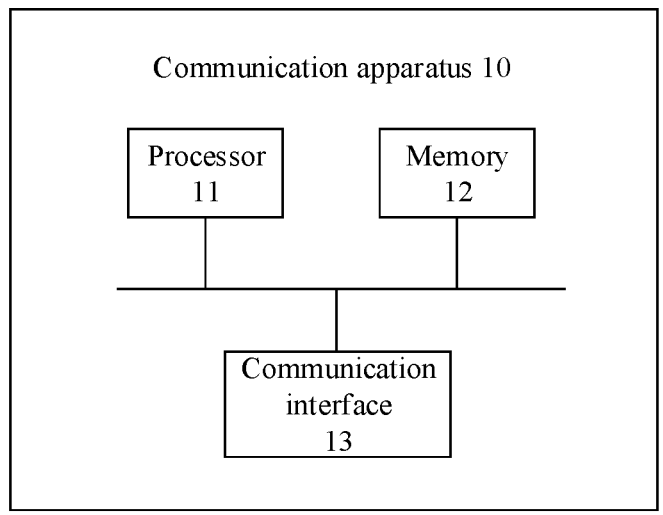
FIG. 16 is a schematic diagram of a structure of a communication apparatus 10 according to this application.

FIG. 16 is a schematic diagram of a structure of a communication apparatus 10 according to this application. As shown in FIG. 16, the communication apparatus 10 includes one or more processors 11, one or more memories 12, and one or more communication interfaces 13. The processor 11 is configured to control the communication interface 13 to send/receive a signal, the memory 12 is configured to store a computer program, and the processor 11 is configured to invoke the computer program from the memory 12 and run the computer program, to perform the procedure and/or operation performed by the core network control plane network element of the first network in the embodiments of the data transmission method provided in this application.

For example, the processor 11 may have a function of the processing unit 1300 shown in FIG. 10, and the communication interface 13 may have functions of the receiving unit 1100 and the sending unit 1200 shown in FIG. 10. For details, refer to the descriptions in FIG. 10. Details are not described herein again.

Optionally, when the communication apparatus 10 is the core network control plane network element of the first network, the processor 11 may be a baseband apparatus installed in the communication apparatus 10, and the communication interface 13 may be a radio frequency apparatus.

Figure 17:
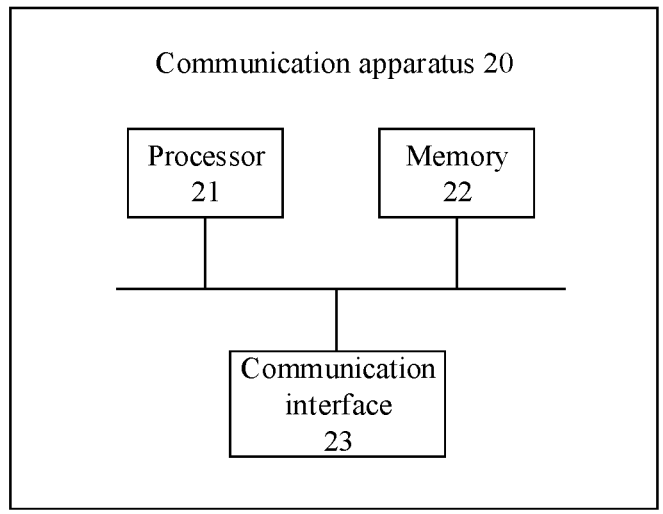
FIG. 17 is a schematic diagram of a structure of a communication apparatus 20 according to this application.

FIG. 17 is a schematic diagram of a structure of a communication apparatus 20 according to this application. As shown in FIG. 17, the communication apparatus 20 includes one or more processors 21, one or more memories 22, and one or more communication interfaces 23. The processor 21 is configured to control the communication interface 23 to send/receive a signal, the memory 22 is configured to store a computer program, and the processor 21 is configured to invoke the computer program from the memory 22 and run the computer program, to perform the procedure and/or operation performed by the access network device of the first network in the embodiments of the data transmission method provided in this application.

For example, the processor 21 may have a function of the processing unit 2300 shown in FIG. 11, and the communication interface 23 may have functions of the receiving unit 2100 and the sending unit 2200 shown in FIG. 11. For details, refer to the descriptions in FIG. 11. Details are not described herein again.

Optionally, when the communication apparatus is the access network device of the first network, the processor 21 may be a baseband apparatus installed in the communication apparatus 20, and the communication interface 13 may be a radio frequency apparatus.

Figure 18:
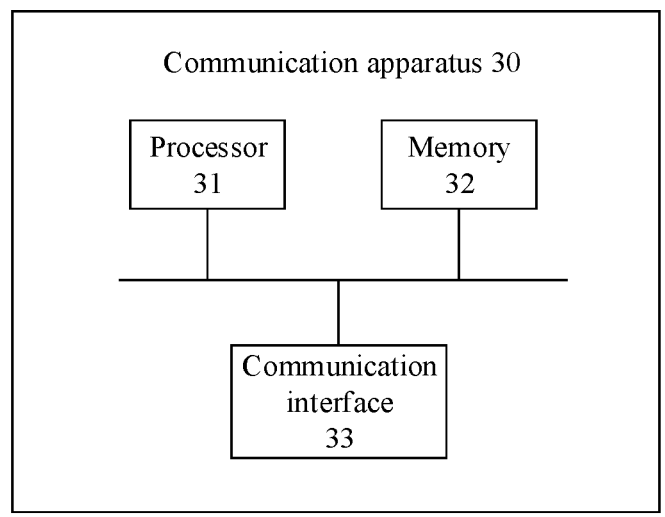
FIG. 18 is a schematic diagram of a structure of a communication apparatus 30 according to this application.

FIG. 18 is a schematic diagram of a structure of a communication apparatus 30 according to this application. As shown in FIG. 18, the communication apparatus 30 includes one or more processors 31, one or more memories 32, and one or more communication interfaces 33. The processor 31 is configured to control the communication interface 33 to send/receive a signal, the memory 32 is configured to store a computer program, and the processor 31 is configured to invoke the computer program from the memory 32 and run the computer program, to perform the procedure and/or operation performed by the core network user plane network element of the first network in the embodiments of the data transmission method provided in this application.

For example, the processor 31 may have a function of the processing unit 3300 shown in FIG. 12, and the communication interface 33 may have functions of the receiving unit 3100 and the sending unit 3200 shown in FIG. 12. For details, refer to the descriptions in FIG. 12. Details are not described herein again.

Optionally, when the communication apparatus 30 is the core network user plane network element of the first network, the processor 31 may be a baseband apparatus installed in the communication apparatus 30, and the communication interface 33 may be a radio frequency apparatus.

Figure 19:
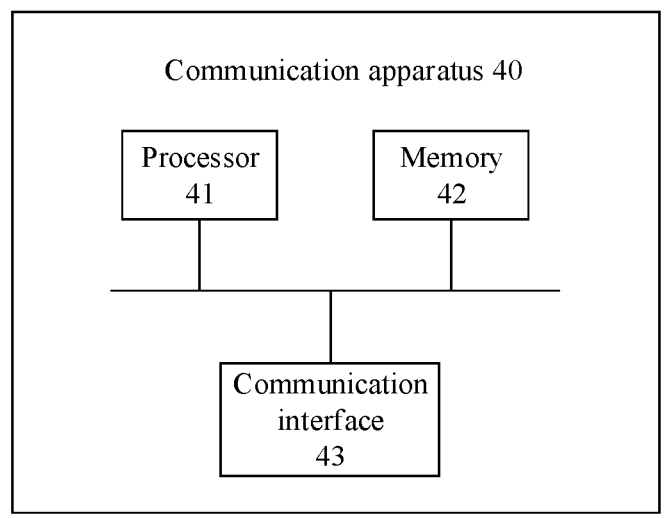
FIG. 19 is a schematic diagram of a structure of a communication apparatus 40 according to this application.

FIG. 19 is a schematic diagram of a structure of a communication apparatus 40 according to this application. As shown in FIG. 19, the communication apparatus 40 includes one or more processors 41, one or more memories 42, and one or more communication interfaces 43. The processor 41 is configured to control the communication interface 43 to send/receive a signal, the memory 42 is configured to store a computer program, and the processor 41 is configured to invoke the computer program from the memory 42 and run the computer program, to perform the procedure and/or operation performed by the terminal device in the embodiments of the data transmission method provided in this application.

For example, the processor 41 may have a function of the processing unit 4100 shown in FIG. 13, and the communication interface 43 may have a function of the transceiver unit 4200 shown in FIG. 13. For details, refer to the descriptions in FIG. 13. Details are not described herein again.

Optionally, when the communication apparatus is the terminal device, the processor 41 may be a baseband apparatus installed in the communication apparatus 40, and the communication interface 43 may be a radio frequency apparatus.

Figure 20:
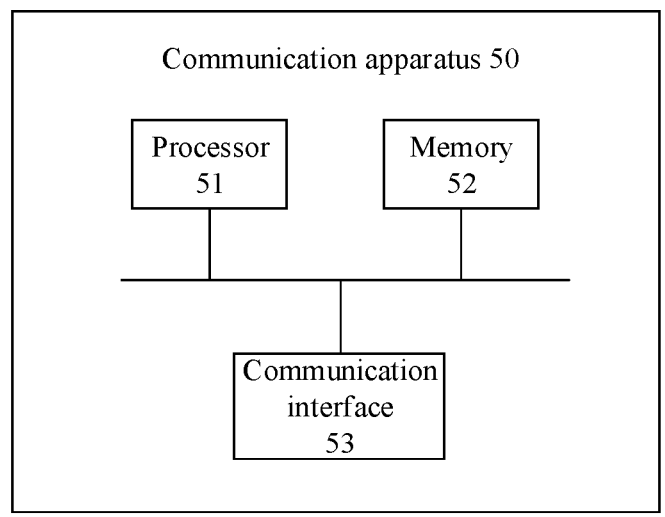
FIG. 20 is a schematic diagram of a structure of a communication apparatus 50 according to this application.

FIG. 20 is a schematic diagram of a structure of a communication apparatus 50 according to this application. As shown in FIG. 20, the communication apparatus 50 includes one or more processors 51, one or more memories 52, and one or more communication interfaces 53. The processor 51 is configured to control the communication interface 53 to send/receive a signal, the memory 52 is configured to store a computer program, and the processor 51 is configured to invoke the computer program from the memory 52 and run the computer program, to perform the procedure and/or operation performed by the core network control plane network element of the second network in the embodiments of the data transmission method provided in this application.

For example, the communication interface 53 may have functions of the receiving unit 5100 and the sending unit 5200 shown in FIG. 14. The processor 51 may have a function of the processing unit 5300 shown in FIG. 14. For details, refer to the descriptions in FIG. 14. Details are not described herein again.

Optionally, when the communication apparatus 50 is the core network control plane network element of the second network, the processor 51 may be a baseband apparatus installed in the communication apparatus 50, and the communication interface 53 may be a radio frequency apparatus.

Figure 21:
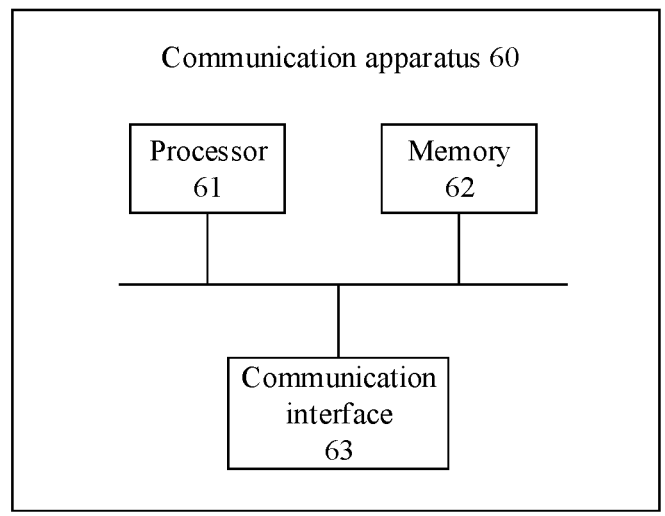
FIG. 21 is a schematic diagram of a structure of a communication apparatus 60 according to this application.

FIG. 21 is a schematic diagram of a structure of a communication apparatus 60 according to this application. As shown in FIG. 21, the communication apparatus 60 includes one or more processors 61, one or more memories 62, and one or more communication interfaces 63. The processor 61 is configured to control the communication interface 63 to send/receive a signal, the memory 62 is configured to store a computer program, and the processor 61 is configured to invoke the computer program from the memory 62 and run the computer program, to perform the procedure and/or operation performed by the core network user plane network element of the second network in the embodiments of the data transmission method provided in this application.

For example, the communication interface 63 may have functions of the receiving unit 6100 and the sending unit 6200 shown in FIG. 15. The processor 61 may have a function of the processing unit 6300 shown in FIG. 15. For details, refer to the descriptions in FIG. 15. Details are not described herein again.

Optionally, when the communication apparatus 60 is the core network user plane network element of the second network, the processor 61 may be a baseband apparatus installed in the communication apparatus 60, and the communication interface 63 may be a radio frequency apparatus.

Optionally, the memory and the processor in the foregoing apparatus embodiments may be physically independent units, or the memory and the processor may be integrated together.

In addition, this application further provides a computer-readable storage medium. The computer-readable storage medium stores computer instructions. When the computer instructions are run on a computer, the computer is enabled to perform the operation and/or procedure performed by the core network control plane network element of the first network in the data transmission method provided in this application.

This application further provides a computer-readable storage medium. The computer-readable storage medium stores computer instructions. When the computer instructions are run on a computer, the computer is enabled to perform the operation and/or procedure performed by the access network device of the first network in the data transmission method provided in this application.

This application further provides a computer-readable storage medium. The computer-readable storage medium stores computer instructions. When the computer instructions are run on a computer, the computer is enabled to perform the operation and/or procedure performed by the core network user plane network element of the first network in the data transmission method provided in this application.

This application further provides a computer-readable storage medium. The computer-readable storage medium stores computer instructions. When the computer instructions are run on a computer, the computer is enabled to perform the operation and/or procedure performed by the core network control plane network element of the second network in the data transmission method provided in this application.

This application further provides a computer-readable storage medium. The computer-readable storage medium stores computer instructions. When the computer instructions are run on a computer, the computer is enabled to perform the operation and/or procedure performed by the core network user plane network element of the second network in the data transmission method provided in this application.

This application further provides a computer-readable storage medium. The computer-readable storage medium stores computer instructions. When the computer instructions are run on a computer, the computer is enabled to perform the operation and/or procedure performed by the terminal device in the data transmission method provided in this application.

This application further provides a computer program product. The computer program product includes computer program code. When the computer program code runs on a computer, the computer is enabled to perform the operation and/or procedure performed by the core network control plane network element of the first network in the data transmission method provided in this application.

This application further provides a computer program product. The computer program product includes computer program code. When the computer program code runs on a computer, the computer is enabled to perform the operation and/or procedure performed by the access network device of the first network in the data transmission method provided in this application.

This application further provides a computer program product. The computer program product includes computer program code. When the computer program code runs on a computer, the computer is enabled to perform the operation and/or procedure performed by the core network user plane network element of the first network in the data transmission method provided in this application.

This application further provides a computer program product. The computer program product includes computer program code. When the computer program code runs on a computer, the computer is enabled to perform the operation and/or procedure performed by the core network control plane network element of the second network in the data transmission method provided in this application.

This application further provides a computer program product. The computer program product includes computer program code. When the computer program code runs on a computer, the computer is enabled to perform the operation and/or procedure performed by the core network user plane network element of the second network in the data transmission method provided in this application.

This application further provides a computer program product. The computer program product includes computer program code. When the computer program code runs on a computer, the computer is enabled to perform the operation and/or procedure performed by the terminal device in the data transmission method provided in this application.

In addition, this application further provides a chip, and the chip includes a processor. A memory configured to store a computer program is disposed independent of the chip. The processor is configured to execute the computer program stored in the memory, to perform the operation and/or processing performed by the core network control plane network element of the first network in any method embodiment.

Further, the chip may further include a communication interface. The communication interface may be an input/output interface, an input/output circuit, or the like. Further, the chip may further include the memory.

In addition, this application further provides a chip, and the chip includes a processor. A memory configured to store a computer program is disposed independent of the chip. The processor is configured to execute the computer program stored in the memory, to perform the operation and/or processing performed by the access network device of the first network in any method embodiment.

Further, the chip may further include a communication interface. The communication interface may be an input/output interface, an input/output circuit, or the like. Further, the chip may further include the memory.

In addition, this application further provides a chip, and the chip includes a processor. A memory configured to store a computer program is disposed independent of the chip. The processor is configured to execute the computer program stored in the memory, to perform the operation and/or processing performed by the core network user plane network element of the first network in any method embodiment.

Further, the chip may further include a communication interface. The communication interface may be an input/output interface, an input/output circuit, or the like. Further, the chip may further include the memory.

In addition, this application further provides a chip, and the chip includes a processor. A memory configured to store a computer program is disposed independent of the chip. The processor is configured to execute the computer program stored in the memory, to perform the operation and/or processing performed by the core network control plane network element of the second network in any method embodiment.

Further, the chip may further include a communication interface. The communication interface may be an input/output interface, an input/output circuit, or the like. Further, the chip may further include the memory.

In addition, this application further provides a chip, and the chip includes a processor. A memory configured to store a computer program is disposed independent of the chip. The processor is configured to execute the computer program stored in the memory, to perform the operation and/or processing performed by the core network user plane network element of the second network in any method embodiment.

Further, the chip may further include a communication interface. The communication interface may be an input/output interface, an input/output circuit, or the like. Further, the chip may further include the memory.

In addition, this application further provides a chip, and the chip includes a processor. A memory configured to store a computer program is disposed independent of the chip. The processor is configured to execute the computer program stored in the memory, to perform an operation and/or processing performed by the terminal device in any method embodiment.

Further, the chip may further include a communication interface. The communication interface may be an input/output interface, an input/output circuit, or the like. Further, the chip may further include the memory.

In addition, this application further provides a wireless communication system, including a part or all of the core network control plane network element of the first network, the core network user plane network element of the first network, the access network device of the first network, the core network control plane network element of the second network, the core network user plane network element of the second network, and the terminal device in the embodiments of this application.

The processor in the embodiments of this application may be an integrated circuit chip, and has a signal processing capability. In an implementation process, the steps in the foregoing method embodiments may be completed by using a hardware integrated logic circuit in the processor or instructions in a form of software. The processor may be a general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or transistor logic device, or a discrete hardware component. The general-purpose processor may be a microprocessor, any conventional processor, or the like. The steps of the methods disclosed in the embodiments of this application may be directly executed and completed by using a hardware encoding processor, or may be executed and completed by using a combination of hardware and software modules in the encoding processor. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through examples but not limitative description, RAMs in many forms are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DRRAM). It should be noted that, the memory in the system and method described in this specification includes but is not limited to these memories and any memory of another proper type.

The terms such as "unit", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As shown in figures, both a computing device and an application that runs on a computing device may be components. One or more components may reside within the process and/or the execution thread. The components may be located on one computer and/or distributed between two or more computers. In addition, these components may be executed from various computer-readable media that store various data structures. The components may communicate by using a local and/or remote process based on a signal having one or more data packets (for example, data from two components interacting with another component in a local system, a distributed system, and/or a network such as the Internet interacting with another system by using the signal).

A person of ordinary skill in the art may be aware that units, algorithms, and steps in the examples described with reference to the embodiments disclosed in this application can be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by the person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one location, or may be distributed on a plurality of network units. Some or all of the units may be selected depending on actual requirements to achieve the objectives of the solutions in the embodiments.

In addition, the functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   accessing, by a terminal device, a first network;
   sending, by the terminal device, a first message to a core network element of the first network or a first RRC message to an access network device of the first network, wherein the first message or the first RRC message indicates that the terminal device is to move from the first network to a second network, and wherein the first network is a public network and the second network is a non-public network, or the first network is a non-public network and the second network is a public network;
   receiving, by the terminal device, a second RRC message from an access network device of the first network, wherein the second RRC message comprises second time information indicating a core network user plane network element of the first network to pause transmission of user plane data of the first network of the terminal device.

2. The method according to claim 1, wherein the first message or the first RRC message comprises one or more of first time information, a cause, immediate pause indication information, or proximity indication information, and wherein the first time information indicates that the terminal device is to trigger cross-network movement after a first time indicated by the first time information, the cause indicates the cross-network movement, the immediate pause indication information indicates whether to immediately pause transmission of user plane data of the first network of the terminal device, and the proximity indication information indicates that the terminal device is entering or leaving a neighboring area of one or more cells of a non-public network or that the terminal device is entering or leaving one or more cells of a non-public network.

3. The method according to claim 2, wherein the proximity indication information carries one or more of information indicating that the terminal device is entering the neighboring area of the one or more cells of the non-public network, information indicating that the terminal device is leaving the neighboring area of the one or more cells of the non-public network, information indicating that the terminal device is entering the one or more cells of the non-public network, information indicating that the terminal device is leaving the one or more cells of the non-public network, or identifier information of the one or more cells.

4. The method according to claim 2, wherein the method further comprises:
   receiving, by the terminal device, the second time information from an access and mobility management function (AMF) of the first network by using a non-access stratum (NAS) message; and
   retaining, by the terminal device, a context of the first network after the first time or a second time indicated by the second time information.

5. The method according to claim 1, wherein the method further comprises:
   in response to determining that the terminal device moves to the second network and accesses the second network, sending, by the terminal device, a NAS message to a core network control plane network element of the first network, wherein the NAS message indicates that the terminal device has accessed the second network;
   receiving, by the terminal device, a third RRC message from the access network device of the first network, wherein the third RRC message comprises one or more of the following information: a session identifier of a PDU session of the first network of the terminal device, a device identifier of the terminal device, a cause for resuming the transmission, or information indicating whether to immediately resume the transmission; and
   resuming, by the terminal device, a context of the first network based on the third RRC message.

6. A data transmission method, comprising:
   receiving, by a core network control plane network element of a first network, a first message, wherein the first message indicates that a terminal device is to move from the first network to a second network, wherein the first network is a public network and the second network is a non-public network, or the first network is a non-public network and the second network is a public network; and
   sending, by the core network control plane network element of the first network, a second message to a core network user plane network element of the first network, wherein the second message indicates the core network user plane network element of the first network to pause transmission of user plane data of the first network of the terminal device.

7. The method according to claim 6, wherein the first message and the second message further carry one or more first time information, a cause, immediate pause indication information, or proximity indication information, and wherein the first time information indicates that the terminal device is to trigger cross-network movement after first time indicated by the first time information, the cause indicates the cross-network movement, the immediate pause indication information indicates whether to immediately pause the transmission of the user plane data of the first network of the terminal device, and the proximity indication information indicates that the terminal device is entering or leaving a neighboring area of one or more cells of a non-public network or that the terminal device is entering or leaving one or more cells of a non-public network.

8. The method according to claim 6, wherein the method further comprises:
receiving, by the core network control plane network element of the first network, a third message from the core network user plane network element of the first network, wherein the third message carries second time information, and the second time information indicates that the core network user plane network element of the first network to pause the transmission of the user plane data of the first network of the terminal device after second time indicated by the second time information; and
retaining, by the core network control plane network element of the first network, a context of the first network of the terminal device after first time or the second time.

9. The method according to claim 8, wherein the core network control plane network element of the first network receives the first message from an access network device of the first network, and the method further comprises:
in response to determining that the core network control plane network element of the first network receives the third message from the core network user plan network element of the first network, sending, by the core network control plane network element of the first network, a fourth message to the access network device of the first network, wherein the fourth message carries the second time information, and the fourth message notifies the access network device of the first network that the core network control plane network element of the first network to pause the transmission of the user plane data of the first network of the terminal device after the second time.

10. The method according to claim 9, wherein the method further comprises:
in response to determining that the core network control plane network element of the first network sends the fourth message to the access network device of the first network, receiving, by the core network control plane network element of the first network, a NAS message from the terminal device, wherein the NAS message indicates that the terminal device has moved to the second network and accessed the second network; and
sending, by the core network control plane network element of the first network, a fifth message to the access network device of the first network, wherein the fifth message indicates the access network device of the first network to send buffered user plane data of the first network of the terminal device.

11. The method according to claim 10, wherein the fifth message further carries one or more of a device identifier of the terminal device, a session identifier of a protocol data unit (PDU) session of the first network of the terminal device, a quality of service flow identifier (QFI), and a data radio bearer identifier (DRB ID).

12. The method according to claim 8, wherein the first message received by the core network control plane network element of the first network is a non-access stratum (NAS) message from the terminal device, and the method further comprises:
in response to determining that the core network control plane network element of the first network receives the third message from the core network user plan network element of the first network, sending, by the core network control plane network element of the first network, a fourth message to an access network device of the first network, wherein the fourth message carries the following information:
the second time information, first time information, a cause, immediate pause indication information, and proximity indication information.

13. A data transmission method, comprising:
receiving, by an access network device of a first network, a first RRC message from a terminal device, wherein the first RRC message indicates that the terminal device is to move from the first network to a second network, wherein the first network is a public network and the second network is a non-public network, or the first network is a non-public network and the second network is a public network;
sending, by the access network device of the first network, a first message to a core network control plane network element of the first network, wherein the first message indicates to the core network control plane network element of the first network that the terminal device is to move from the first network to the second network; and
receiving, by the access network device of the first network, a fourth message from the core network control plane network element of the first network, wherein the fourth message carries second time information, and the second time information indicates that a core network user plane network element of the first network to pause transmission of user plane data of the first network of the terminal device after second time indicated by the second time information.

14. The method according to claim 13, wherein the first RRC message and the first message further carry first time information, a cause, immediate pause indication information, or proximity indication information, and wherein the first time information indicates that the terminal device is to trigger cross-network movement after first time indicated by the first time information, the cause indicates the cross-network movement, the immediate pause indication information indicates whether to immediately pause transmission of user plane data of the first network of the terminal device, and the proximity indication information indicates that the terminal device is entering or leaving a neighboring area of one or more cells of a non-public network or that the terminal device is entering or leaving one or more cells of a non-public network.

15. The method according to claim 13, wherein the method further comprises:
in response to the access network device of the first network receives the fourth message from the core network control plane network element of the first network, sending, by the access network device of the first network, a second RRC message to the terminal device, wherein the second RRC message carries the second time information, and the second time information indicates that the core network user plane network element of the first network to pause the transmission of the user plane data of the first network of the terminal device after the second time; and
retaining, by the access network device of the first network, a context of the first network of the terminal device after first time or the second time.

16. The method according to claim 15, wherein the method further comprises:

in response to the access network device of the first network sends the second RRC message to the terminal device, receiving, by the access network device of the first network, a fifth message from the core network control plane network element of the first network, wherein the fifth message indicates the access network device of the first network to send buffered user plane data of the first network of the terminal device.

17. A communication apparatus, comprising:
at least one processor; and
a non-transitory computer-readable storage medium coupled to the at least one processor and storing programming instructions for execution by the at least one processor, the programming instructions instruct the at least one processor to perform operations comprising:
accessing, by a terminal device, a first network;
sending, by the terminal device, a first message to a core network element of the first network or a first RRC message to an access network device of the first network, wherein the first message or the first RRC message indicates that the terminal device is to move from the first network to a second network, and wherein the first network is a public network and the second network is a non-public network, or the first network is a non-public network and the second network is a public network; and
receiving, by the terminal device, a second RRC message from an access network device of the first network, wherein the second RRC message comprises second time information indicating a core network user plane network element of the first network to pause transmission of user plane data of the first network of the terminal device.

18. The communication apparatus of claim 17, wherein the first message or the first RRC message comprises one or more of first time information, a cause, immediate pause indication information, or proximity indication information, and wherein the first time information indicates that the terminal device is to trigger cross-network movement after first time indicated by the first time information, the cause is used to indicate the cross-network movement, the immediate pause indication information indicates whether to immediately pause transmission of user plane data of the first network of the terminal device, and the proximity indication information indicates that the terminal device is entering or leaving a neighboring area of one or more cells of a non-public network or that the terminal device is entering or leaving one or more cells of a non-public network.

19. The communication apparatus according to claim 18, further comprises:
receiving, by the terminal device, the second time information from an access and mobility management function (AMF) of the first network by using a non-access stratum (NAS) message; and
retaining, by the terminal device, a context of the first network after the first time or a second time indicated by the second time information.

* * * * *

UNITED STATES PATENT AND TRADEMARK OFFICE
CERTIFICATE OF CORRECTION

PATENT NO. : 11,968,575 B2  
APPLICATION NO. : 17/586060  
DATED : April 23, 2024  
INVENTOR(S) : Chenchen Yang et al.

Page 1 of 1

It is certified that error appears in the above-identified patent and that said Letters Patent is hereby corrected as shown below:

On the Title Page

Column 1 (item (72) Inventors), Line 3, Before "Billancourt" insert therefore -- Boulogne --;

In the Claims

Column 73, Line 47, Claim 1, after "network;" insert therefore -- and --.

Signed and Sealed this  
Twenty-seventh Day of August, 2024

Katherine Kelly Vidal  
*Director of the United States Patent and Trademark Office*